United States Patent [19]
Nagata et al.

[11] Patent Number: 5,671,455
[45] Date of Patent: Sep. 23, 1997

[54] MAGNETIC RECORD CAMERA

[75] Inventors: Toru Nagata, Tokyo; Kazuhiro Izukawa, Misato, both of Japan

[73] Assignee: Canon Kabushiki Kaisha, Tokyo, Japan

[21] Appl. No.: 474,013

[22] Filed: Jun. 7, 1995

Related U.S. Application Data

[63] Continuation of Ser. No. 73,071, Jun. 8, 1993, abandoned.

[30] Foreign Application Priority Data

Jun. 10, 1992 [JP] Japan ................................. 4-175074

[51] Int. Cl.⁶ .................................................. G03B 1/18
[52] U.S. Cl. ........................................................ 396/390
[58] Field of Search ........................... 354/21, 207, 173.1, 354/173.11, 105, 106; 396/387, 389, 390, 310, 319, 406

[56] References Cited

U.S. PATENT DOCUMENTS

| | | | |
|---|---|---|---|
| Re. 34,452 | 11/1993 | Taniguchi | 354/21 |
| 4,860,037 | 8/1989 | Harvey | 354/21 |
| 4,864,333 | 9/1989 | Harvey | 354/21 |
| 4,878,075 | 10/1989 | Cannon | 354/173.1 |
| 5,006,873 | 4/1991 | Wash | 354/106 |
| 5,016,030 | 5/1991 | Dwyer et al. | 354/21 |
| 5,017,326 | 5/1991 | Wash et al. | 354/207 |
| 5,159,365 | 10/1992 | Takahashi et al. | 354/21 |
| 5,281,987 | 1/1994 | Nagata | 354/105 |
| 5,325,138 | 6/1994 | Nagata | 354/105 |

FOREIGN PATENT DOCUMENTS

| | | |
|---|---|---|
| 4-171433 | 6/1992 | Japan . |
| 4-257837 | 9/1992 | Japan . |
| WO90-04225 | 4/1990 | WIPO . |
| WO90-04204 | 4/1990 | WIPO . |

*Primary Examiner*—Safet Metjahic
*Assistant Examiner*—Nicholas J. Tuccillo
*Attorney, Agent, or Firm*—Fitzpatrick, Cella, Harper & Scinto

[57] ABSTRACT

A camera uses a film having a magnetic record member for each frame on film. When the film is loaded in the camera, the information recorded in the record member of each frame is detected. It is judged whether each frame is exposed or unexposed. Even if some frames on the leader side and on the trailer side of film were already exposed, the camera can perform accurate positioning of first unexposed frame and exposure on each unexposed frame.

16 Claims, 43 Drawing Sheets

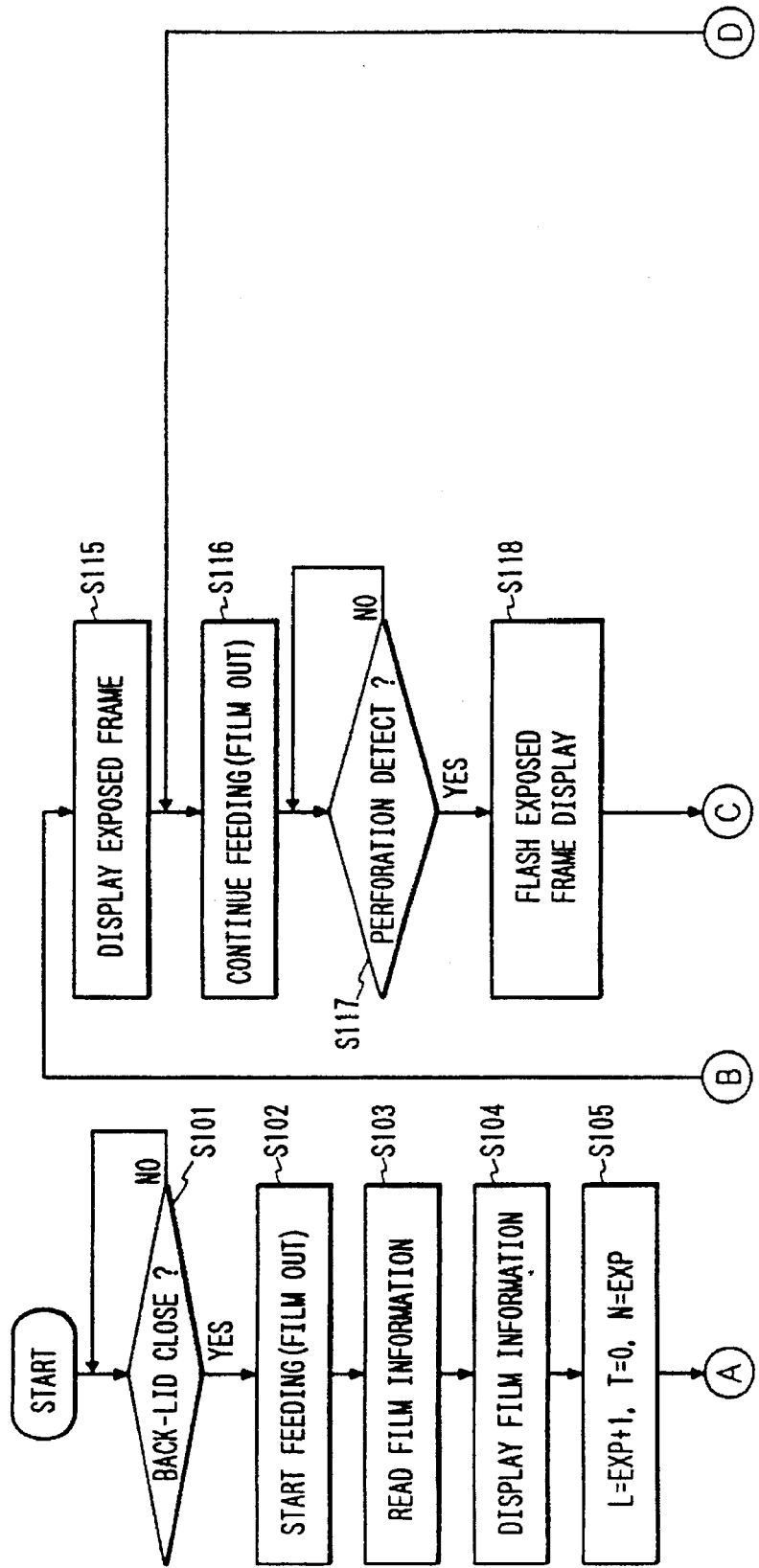

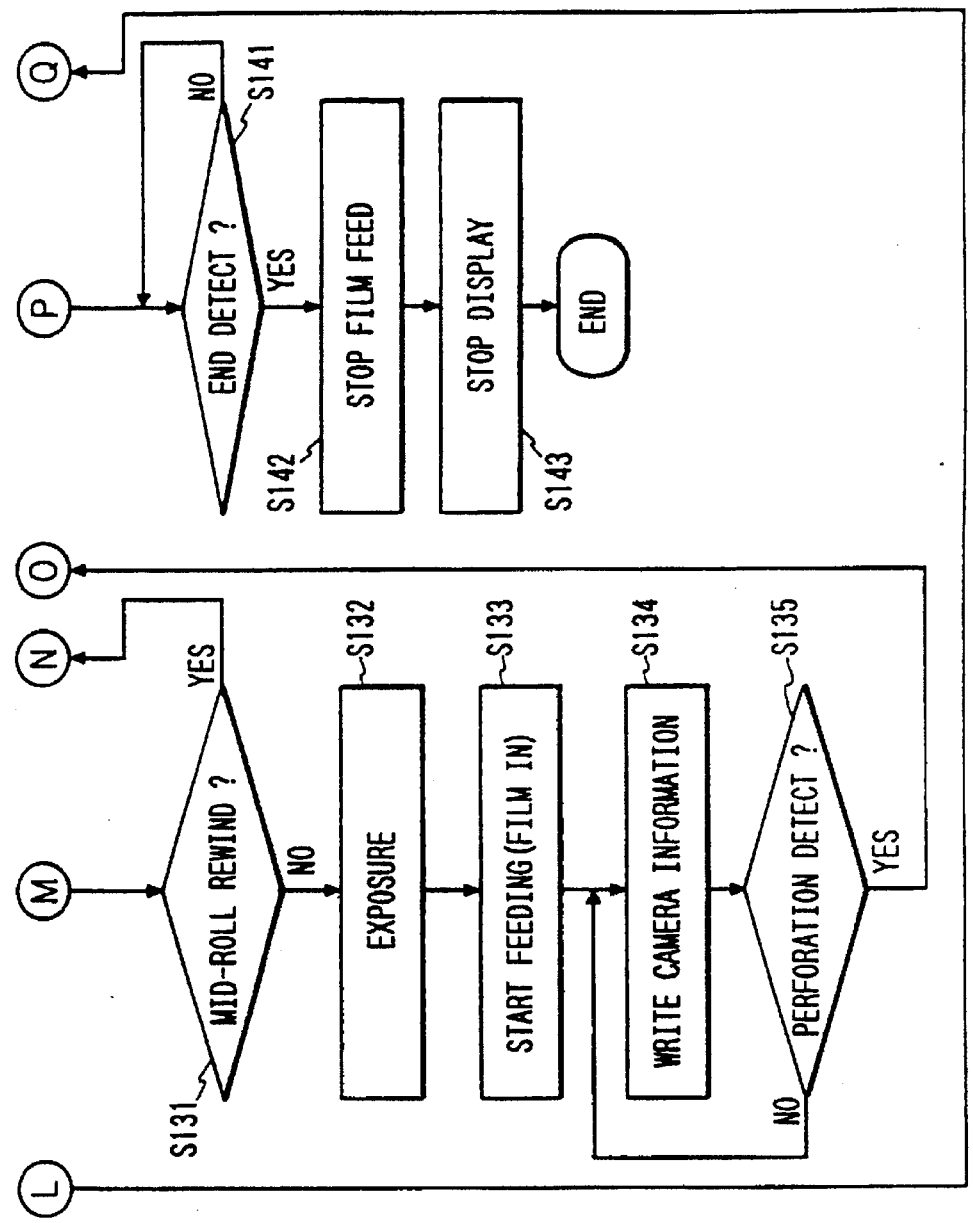

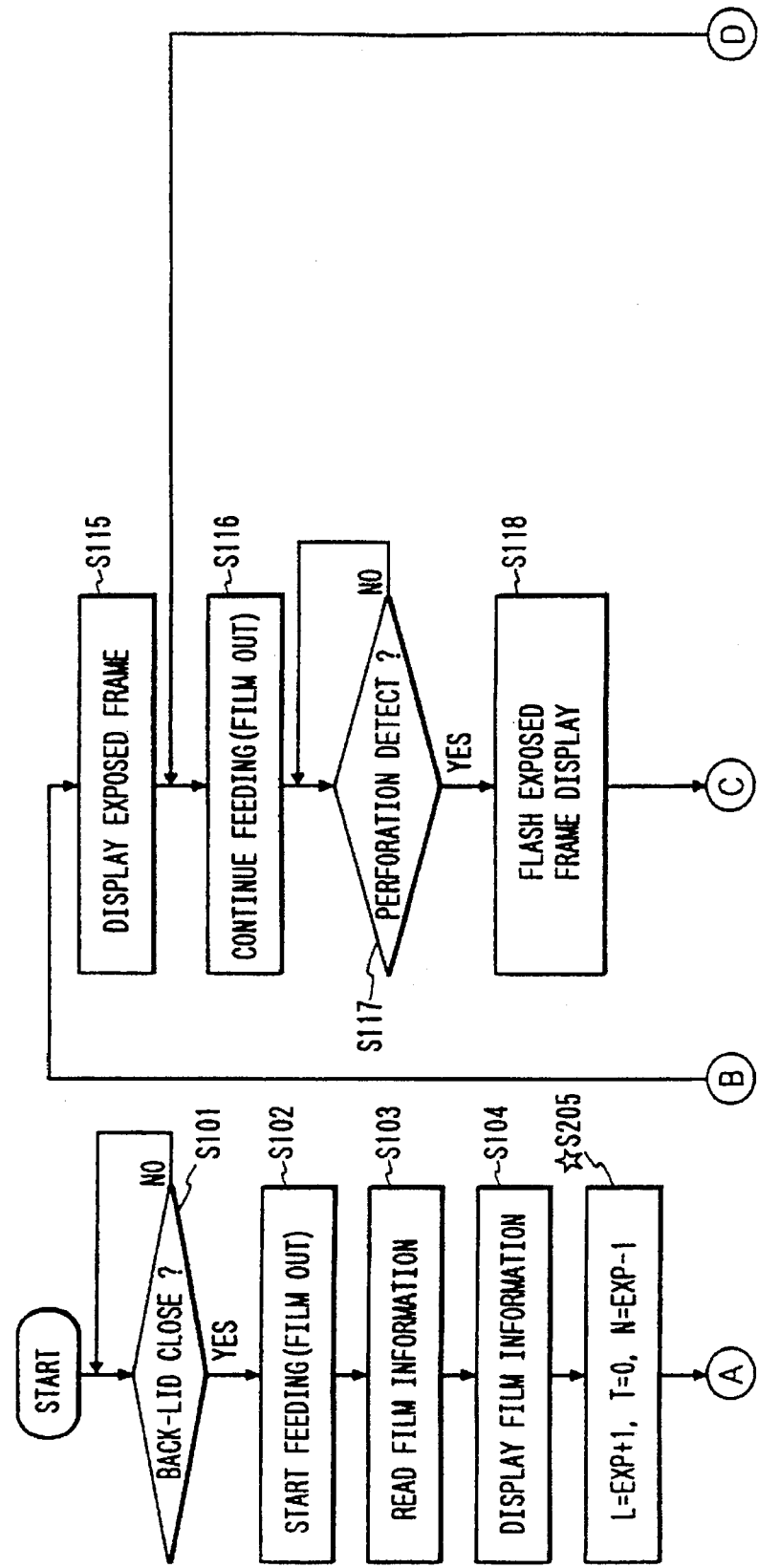

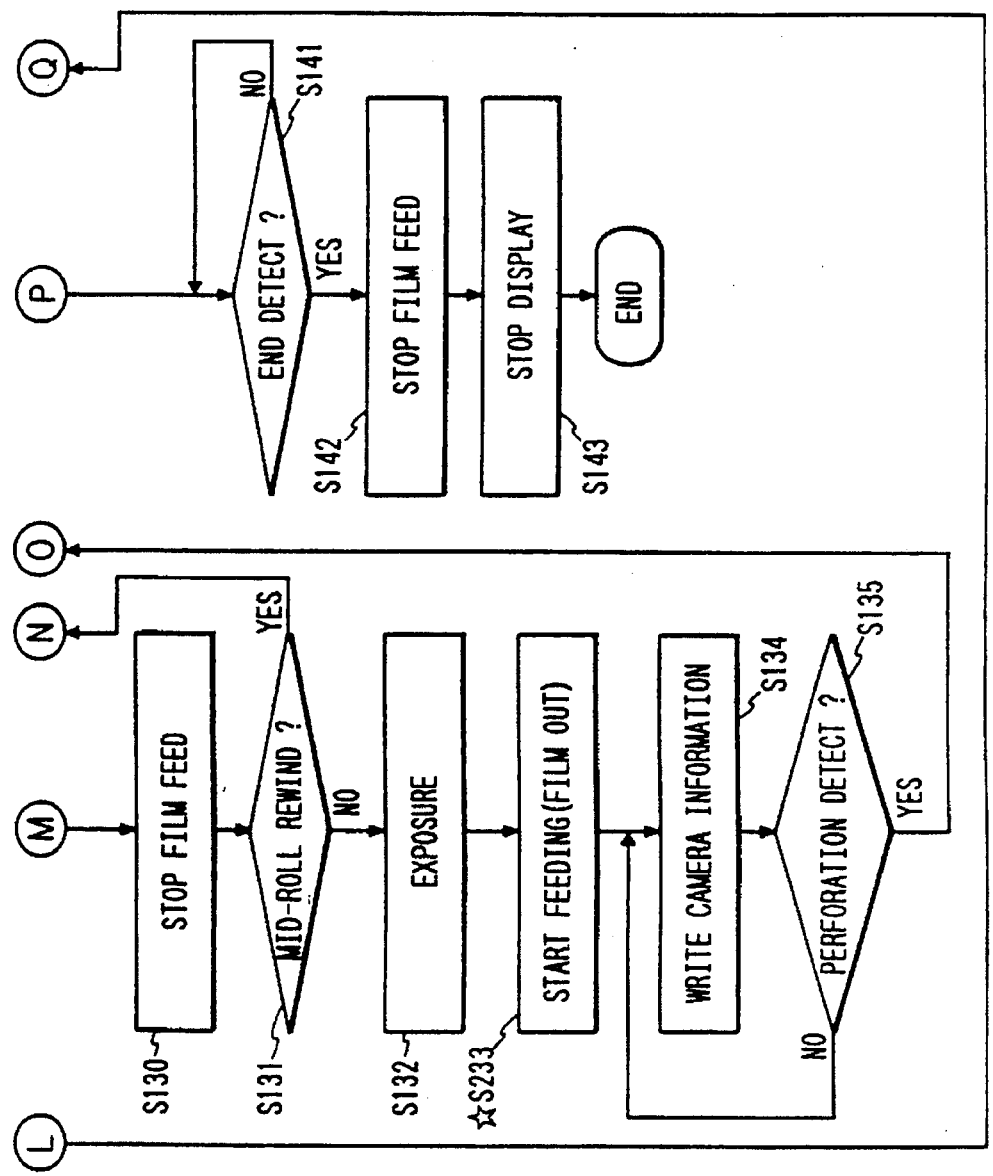

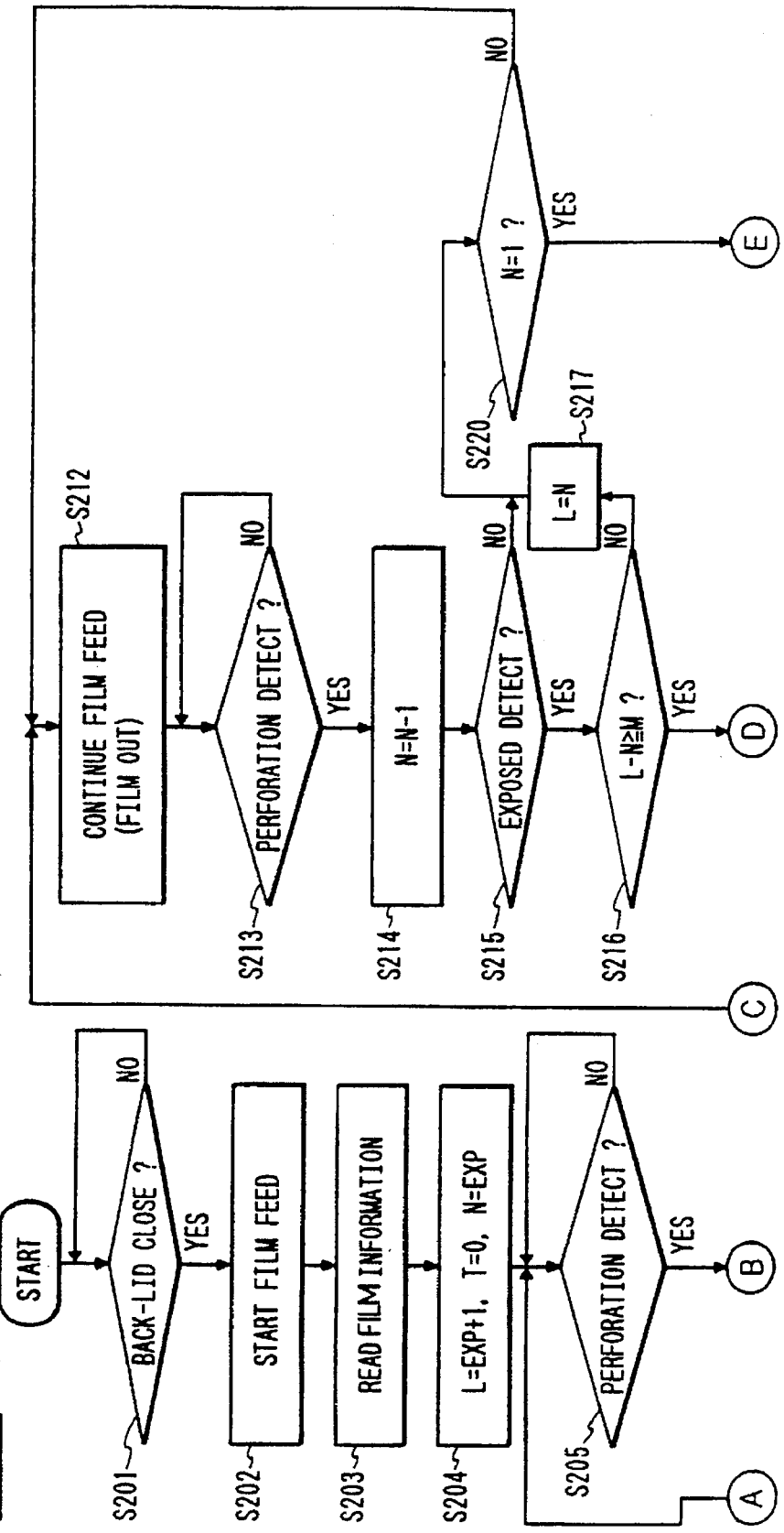

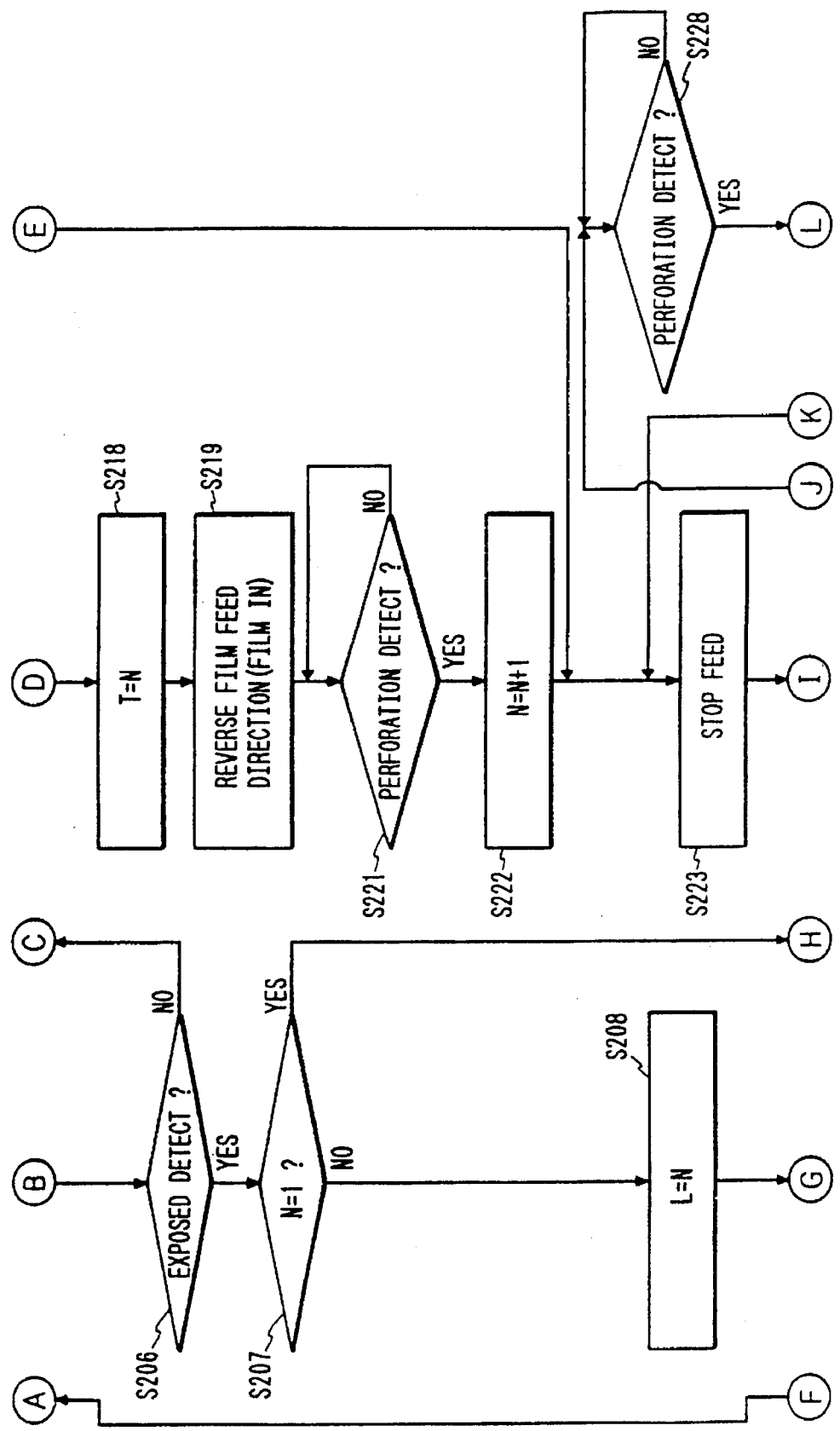

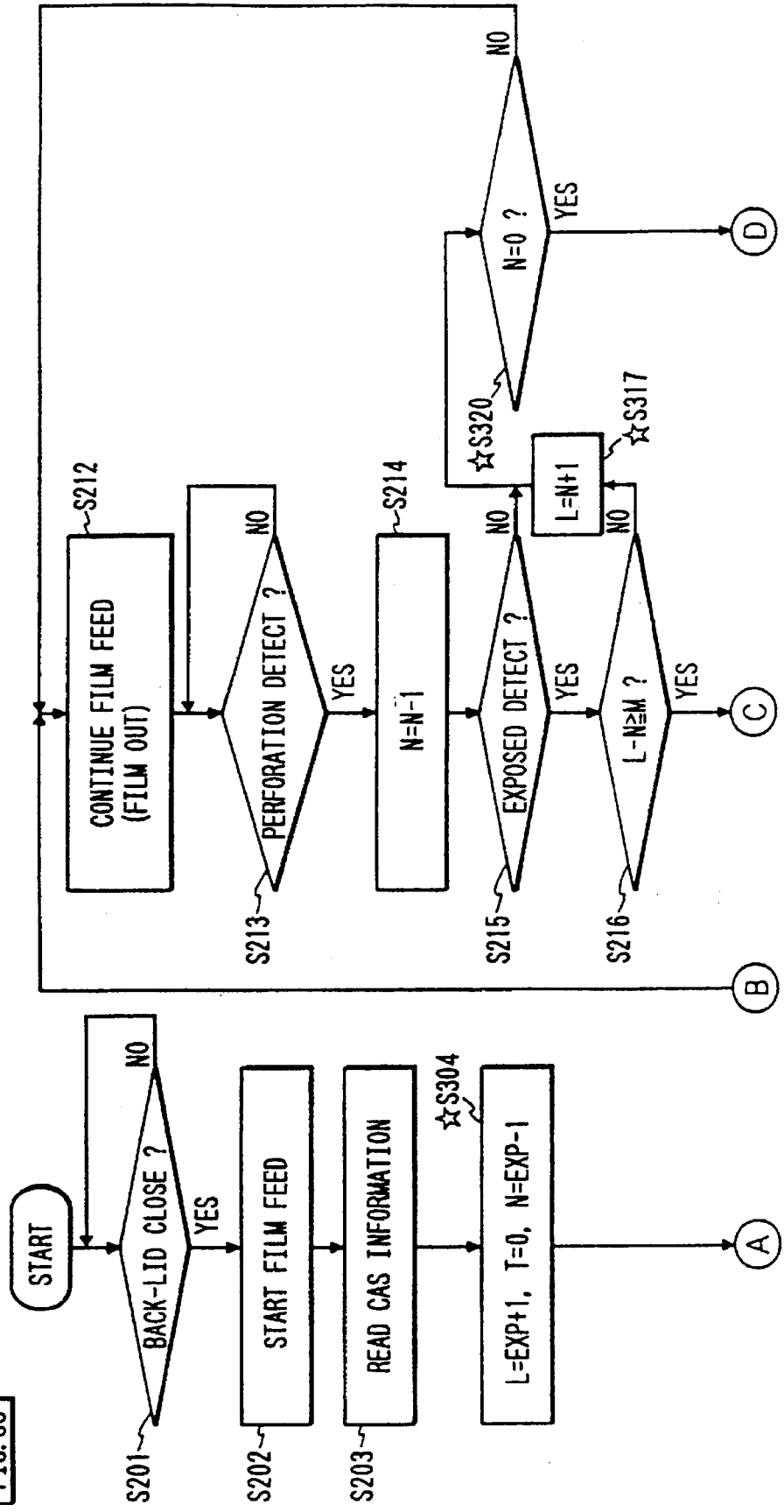

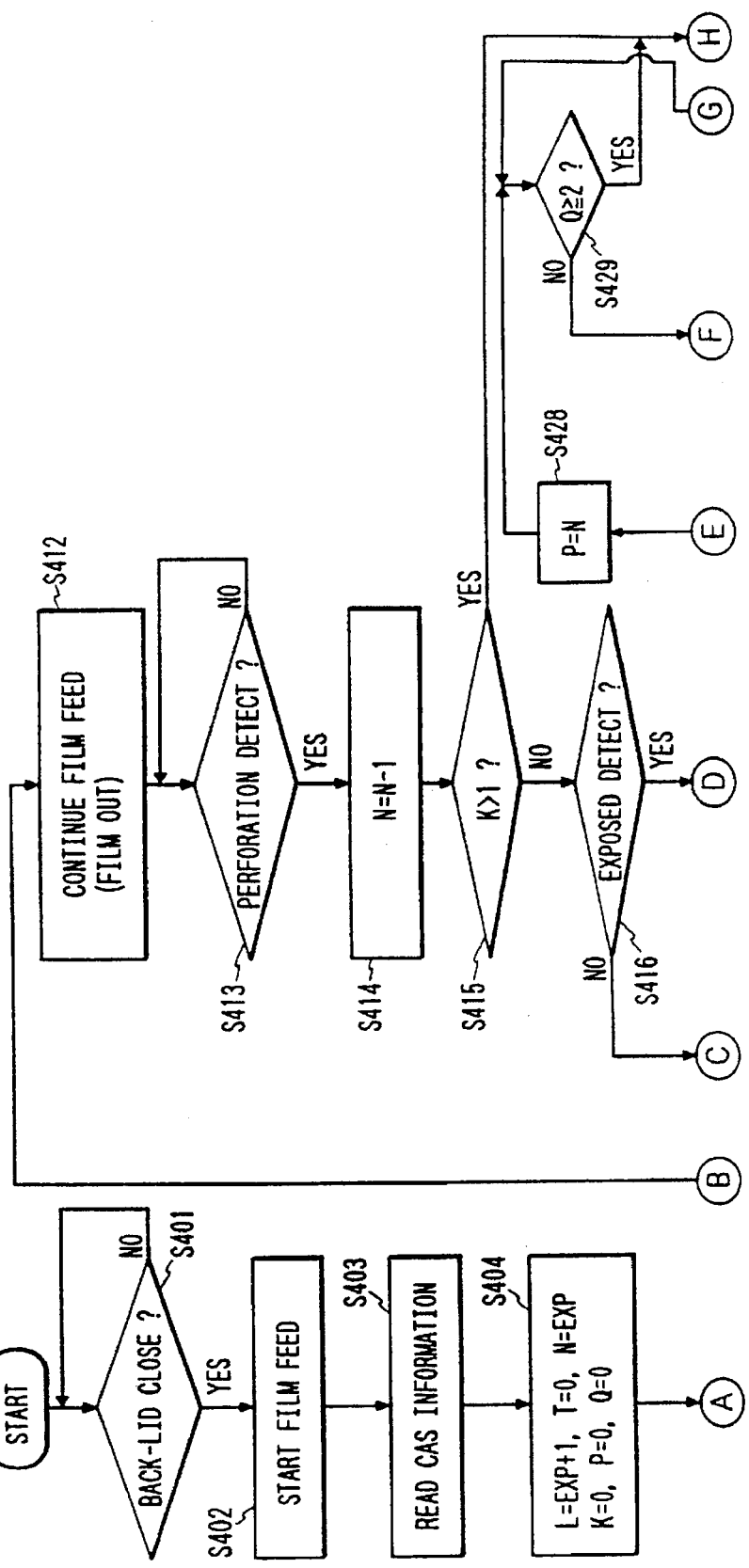

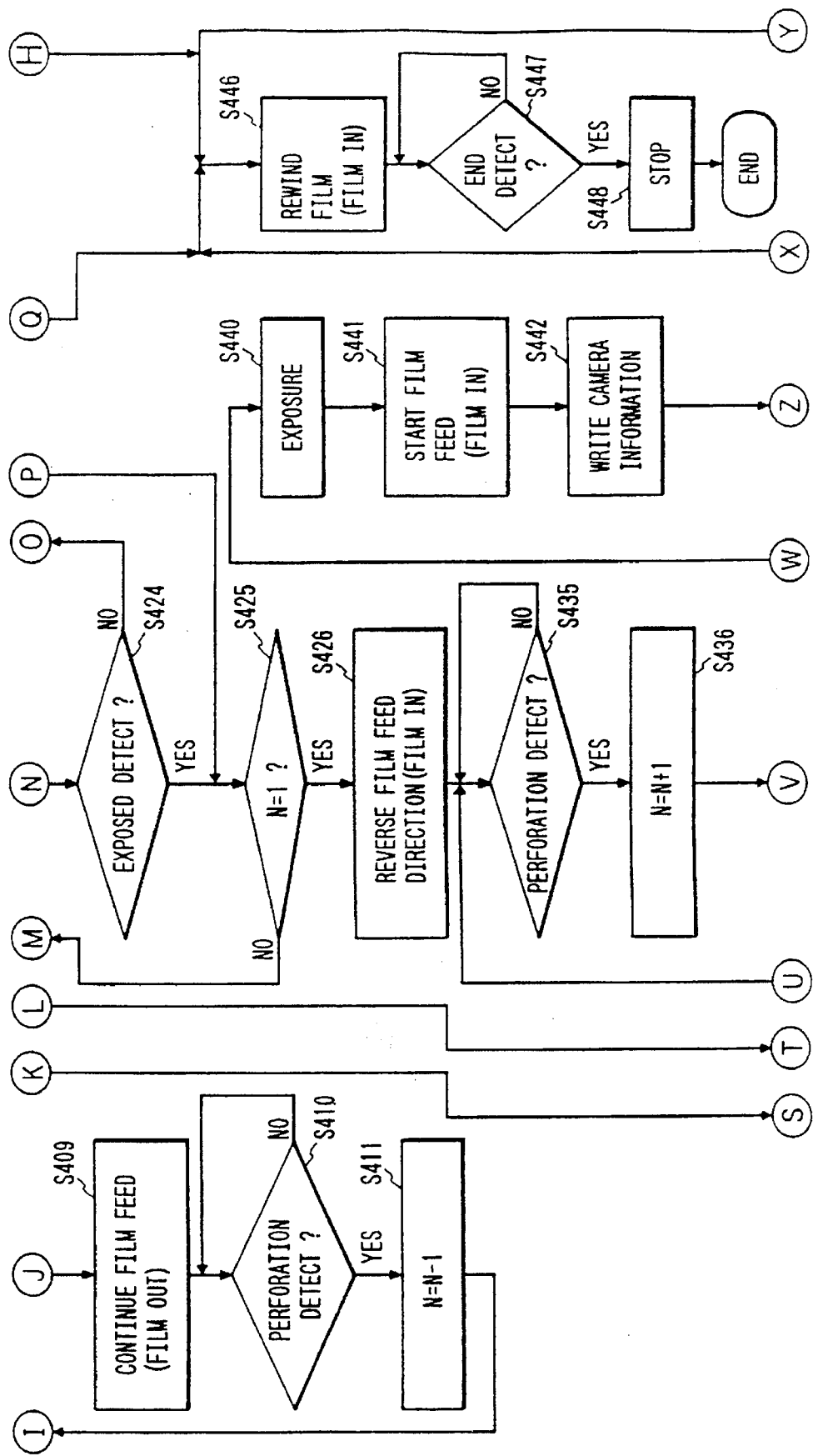

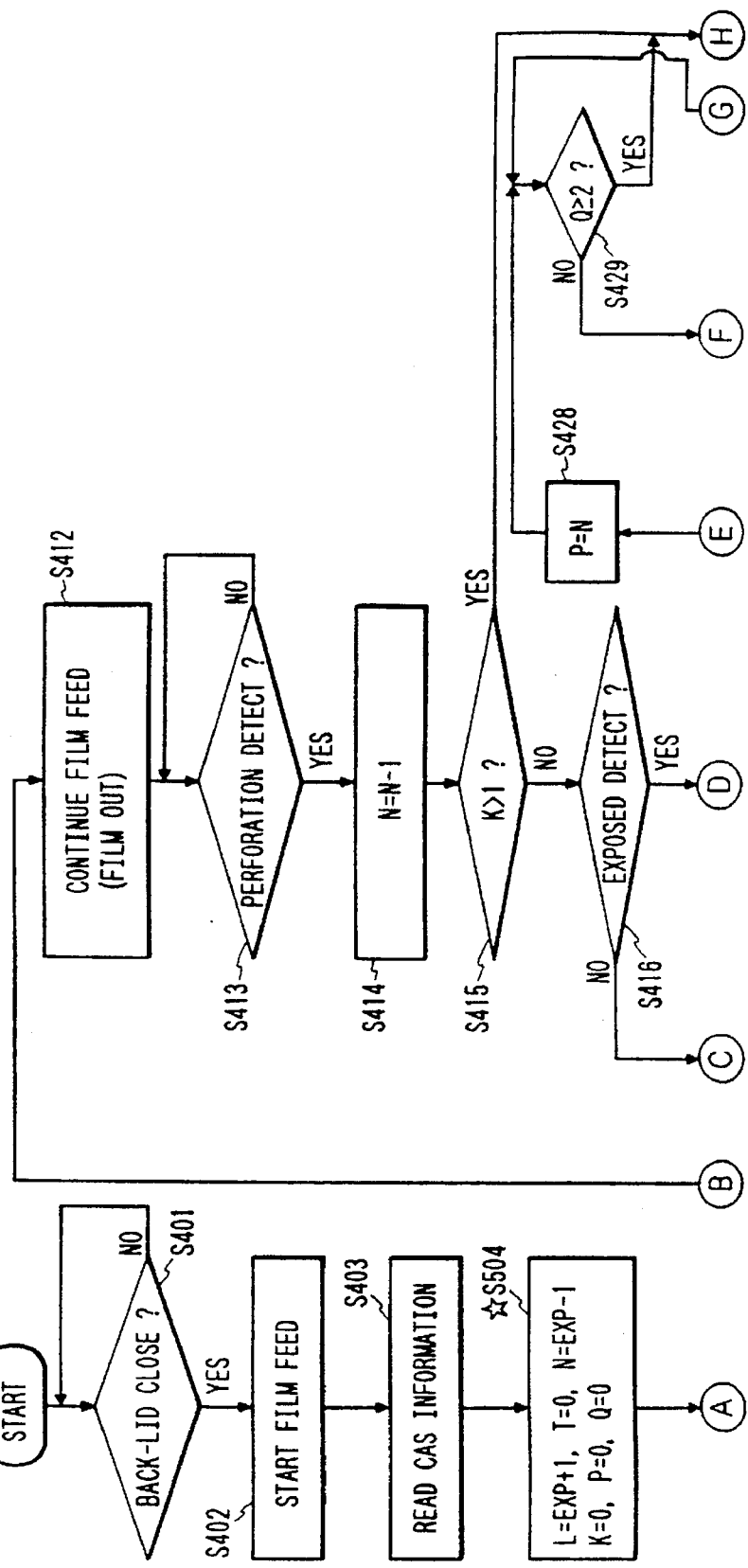

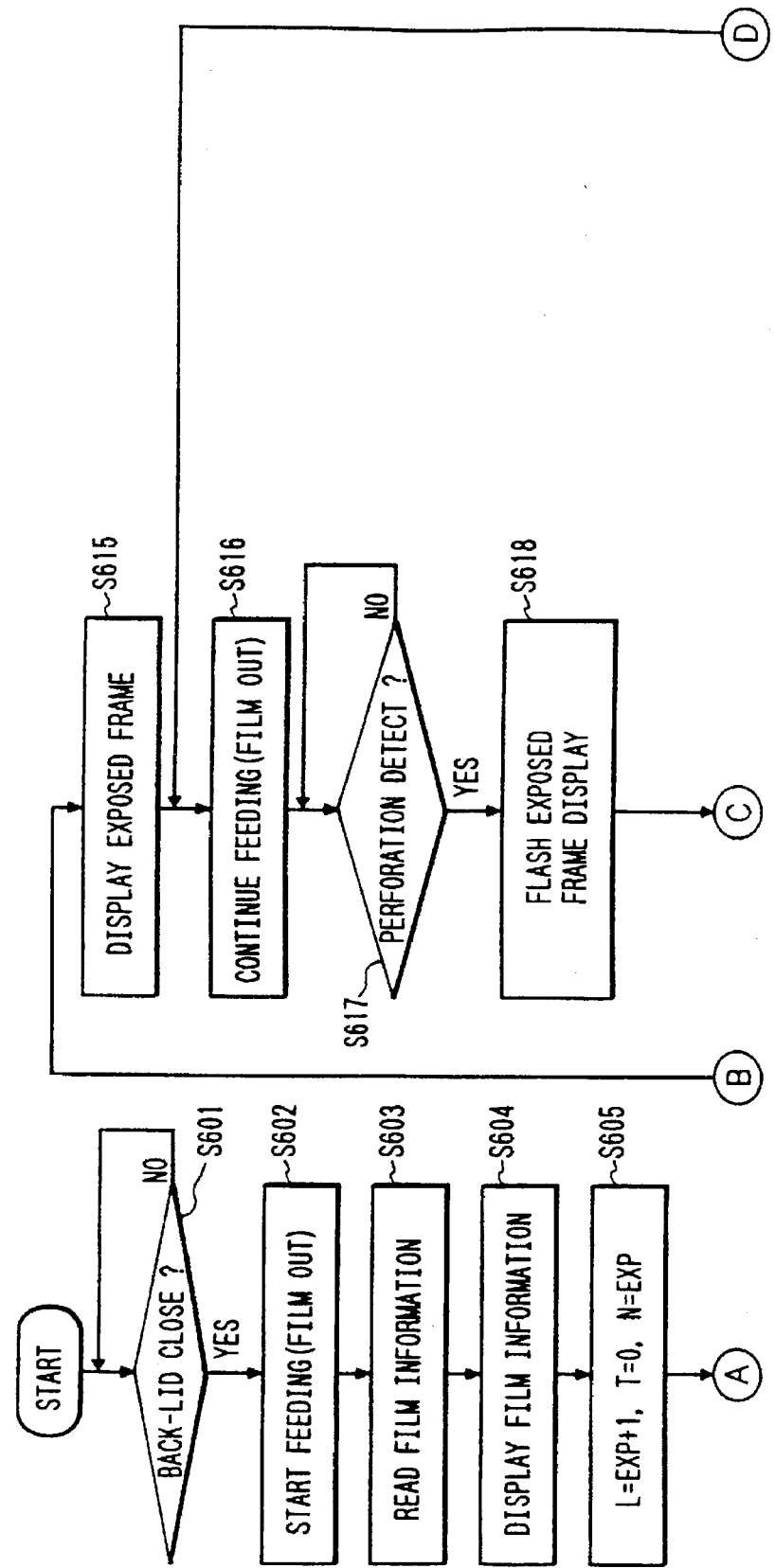

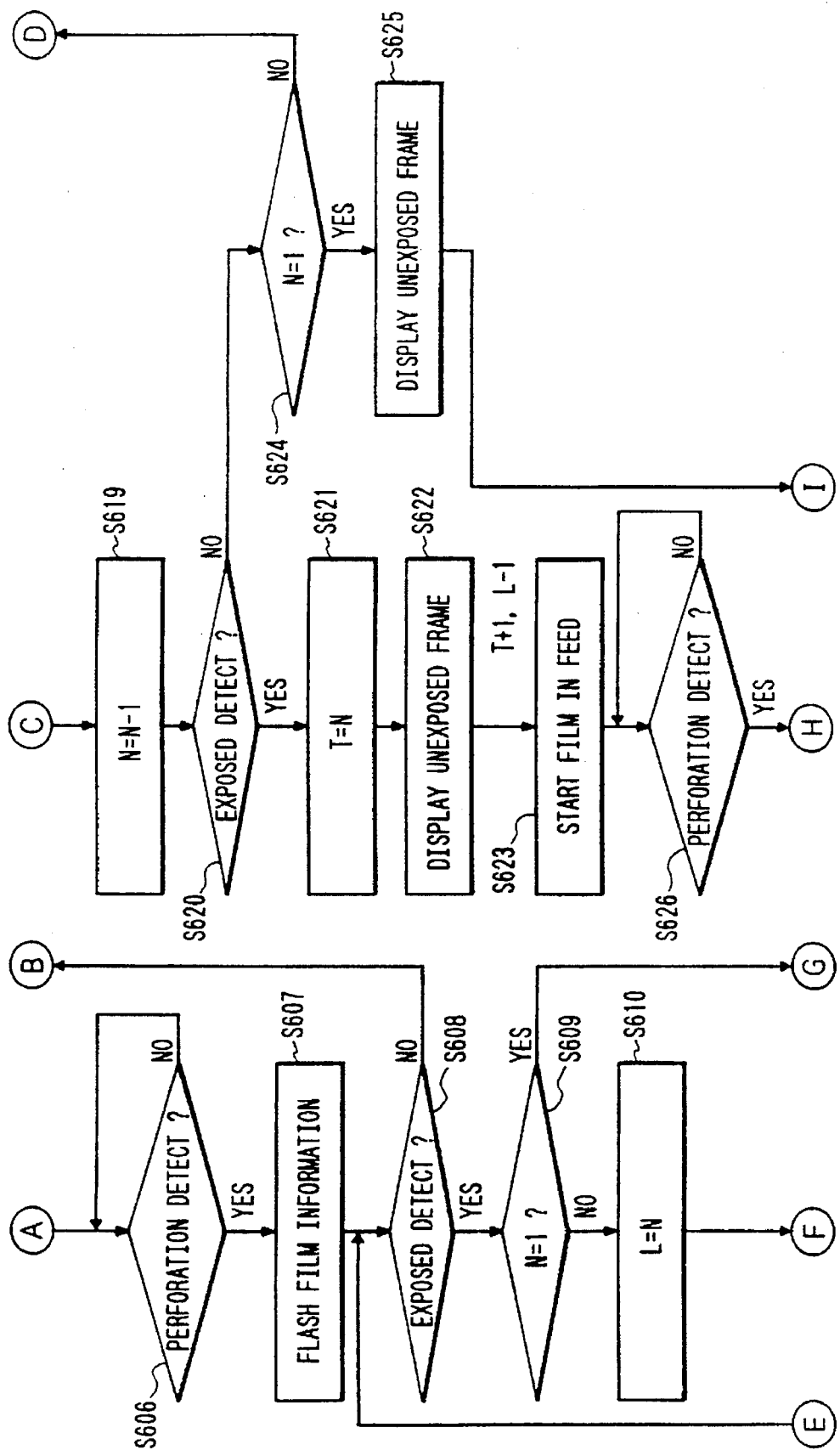

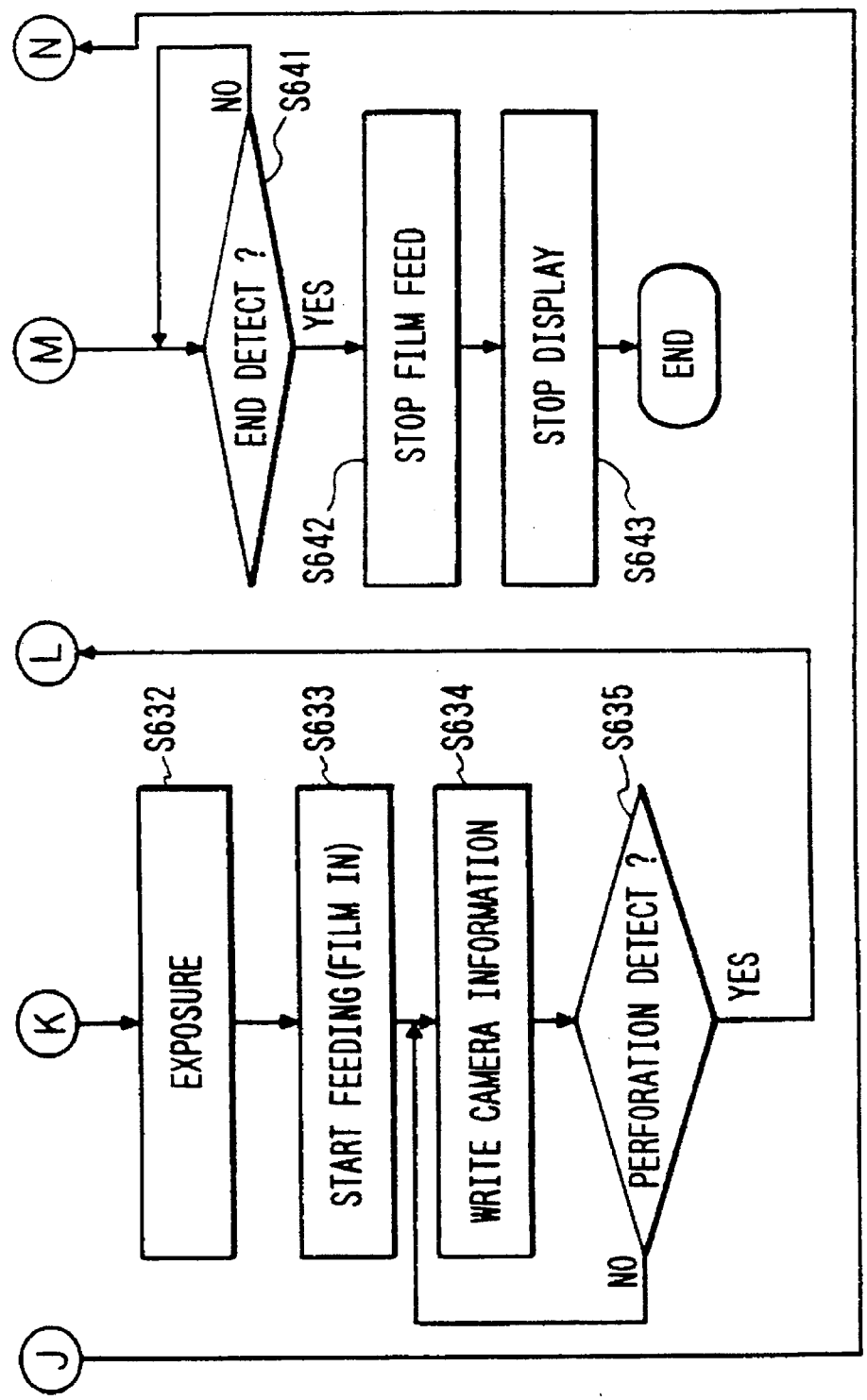

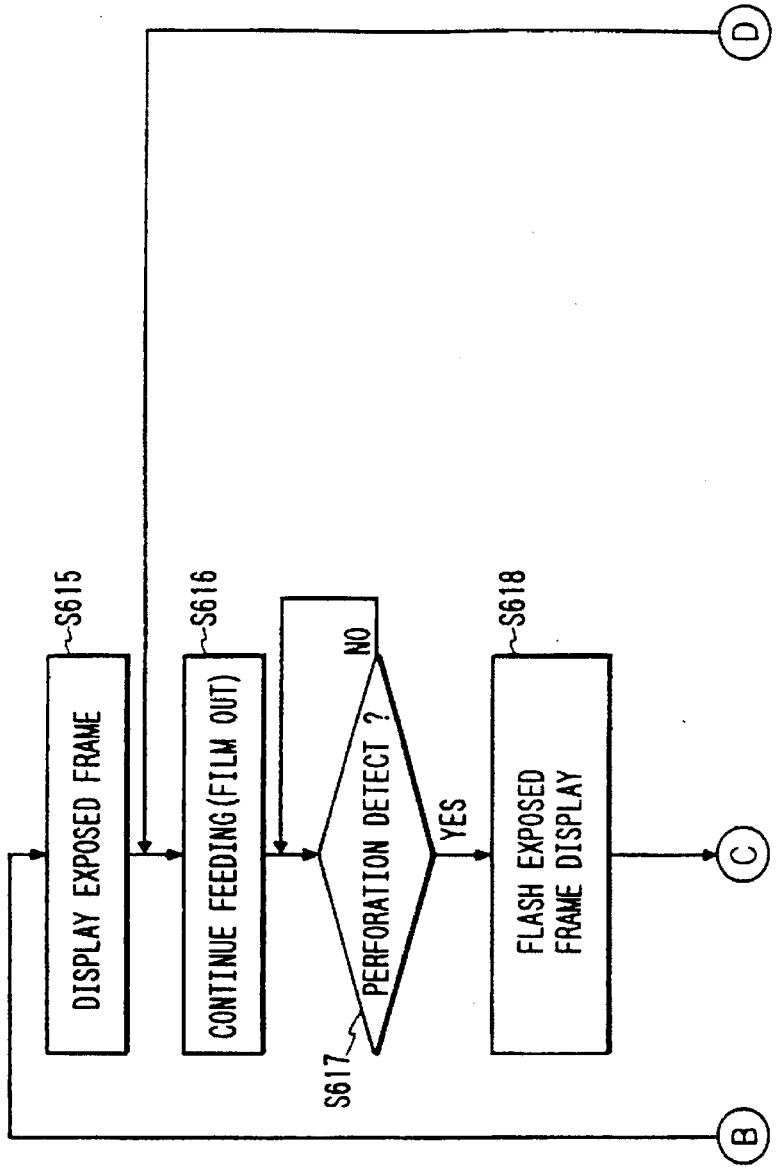

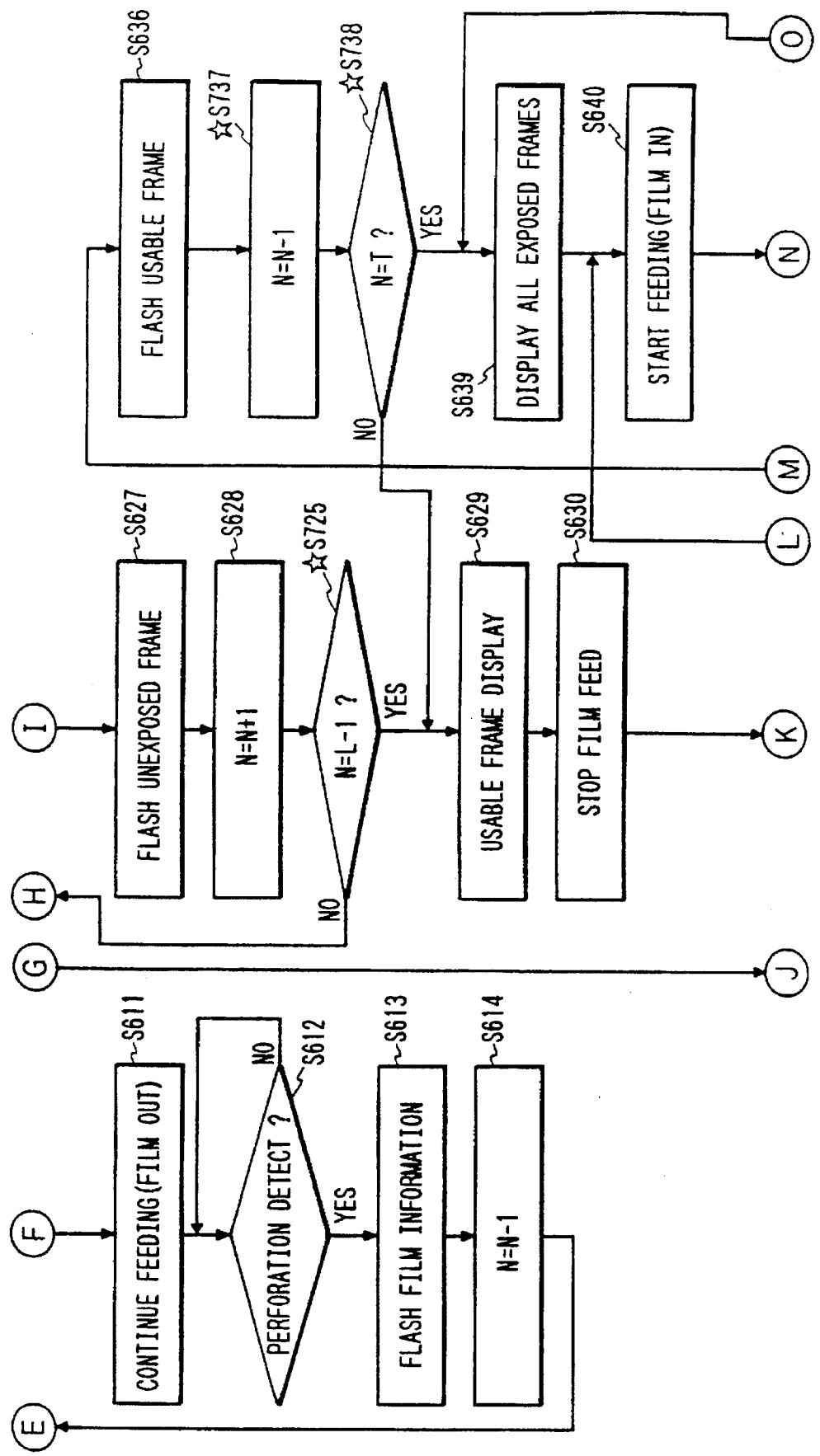

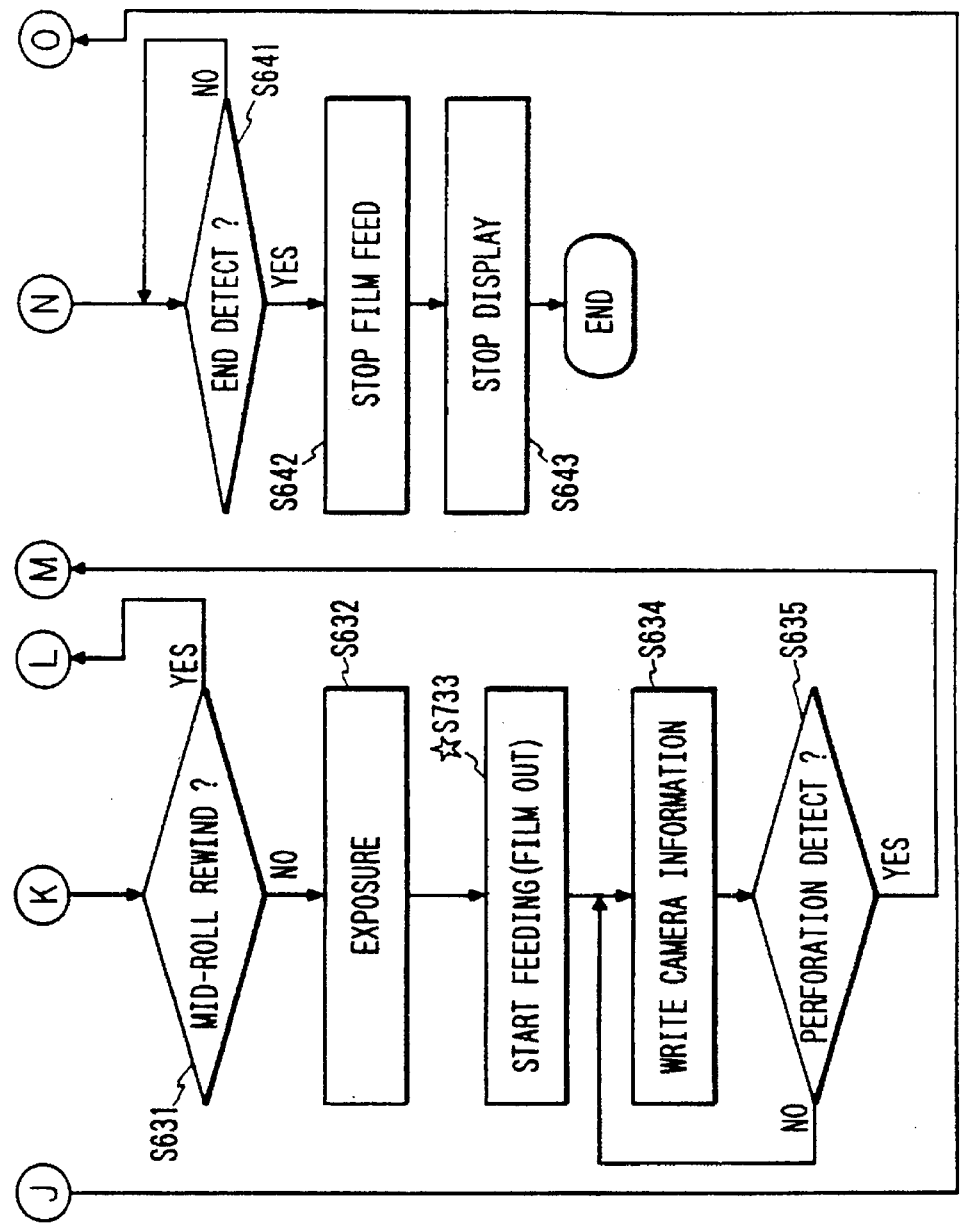

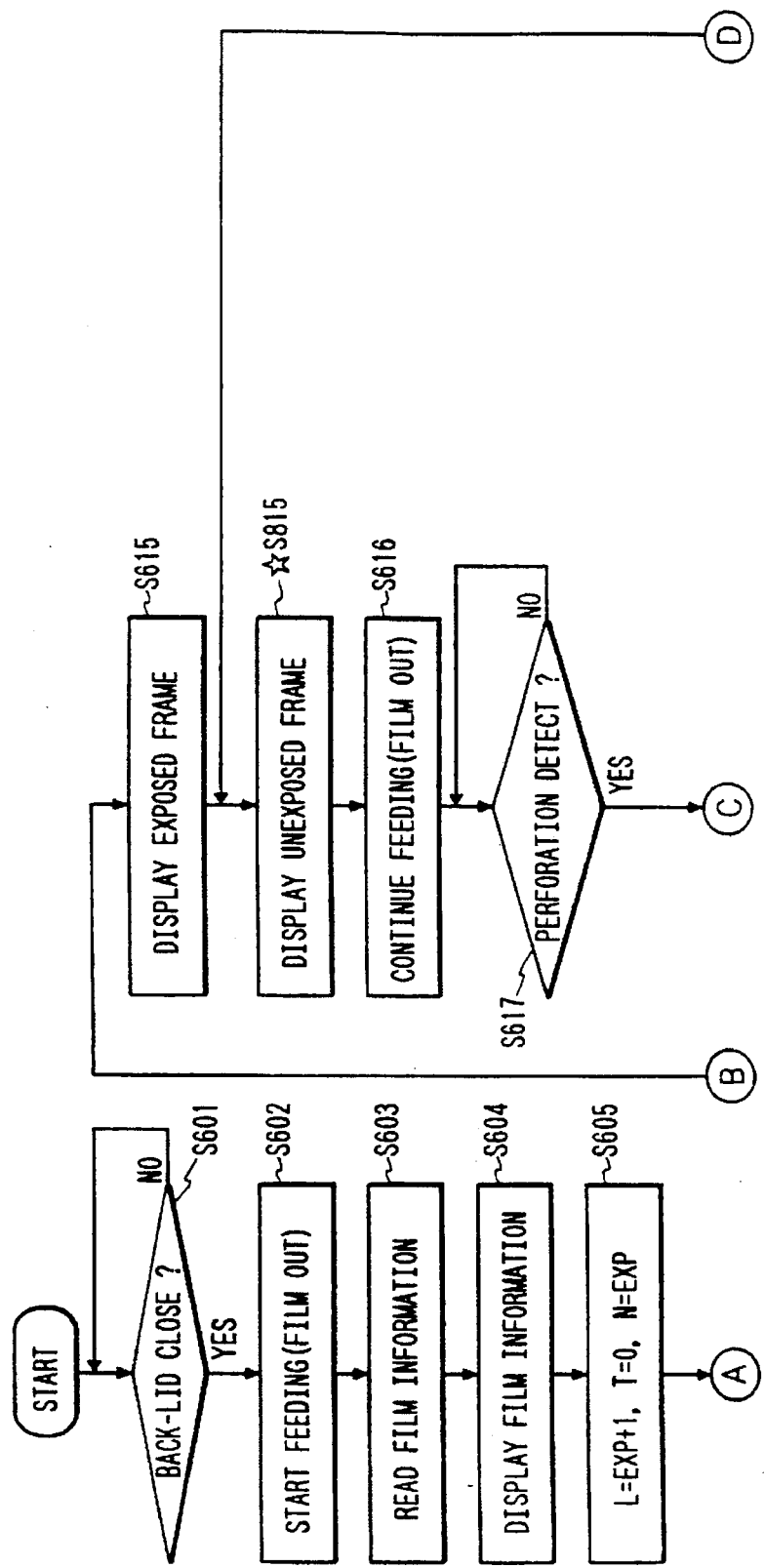

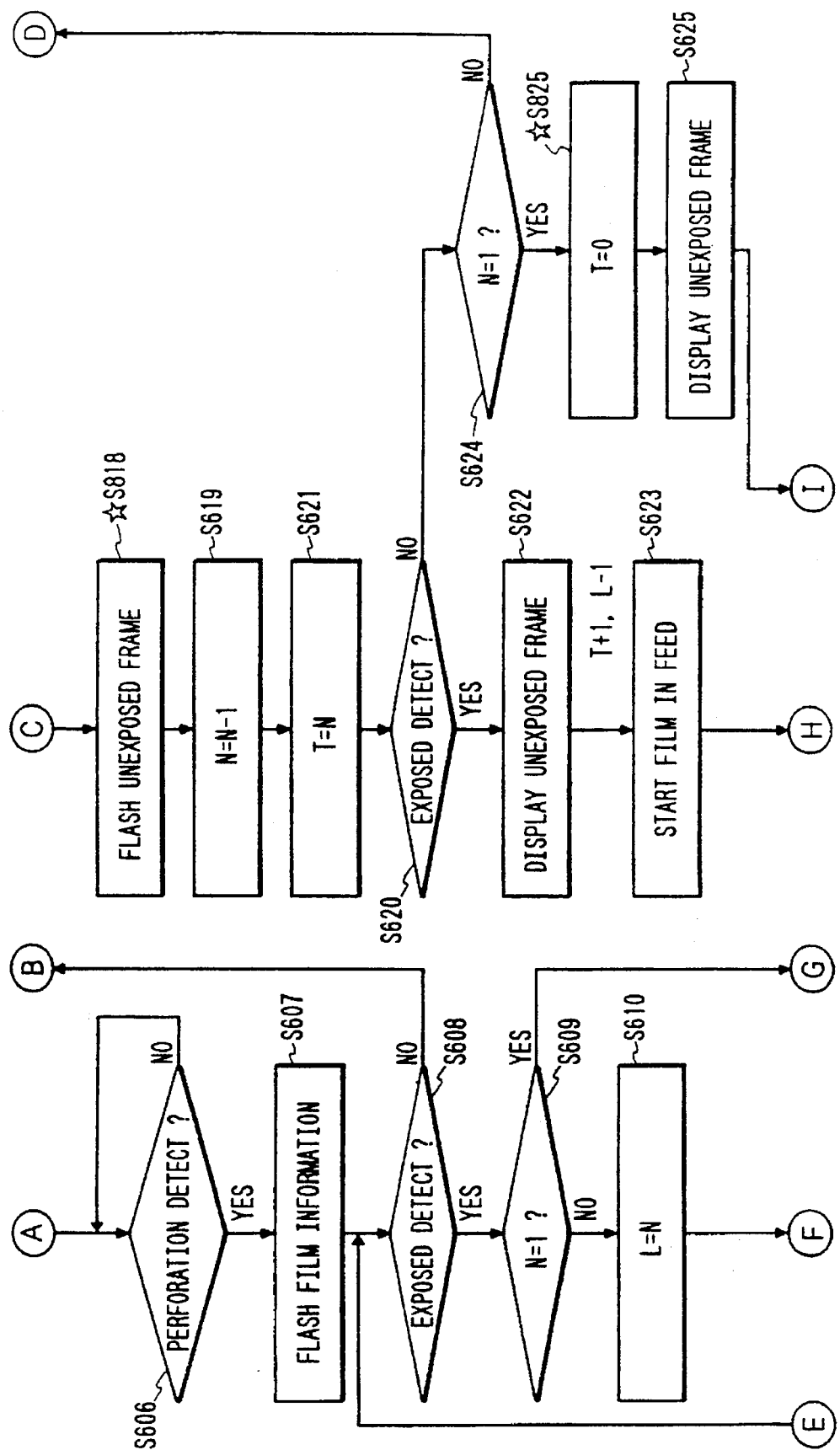

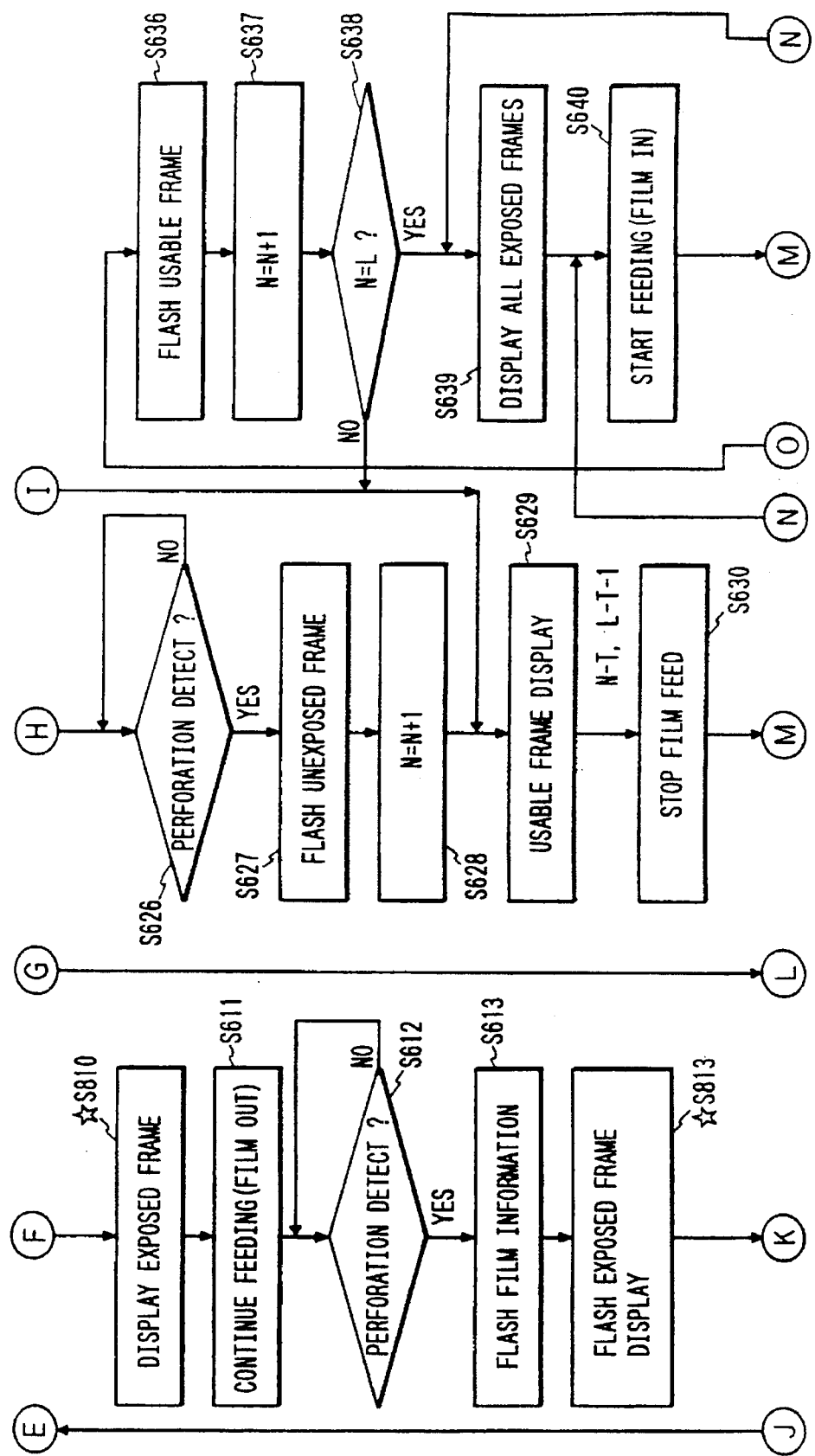

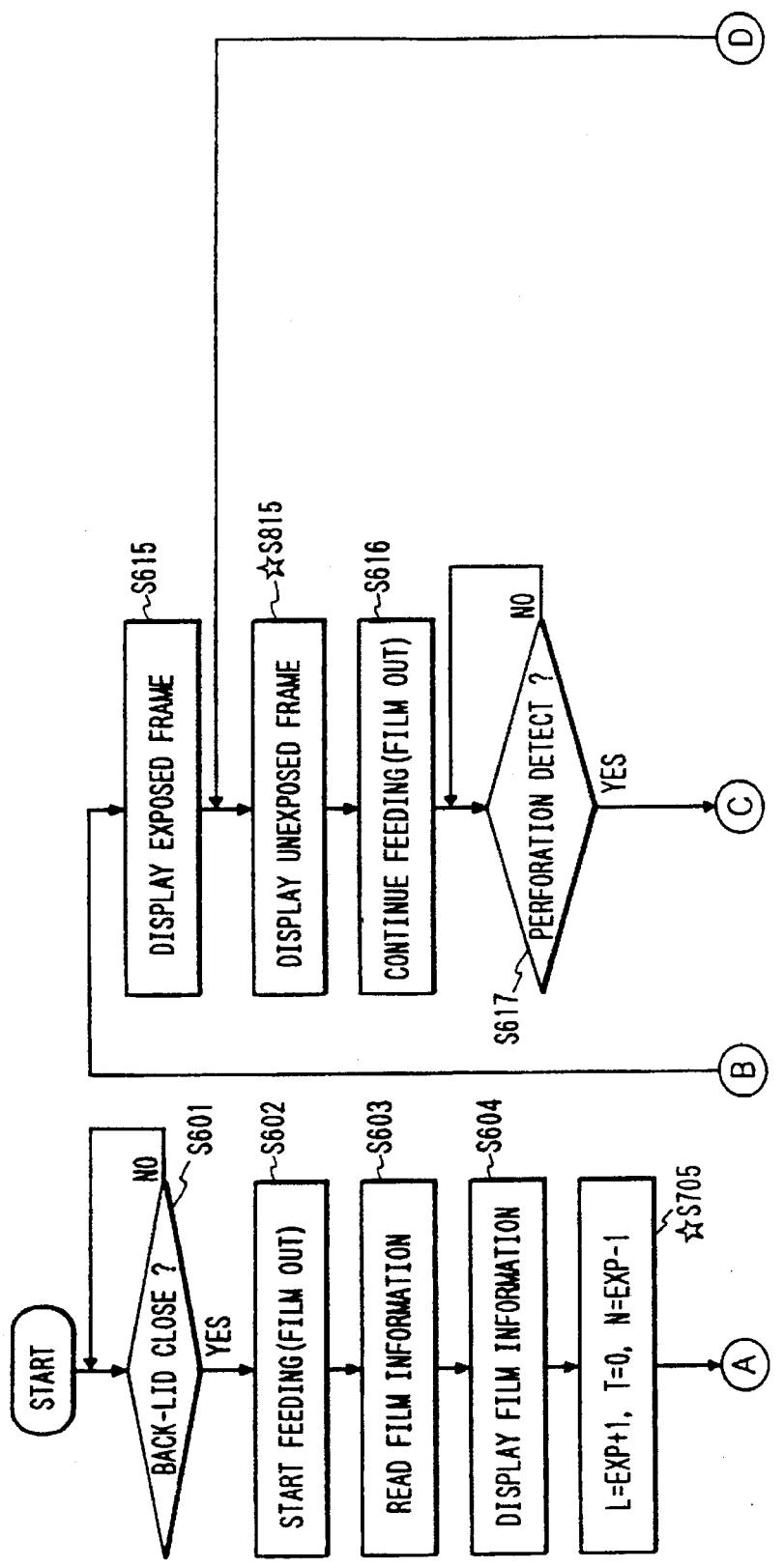

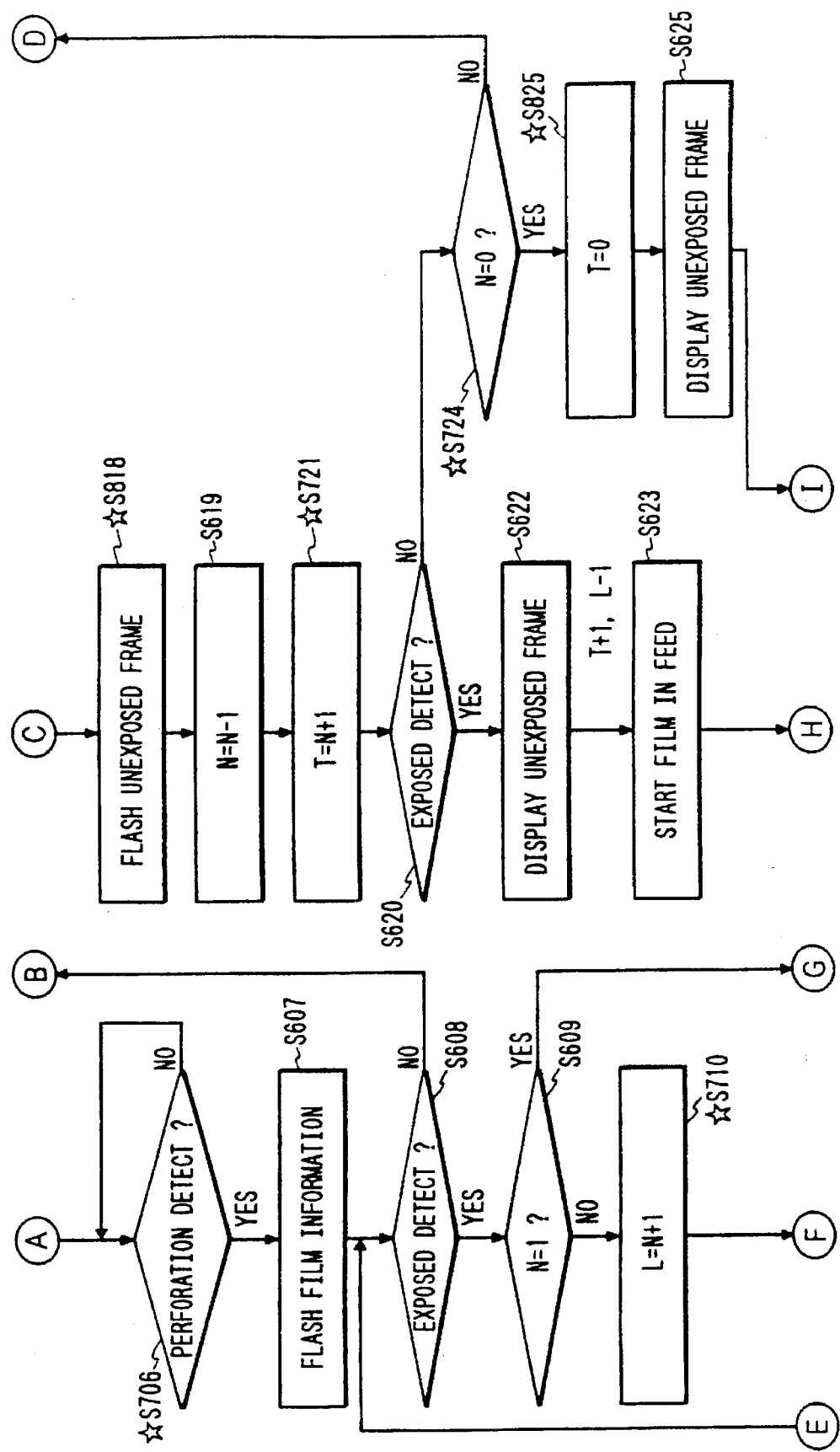

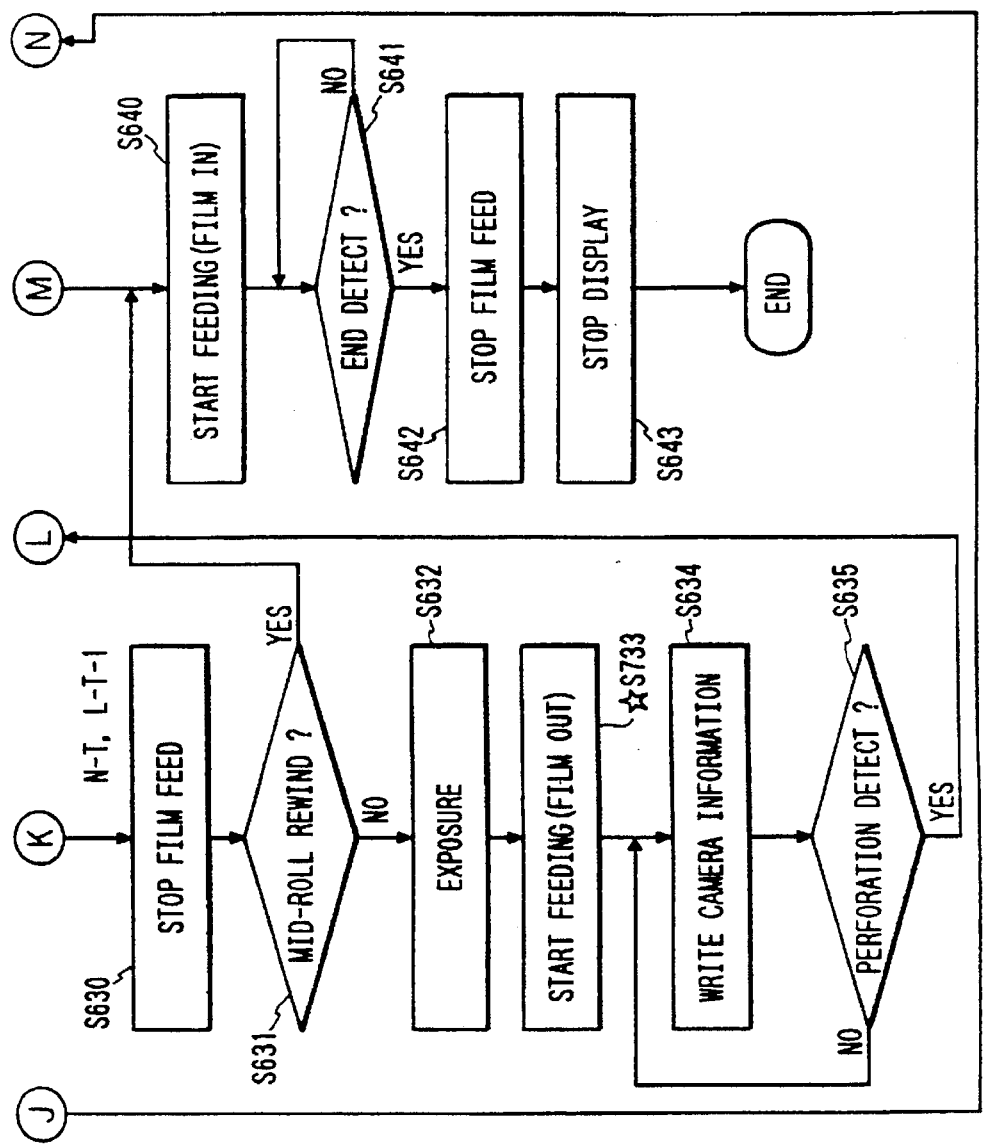

MAGNETIC RECORD CAMERA

This application is a continuation of application Ser. No. 08/073,071 filed Jun. 8, 1993 now abandoned.

BACKGROUND OF THE INVENTION

1. Field of the Invention

The present invention relates to a camera having a mid roll interrupt (MRI) function (function to rewind a film midway in use and reload it for further use).

2. Related Background Art

There is such a camera recently proposed for example in U.S. Pat. No. 4,864,332 that, in use of a film having a magnetic record portion, information, for example a date of year, month, and day, a shutter speed, an aperture value, etc., is written by a magnetic head in the magnetic record portion, and that the written information can be read with necessity or that the information such as ISO and the number of frames in film, which was originally written, can be read out. Regarding the details of recording method of magnetic information, WO 90-04204 discloses that ID's (identifications) different from each other are provided for respective information pieces in magnetic information, and WO 90-04225 does an example to put an end mark after data.

Also, U.S. Pat. No. 4,878,075 disclosed a camera using a film cartridge enclosing even the tip end of film, which permits mid-roll rewinding (midway unloading) of film and reloading of film cartridge for further use.

In the proposal in the patent, the film is provided with a magnetic record portion of a transparent magnetic layer. The camera has a magnetic head for writing information into the magnetic record portion or for reading information preliminarily recorded in the magnetic record portion. When a film cartridge which was rewound midway is reloaded, it is judged by either of the following methods whether each frame is exposed or unexposed.

(i) Specific information is recorded for a photographed (or exposed) frame. The specific information is used to as an exposed flag, which will be referred to as a DEP flag (Double Exposure Prevention encodement). The magnetic head reads presence or absence of DEP flag upon reloading of the cartridge. A frame with DEP flag is judged as an "exposed" frame.

(ii) Film information is preliminarily recorded on film. The camera produces a DEP flag by overwriting specific information on the initial information for each photographed frame or by simply erasing the initial film information. The magnetic head reads presence or absence of DEP flag upon reloading of the cartridge. A frame with DEP flag is judged as an "exposed" frame.

The above techniques are disclosed in the U.S. Patent.

The above U.S. Patent further discloses a sequence of from the film winding through the exposed frame detection to the unexposed frame positioning, executed upon reloading the cartridge.

Assignee of the present invention filed Japanese Patent Application No. 2-297828, which discloses an improvement of judging method of whether each frame is exposed or unexposed with the following technology. Information, e.g. ISO, the number of photographic frames, etc., is preliminarily recorded in a magnetic track on a film, and the camera is arranged to overwrite camera information on the original information after exposure of each frame. Further, the film has a set of film information pieces preliminarily written in a magnetic record portion of each frame. The camera is provided in its exposure state judging means with comparing means for comparing a predetermined number with the set number of film information pieces left as written in the magnetic record portion of a frame positioned by frame positioning means when the film cartridge storing a film midway used is reloaded, and with judging means for judging the frame to be an exposed frame when the comparing means presents a comparison result that the number of film information pieces is not more than the predetermined number, whereby a frame is judged to be exposed when the set number of film information pieces is not more than the predetermined number. (In such an arrangement, there is no possibility to judge an exposed frame as unexposed, though there is a possibility to judge an unexposed frame as exposed.)

The cameras enabling the midway unloading and reloading of film as described in the above conventional examples, however, had the following disadvantages: in case that a film was set and exposed in two cameras having different film winding methods (e.g., normal wind and prewind) and that the film is reloaded, unexposed frames cannot be in position or a correspondence would be lost between the taking order and the frame number on film, thereby making it difficult for a user to know the photographed order (exposure sequence) on the developed negative.

Further, it is not assumed in the above conventional examples that an error is caused in production of DEP flag for exposed frame or in writing the camera information. Since only a border is detected between an exposed frame and an unexposed frame, double exposure may occur not only in the frame but also in following frames starting from the error frame. Such double exposure cannot be prevented in the conventional examples, which was another disadvantage.

In addition, the conventional examples disclose no technique about display of information on how much a film loaded in the camera is exposed or unexposed, nor other information about film.

SUMMARY OF THE INVENTION

The present invention has been accomplished taking the above circumstances into account, and an object thereof is to provide a camera which can perform positioning of unexposed frame even when a film exposed midway in cameras different in film feed method is reloaded.

In one aspect of the invention, achieving the above object, control means is provided for such a control that when a film is loaded in a camera the film is successively fed out of a film cartridge; information recorded in a magnetic record portion of each frame is read out to judge whether the each frame is exposed or unexposed; a first unexposed frame on the leader end or side of film and a first exposed frame on the trailer side are searched; and in photography, exposure is started from the first unexposed frame on the leader side of film or from a frame next on the leader side to the first exposed frame on the trailer end or side.

In one aspect of the invention, achieving the above object, a calculation circuit is provided for calculating an exposure sequence for each of unexposed frames being to be successively exposed, based on the information of the first unexposed frame on the leader side and the information of the first exposed frame on the trailer side, which calculates the exposure sequence and an exposed frame number of each unexposed frame to record them in each frame upon photography, whereby a correspondence is set between the exposure sequence and the frame number.

In one aspect of the invention, achieving the above object, a camera is provided with a display of a total number of unexposed frames or numbers of unexposed frames, based on the information of the first unexposed frame on the leader side and the information of the first exposed frame on the trailer side.

In one aspect of the invention, achieving the above object, a camera is provided, which can judge whether erroneous writing is present in information for exposed frames, based on the judgement result of the judging circuit about whether each frame is unexposed or exposed.

The object of the present invention will be more apparent from the embodiments which will be described referring to the accompanying drawings.

DESCRIPTION OF THE PREFERRED EMBODIMENTS

FIG. 1 to FIG. 4E show the first embodiment according to the present invention.

Figure 1:
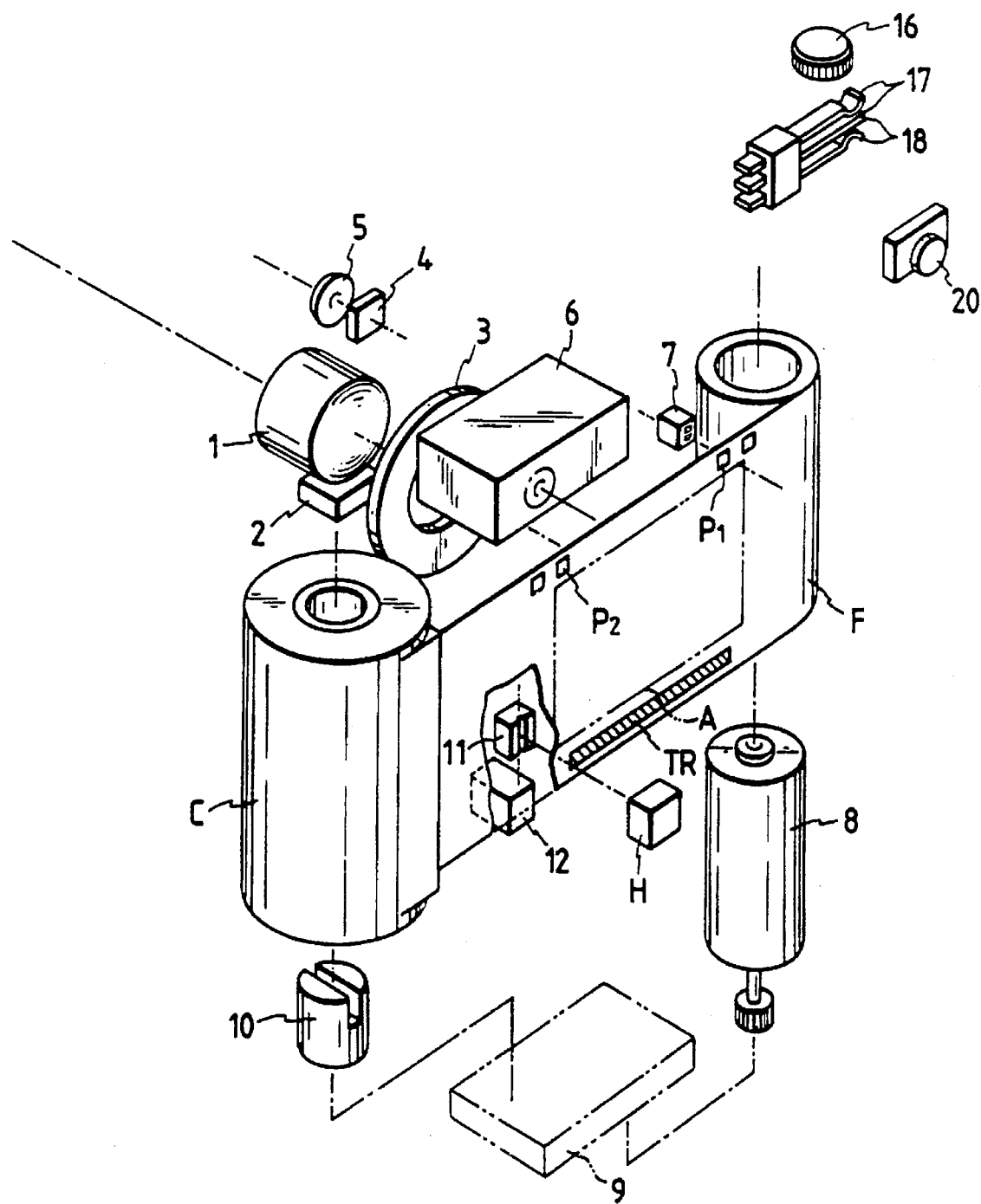
FIG. 1 is a perspective view to show the mechanical structure of a camera in the first embodiment of the present invention.

FIG. 1 is a perspective view to show the main structure of the camera. In FIG. 1, reference numeral 1 designates a photographic lens, 2 a lens actuator for driving the photographic lens 1 and a lens encoder for generating a lens position signal, 3 a lens shutter, 4 a photometric sensor for automatic exposure (AE), 5 a lens for determining a sensitive angle of the photometric sensor 4, 6 a block containing a distance measuring sensor and a finder, 7 a photoreflector for detecting perforations $P_1$, $P_2$ of a film F to generate a signal for setting a frame in film F in position, 8 a film feed motor located in a spool, 9 a gear train for speed reduction and for switch between winding and rewinding, and 10 a rewinding fork.

Capital letter C denotes a film cartridge storing the film, F the film provided with a magnetic record portion (magnetic track TR) on the base side, $P_1$ and $P_2$ the perforations corresponding to a photographic frame A, and H a magnetic head for writing information in the magnetic record portion TR on the film F or for reading the information out of the magnetic record portion. Numeral 11 represents a pad for pressing the film F against the magnetic head H, which has a recess for enhancing adherence between the film F and a head gap in the central portion. Numeral 12 denotes a pad position control mechanism for urging the pad 11 against the magnetic head under a certain pressure with the film F in between only during film feed. Numeral 16 designates a release button, 17 a switch (SW 1) for starting photometry and distance measurement, 18 a switch (SW 2) for starting a sequence of shutter opening and film feed, and 20 a rewind switch for midroll rewinding.

Figure 2:
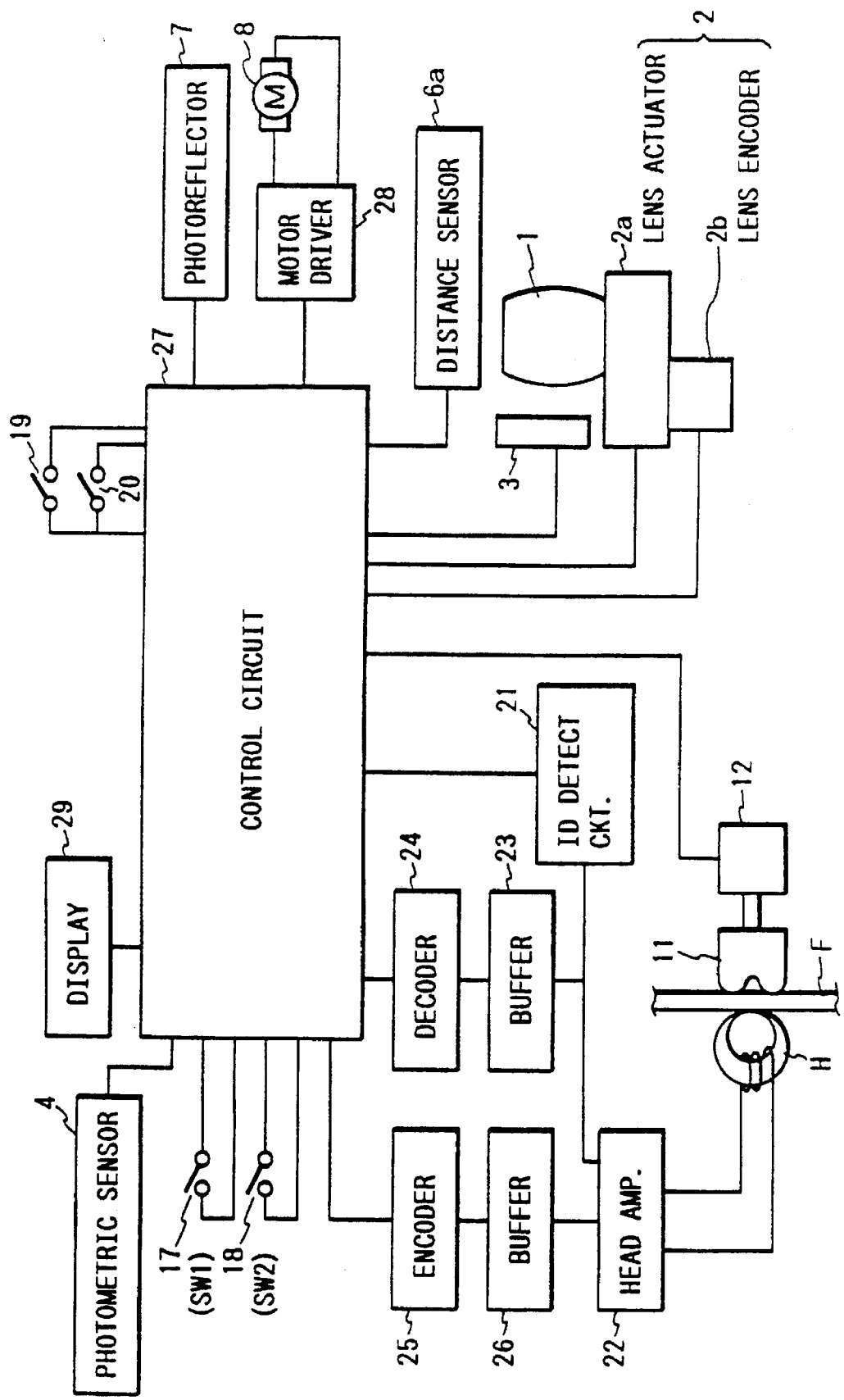
FIG. 2 is a circuit block diagram of the camera of the present invention.

FIG. 2 is a circuit block diagram of the camera to show portions related to the present invention, and the same portions are denoted by the same numerals as in FIG. 1.

In FIG. 2, numeral 19 designates a back lid switch for detecting closure of a back lid, 21 an ID detection circuit for detecting ID sentinels in film information, 22 a head amp for the magnetic head H, 23 a buffer, 24 a decoder, 25 an encoder, 26 a buffer, 27 a control circuit composed mainly of a microcomputer for executing the sequence control of circuits, 28 a motor driver for driving the film feed motor 8, and 29 a display composed of a display circuit and a display device.

An operation of the control circuit 27 is now described with the flowcharts of FIGS. 3A to 3D. It is assumed that the camera in the present embodiment is of a so-called prewind type in which the film F is entirely wound once and then rewound one by one after each exposure. It is also assumed that the frame number on the film F is counted from the film cartridge side to increase in order, for example 1, 2, 3 . . . , and the frame number at the film leader end coincides with the maximum, which is opposite to the ordinary counting order. This order of frame number will be commonly employed in all the following embodiments.

When a film cartridge C is loaded in the camera and when the back lid is closed to turn on the back lid switch 19, the flow proceeds from Step 101 (abbreviated as S101 in FIG. 3A) to Step 102, where the film feed motor 8 is driven through the motor driver 28 to start winding the entire film F. Then at Step 103, on the way of film winding, the magnetic head H reads out the film information such as the film speed, the number of frames, and the type of film, which is recorded as a line of data characters starting with ID sentinels (information start signal) on the magnetic track TR of film F.

The thus read-out film information is amplified and converted from analog to digital by the head amp 22, the amplified signal is transferred to the buffer 23, and thereafter the signal is decoded by the decoder 24 to be transferred to the control circuit 27.

Also at this Step 103, the ID detection circuit 21 continues detecting ID sentinels of N bits (for example "10000000") in film information, and the control circuit 27 receives this detection output while counting.

Figure 4A:
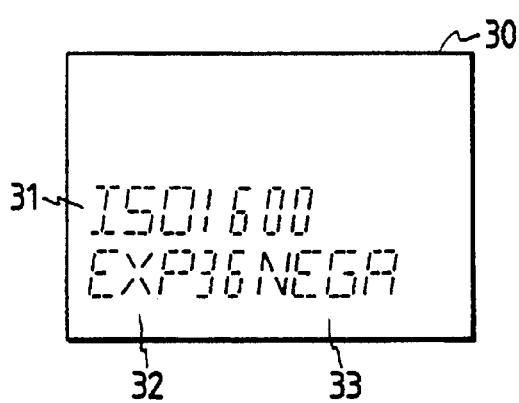
FIGS. 4A to 4E are drawings to show a display state in the present invention.

At Step 104 the film information read at Step 103 is indicated on the display 29 (see FIG. 4A). In FIG. 4A reference numeral 30 represents a display device such as a liquid crystal display plate, 31 an indication of film speed, 32 an indication of number of frames in film, and 33 an indication of type of film. At Step 105 the control circuit 27 puts values of L=EXP+1, T=0, and N=EXP in internal registers. L represents the frame number of leader portion, EXP the number in film read at Step 103, T the frame number of trailer portion, and N a frame number of a frame located at camera aperture. Then the control circuit 27 detects a perforation detection signal from the photoreflector 7 (Step 106). Further, the indication of film information presently displayed is flashed to indicate that the film F is under feed (Step 107). A user of camera may identify by this change of indication that the film F is exposable for example on the 36th frame.

The number of ID sentinels of film information as described above is then compared with a predetermined number, for example 8, which is a threshold value to determine whether a frame is "exposed" or not. If a frame is judged as "exposed" (if ID sentinel number≦predetermined number), the flow goes to Step 109. Unless a frame is "exposed" (if ID sentinel number>predetermined number) the flow goes to Step 115 (Step 108). A plurality of ID sentinels each of N bits of film information are recorded for each frame, and a predetermined number out of the plurality of ID sentinels preliminarily recorded are erased upon exposure, whereby it may be judged in the above judgment step whether a frame is exposed or not. At Step 109 it is judged whether N=1. If N=1, all the frames are exposed and then the flow goes to Step 139. Unless N=1, an unexposed frame possibly exists in the film, and then the flow goes to Step 110.

Suppose frames on the leader end or side on film F were already exposed from the last frame on the leader side (for example the 36th frame) up to the N-th frame (for example the 21st frame). Then Steps 108–114 are carried out before N becomes 20. The respective steps are as follows. The value of N is put into L (Step 110). The feed of film F is continued in the direction to pull out the film F from the cartridge C (Step 111). The perforations of film F are next detected in the same manner as at Step 106 (Step 112). After that, the indication of film information presently displayed is flashed to indicate that the film is under feed, in the same manner as at Step 107 (Step 113). Since it is detected at Step 112 that the film F is fed by a frame in the pull out direction from the cartridge C, N is decreased by one (Step 114).

Figure 4D:
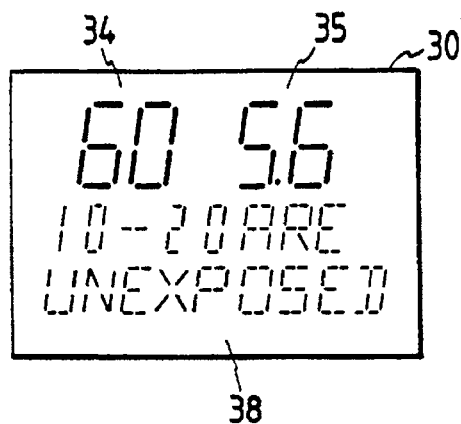
Figure 4B:
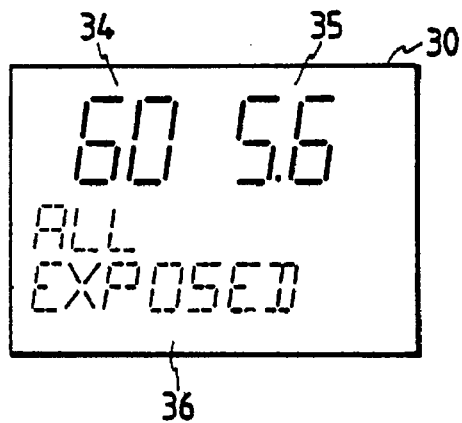
Figure 4E:
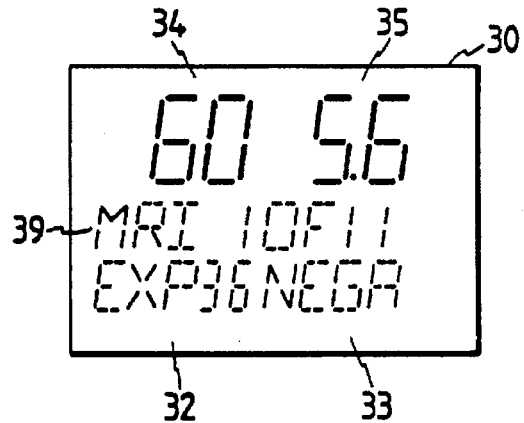
Figure 4C:
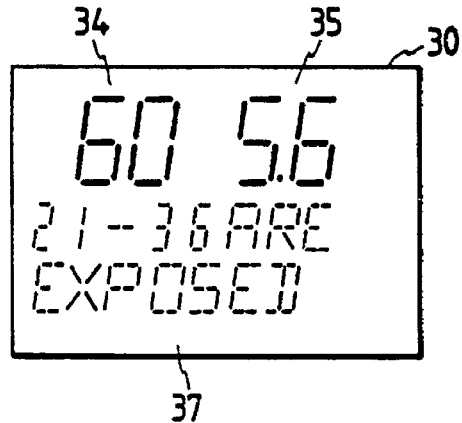

In contrast, if it is judged at Step 108 that the frame is not "exposed" (if ID sentinel number>predetermined number), the number of exposed frames on the leader side on film F is indicated (Step 115). In the above example the 36th frame to the 21st frame are exposed, and then L=21 and EXP=36. Thus, the exposed frames are between L and EXP, so that the indication is as shown in FIG. 4C as L=21 and EXP=36. In FIG. 4C numeral 34 represents an indication of shutter speed of camera, 35 an indication of aperture value of camera, and 37 an indication of exposed frames to show that the 21st–36th frames are exposed. Then, the feed of film F is continued in the direction to pull out the film F from the cartridge C in the same manner as at Step 111 (Step 116), and the perforations of film F are detected in the same manner at Step 106 or 112 (Step 117). The indication of exposed frames presently displayed is flashed to indicate that the film F is under feed (Step 118). The user of camera may identify by this change of indication that the camera is in feeding the film F. Then, since the film F is fed by a frame at Step 117, N is decreased by one in the same manner as at Step 114 (Step 119). After that, it is detected in the same manner as at Step 108 whether the frame with frame number N is exposed (Step 120). If it is unexposed, the flow returns through Step 124 to Step 116 to detect whether a next frame is exposed or unexposed. If the frame with frame number N is exposed, the flow goes to Step 121 to substitute N into the number T of exposed frames on the trailer end or side on film F (Step 121).

Supposing frames of from the frame number 9 to 1 on the film are exposed, Steps 116–120 are repeated before N becomes 9. When N=9, the frame is exposed and the flow goes to Step 121 to set T=9.

Since the above procedure determined the leader side exposed frame number L and the trailer side exposed frame number T, unexposed frames on film F are indicated (Step 122). Frames of from the (T+1)-th to the (L−1)-th are unexposed. In case that T=9 and L=21, the indication is as shown in FIG. 4D. In FIG. 4D reference numeral 38 represents an indication of unexposed frames to show that the 10th–20th frames are unexposed. After the unexposed frame indication, the film F is reversely fed in the direction to rewind it into the cartridge C (Step 123). Steps 124 and 125 are carried out if there is no exposed frame on the trailer side of film F. If N=1 at Step 124 after an exposed frame is not detected at Step 120, there is no exposed frame on the trailer side. Unless N=1, there is a possibility that an exposed frame exists on the trailer side. Then the flow returns to Step 116 (Step 124). At Step 125 unexposed frames are indicated in the same manner as at Step 122. Since T=0, unexposed frames are from 1 to L−1 (Step 125). When the film F is fed in the rewind direction into the cartridge C, it is detected in the same manner as at Step 106, 112, or 117 that the film F is fed by one frame (Step 126). Then the indication of unexposed frames presently displayed is flashed to indicate that the film F is under feed (Step 127). Since it is detected at Step 126 that the film F is fed by one frame; N is increased by one (Step 128), and then the flow goes to Step 144. An exposure sequence is then calculated for a frame currently located at the exposure position (Step 144). Since the first exposable frame on the cartridge side is N at present, the order of the frame to be exposed this time may be calculated with the numbers of exposed frames on the leader side and the trailer side as EXP+N−L+1=26. This value is put into K, the information of K is encoded, the encoded data is transferred to the buffer 26, and then the flow goes to Step 129. Calculating N−T and L−T−1, the number of usable frames on film F is indicated. N−T represents the number of frames exposed after the film is loaded this time (Step 129).

L−T−1 represents the number of unexposed frames at the time of the present loading of film F. For example, if N=10, T=9, and L=21, the indication is as shown in FIG. 4E. In FIG. 4B numeral 39 denotes usable frames. This indicates "MRI" which is an abbreviation of Mid Roll Interrupt and "1 of 11" which is the number of usable frames. After that, the feed motor 8 is stopped through the motor driver 28 to stop the feed of film F (Step 130). It is then detected whether the rewind switch 20 for mid-roll rewind is on (Step 131). If it is on, the flow goes to Step 140 to rewind the film F into the cartridge. If it is off, the flow goes to Step 132.

At Step 132 it is judged whether the switch SW 1 is on. If it is on, the operations of photometry and distance measurement are carried out. The data such as the shutter speed and the aperture value obtained in the photometric operation and the distance measurement operation is then converted into camera information, and the converted data is transferred to the encoder 25. The encoder 25 encodes the camera information transferred thereto, and the buffer 26 stores the camera information. Further, it is judged whether the switch SW 2 is on. If it is on, the conventional exposure operation is carried out. In detail, the control circuit 27 receives a lens position signal from the lens encoder 2b through the lens actuator 2a, and when the photographic lens 1 reaches a position corresponding to the distance information the control circuit 27 supplies a stop command to the lens actuator 2a to stop the drive of photographic lens 1, or the focus operation. Almost at the same time, the open and close operation of shutter 3 is carried out with an output of the photometric sensor 4 for a certain time (Step 132).

After the open and close operation of shutter 3, the film feed motor 8 feeds the film F into the cartridge C (Step 133).

The magnetic head H is driven to write on the magnetic track TR of film F the camera information stored in the buffer 26 through the head amp 22 during the film feed in the form of a series of data characters starting with ID sentinels of N bits (for example "00000000") different from the ID sentinels preliminarily recorded as film information (Step 134). The data stored in the buffer contains the exposure sequence information K, which is thus recorded for each frame. Upon detection of next perforations the writing of data at Step 134 is stopped (Step 135).

Then the usable frame indication is flashed to inform the user of camera that the next perforations are detected at Step 135 (Step 136). Since the perforations are detected at Step 135, the film F is fed by one frame and N is thus increased by one (Step 137). It is then detected whether N becomes equal to L, which represents the leader side exposed frame (Step 138). If N=L, all frames are exposed, and then the flow goes to Step 139. Unless N=L, there remains an unexposed frame, and the flow returns to Step 144 to carry out the exposure operation.

Since all frames are exposed at Step 139, an all-frames-exposed indication is given as shown in FIG. 4B. In FIG. 4B numeral 36 represents an indication of "ALL EXPOSED," that is, the all-frames-exposed indication.

After that, the motor 8 feeds the film F into the cartridge C (Step 140). The perforation detecting photoreflector 7 detects the state immediately before the film F is fully rewound into the cartridge C (Step 141), and after a certain time elapsed it is judged that the film F is stored in the cartridge C. The film feed motor 8 is stopped (Step 142). Then the indication on the indication plate 30 of display 29 is turned off (Step 143).

It should be noted, though not described above, that not only in the present embodiment but also in the following embodiments the pad 11 is urged against the magnetic head H by the pad position control mechanism 12 only during movement of film F to make the reading and writing of magnetic information certain.

Figure 5:
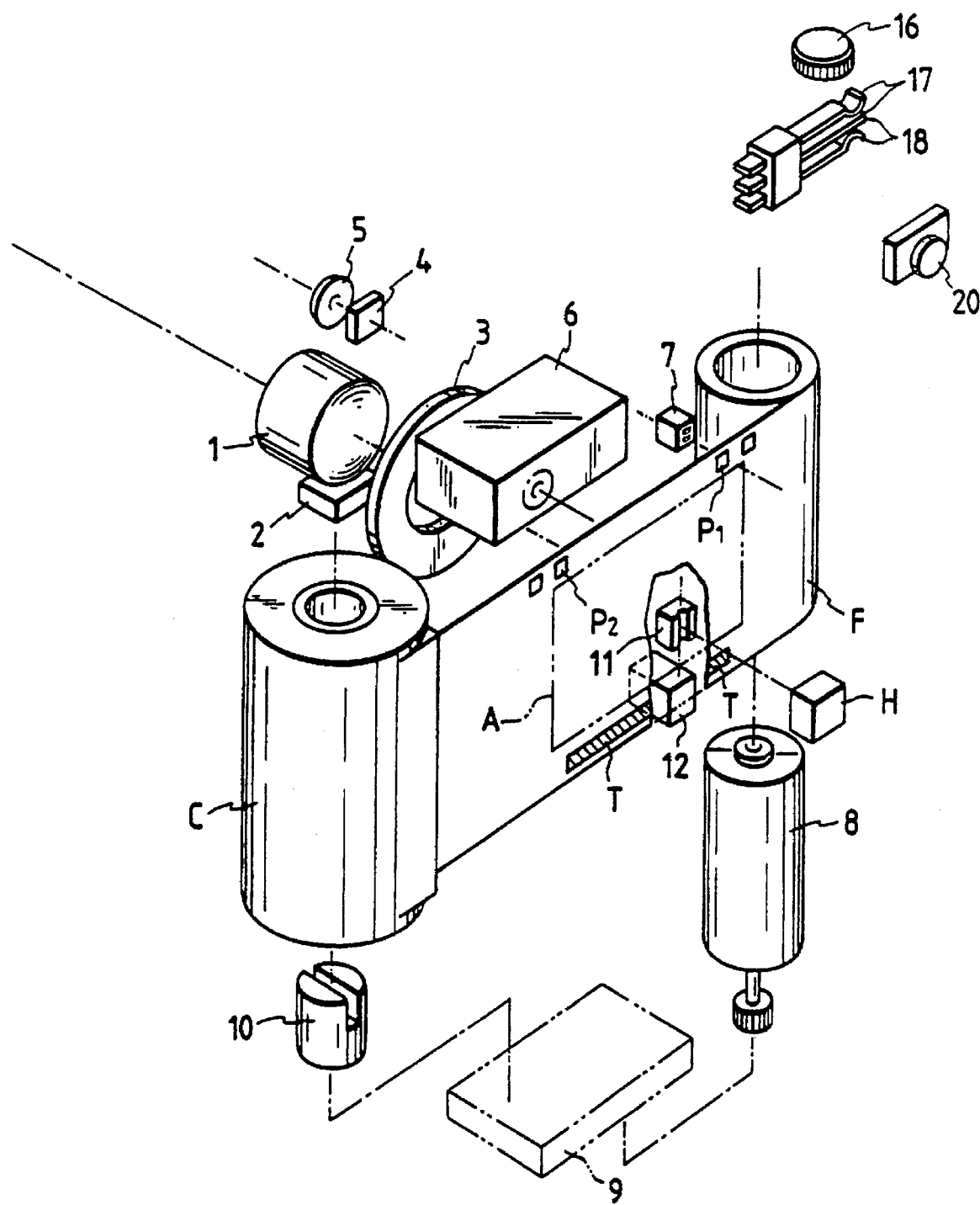
FIG. 5 is a perspective view to show the mechanical structure of a camera in the second embodiment of the present invention.
Figure 6B:
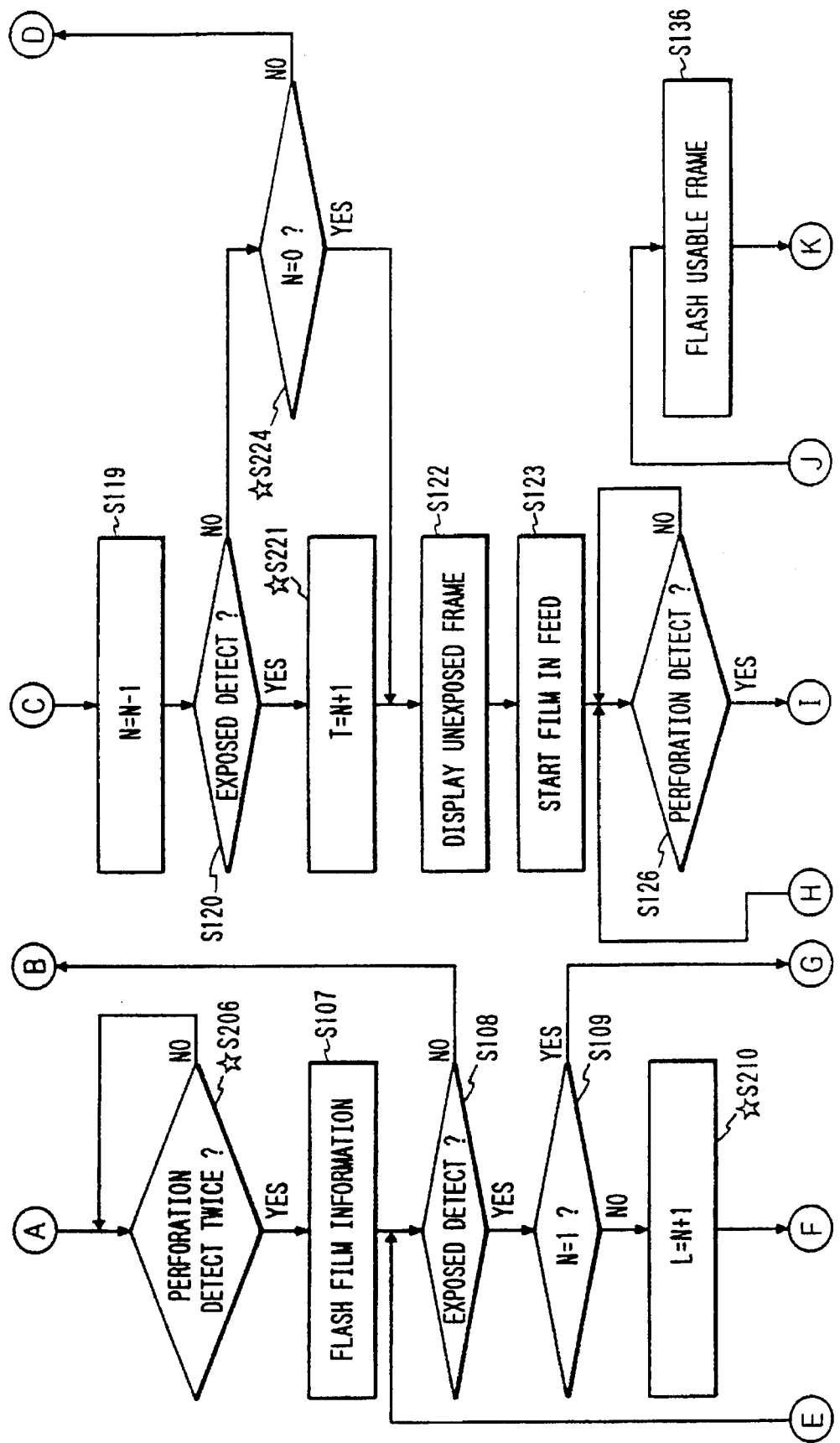
FIG. 6, consisted of FIGS. 6A to 6D, is a flowchart to show an operation of a control circuit in the second embodiment of the present invention.
Figure 6C:
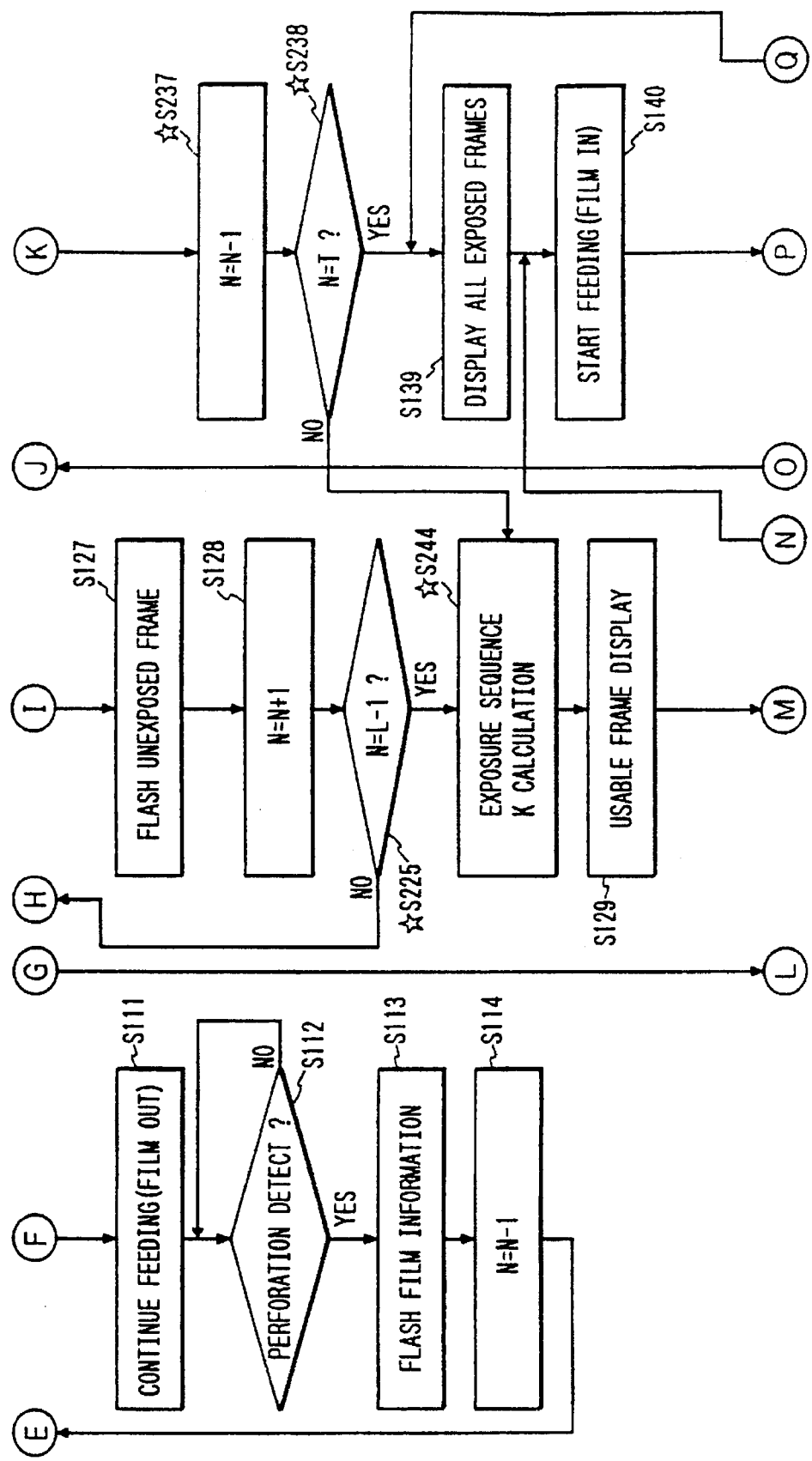

FIGS. 5 to 6D are drawings to show the second embodiment of the present invention. The above embodiment showed the prewind camera, whereas the second embodiment shows a normal wind camera which starts the exposure of film F from the leader side of film F.

FIG. 5 corresponds to FIG. 1 and shows the normal wind camera different from the prewind camera in that the magnetic head H, the pad 11, and the pad position control mechanism 12 are disposed on the opposite side to the side in the prewind camera with respect to the camera aperture, because the film F is fed out of the cartridge C after exposure.

FIGS. 6A to 6D are flowcharts corresponding to those of FIGS. 3A to 3D, in which different steps from those in FIGS. 3A to 3D are marked with star ahead and in which the same steps as those in FIGS. 3A to 3D are denoted by the same step numbers but different steps by numerals of 200's.

The different steps from those in FIGS. 3A to 3D are now described.

The control circuit 27 puts L=EXP+1, T=0, and N=EXP−1 in the internal registers (Step 205).

They are different from the embodiment of FIGS. 1 to 3D due to the difference of position of magnetic head H. At Step 206 the perforations are detected twice. This is also because the position of magnetic head H is different from that in the prewind camera. Further, at Step 210 N+1 is substituted into L. This is again because of the difference of position of magnetic head H. Then at Step 221 N+1 is substituted into T. This is because of the difference of position of magnetic head H too. At Step 224 it is detected whether N=0. This is because it cannot be detected whether all frames on the trailer side of film F are exposed, before N is reduced down to 0 due to the position of magnetic head H. Further at Step 225 the film F is rewound until N becomes L−1, because the film F must be returned to the leader side in case of the normal wind camera after detection of exposed frames on the leader side and on the trailer side. Unless N=L−1 the flow returns to Step 126. If N=L−1 the flow goes to Step 244.

At Step 233 the film F is fed out of the cartridge C after exposure in case of the normal wind camera. Also at Step 237, since the perforations are detected at Step 135 and the film F is fed by one frame, N is decreased by one. At Step 238 it is detected whether N=T. If N=T all frames are exposed, and then the flow goes to Step 139. Unless N=T there remains an unexposed frame, and the flow returns to Step 129.

At Step 244 the exposure sequence K is calculated. Since the presently set frame is an unexposed frame closest to the leader portion, K=EXP+T+1−N. K is encoded and transferred to the buffer 26, and then the flow goes to Step 129.

Figure 7C:
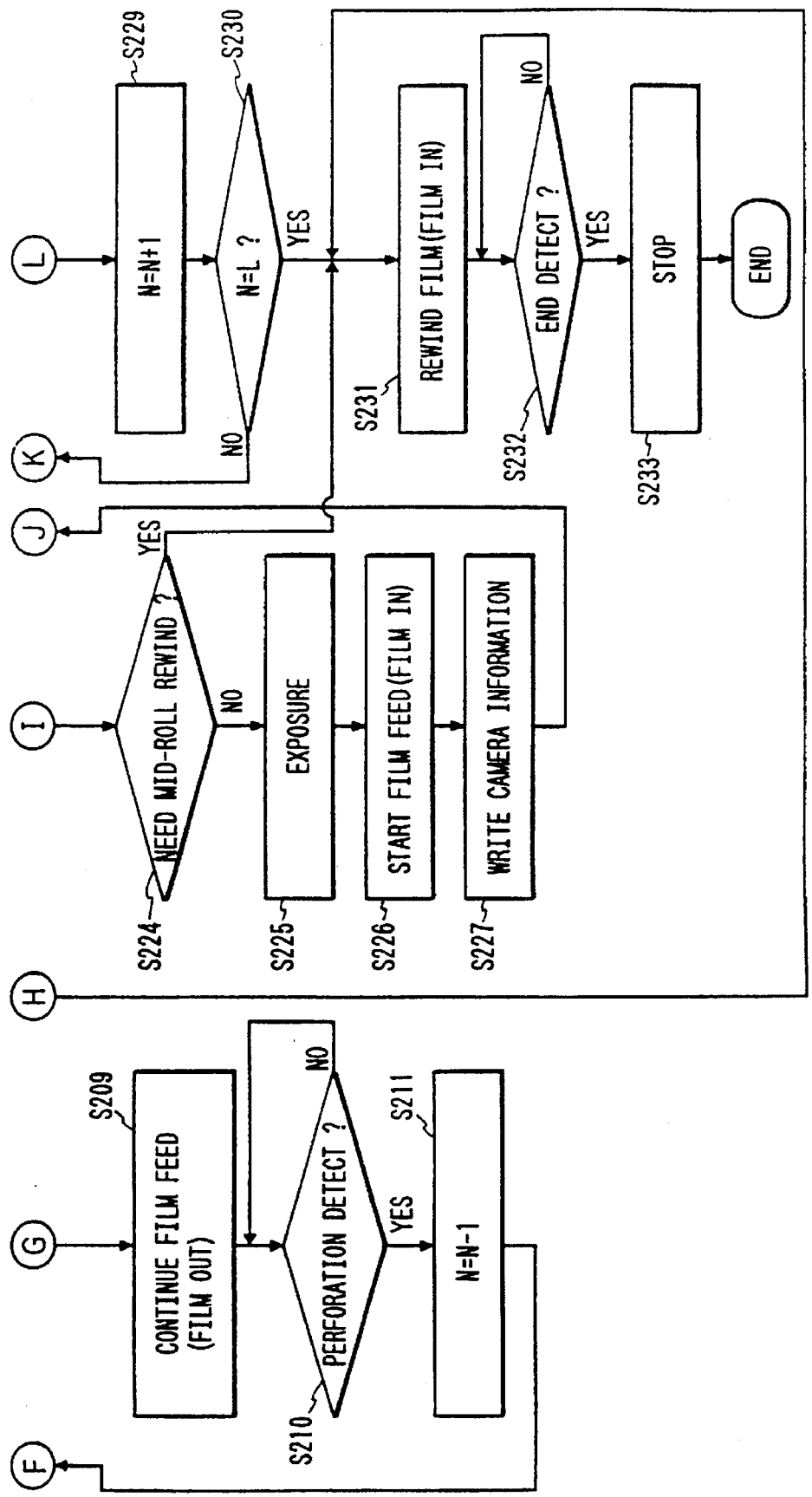
FIG. 7, consisted of FIGS. 7A to 7C, is a flowchart to show an operation of a control circuit in the third embodiment of the present invention.

FIGS. 7A to 7C are flowcharts to show the third embodiment of the present invention. In the present embodiment, the structure of camera is the same as that in FIGS. 1 and 2 except that the display 29 is omitted. An operation will be described with the flowcharts of FIGS. 7A to 7C, based on the operation of control circuit 27 as shown in FIG. 2. It is assumed in the present embodiment that the camera is of the so-called prewind type in which after the film F is entirely wound once up to the end the film is rewound one by one after exposure of each frame. It is also assumed that the frame number on film F sequentially increases from the film cartridge side as 1, 2, 3 . . . , and the end frame on the film leader side coincides with the maximum number, which is opposite to the ordinary order.

When the film cartridge C is loaded in the camera and the back lid is closed to turn on the back lid switch 19, the flow proceeds from Step 201 to Step 202, where the film feed motor 8 is driven through the motor driver 28 to start winding all the film F. At Step 203, during the winding of film, the magnetic head H reads the film information such as the film speed, the number of frames, and the type of film recorded in the magnetic track T of film F as a line of data characters starting with ID sentinels (information start signal).

This read film information is amplified and converted from analog to digital by the head amp 22, then transferred to the buffer 23, decoded by the decoder 24, and transferred to the control circuit 27.

At Step 203 the ID detection circuit 21 continues detecting ID sentinels of N bits (for example "10000000") of film information, and the control circuit 27 receives the detection output thereof while counting.

Then the control circuit 27 detects a perforation detection signal from the photoreflector 7 (Step 205).

Further, the number of ID sentinels of film information is compared with a predetermined number, for example 8, which is a threshold value to determine whether a frame is "exposed" or not. If it is judged that a frame is "exposed" (if ID sentinel number≦predetermined number), the flow goes to Step 207. If the frame is not "exposed" (if ID sentinel number>predetermined number), the flow goes to Step 212 (Step 206).

At Step 207 it is judged whether N=1. If N=1, all the frames are exposed and then the flow goes to Step 231. Unless N=1, there is a possibility that an unexposed frame exists, and then the flow goes to Step 208.

Since frames up to the N-th frame are exposed on the leader side on film F, the value of N is substituted into L (Step 208). Namely, a frame with frame number under execution of Step 208 is "exposed," so that the value of L becomes the frame number of the exposed frame. Thus, frames of from L to EXP are exposed.

Further, the feed of film F is continued in the direction to pull out the film F from the cartridge C (Step 209). At Step 210 the perforations of film F are detected in the same manner as at Step 205. When the perforations are detected at Step 210 to confirm that the film F is fed by one frame out of the cartridge C, N is reduced by one (Step 211). By the above procedure, all exposed frames on the leader side of film are fed, so that the smallest number N out of the frame numbers of exposed frames is input into L.

On the other hand, if an unexposed frame is detected at Step 206, the feed of film F is continued at Step 212 in the direction to pull the film F out of the cartridge C in the same manner as at Step 209. Then at Step 213 the perforations of film F are detected in the same manner as at Step 205 or 210.

After the film F is fed by one frame at Step 217 in the same manner as at Step 211, N is decreased by one (Step 214).

It is next detected in the same manner as at Step 206 whether the frame with frame number N is exposed. If it is unexposed then the flow returns through Step 220 to Step 212 to detect whether a next frame is exposed or unexposed. If the frame with frame number N is exposed then the flow goes to Step 216 (Step 215).

The frame number N of current exposed frame is subtracted from the leader side final exposed frame L to obtain the number of successive unexposed frames between them, and the number is compared with a predetermined number M. If the number is less than M, it is supposed that there is an accidental error in writing between L and N, and the flow goes to Step 217 for abnormal process. If the number is not less than M, it is supposed that the unexposed frames are correctly detected, and the flow goes to Step 218 for normal process (Step 216).

If an abnormal state is detected at Step 216, the frames detected as unexposed between L and N are ignored, and N is put into L (Step 217). After that, the flow returns through Step 220 to Step 212.

At Step 218 N is substituted into the frame number T of exposed frame on the trailer side on film F. T is the first frame number of exposed frame on the cartridge side, so that unexposed frames are (T+1) to (L−1).

The film is then rewound into the cartridge C (Step 219).

At above Step 220, if N=1, there is no exposed frame on the trailer side, and then the flow goes to Step 223.

At Step 221 it is detected in the same manner as at Step 105, 110, or 113 that the film F is rewound by one frame. Consequently, since the one frame feed of film F is detected, N is increased by one (Step 222).

After that, the feed motor 8 is stopped through the motor driver 28 to stop the feed of film F (Step 223). It is then detected whether the rewind switch 20 for mid-roll rewind is on (Step 224). If it is on, the flow goes to Step 231 to rewind the film F into the cartridge. If it is off then the flow goes to Step 225. At Step 225, similarly as in the operation of FIGS. 3A to 3D in the first embodiment, the film feed motor 8 feeds the film F into the cartridge C after the open and close operation of shutter 3 (Step 226).

Then, during the film feed, the magnetic head H is driven to write on the magnetic track T of film F the camera information stored in the buffer 26 through the head amp 22 in the form of a line of data characters starting with ID sentinels of N bits (for example "00000000") different from the ID sentinels of film information.

Then, the writing of data at Step 227 is stopped by detecting perforations (Step 228).

The perforations are detected at Step 228, which means that the film F is fed by one frame, and N is increased by one (Step 229). Further, it is detected whether N becomes equal to L, which is the exposed frame on the leader side (Step 230). If N=L, all frames are exposed and then the flow goes to Step 231. Unless N=L, there remains an unexposed frame and the flow returns to Step 223 to carry out the exposure operation.

If N=L the motor 8 feeds the film F into the cartridge C (Step 231). Then, the perforation detecting photoreflector 7 detects the state immediately before the film F is entirely rewound into the cartridge C; after a certain time elapsed it is determined that the film F is stored in the cartridge C (Step 232); and thereafter the film feed motor 8 is stopped (Step 233).

Figure 8B:
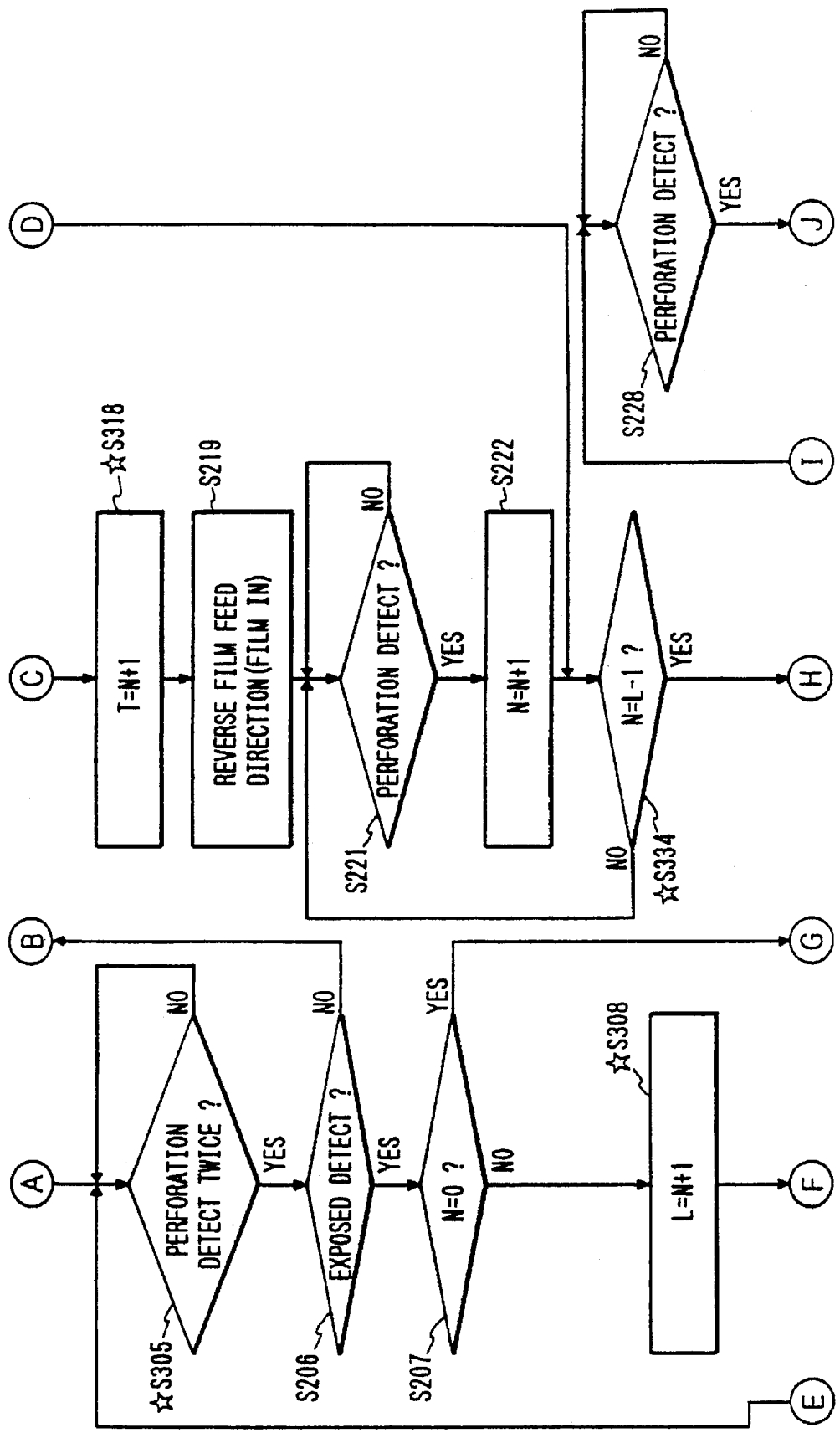
FIG. 8, consisted of FIGS. 8A to 8C, is a flowchart to show an operation of a control circuit in the fourth embodiment of the present invention.
Figure 8C:
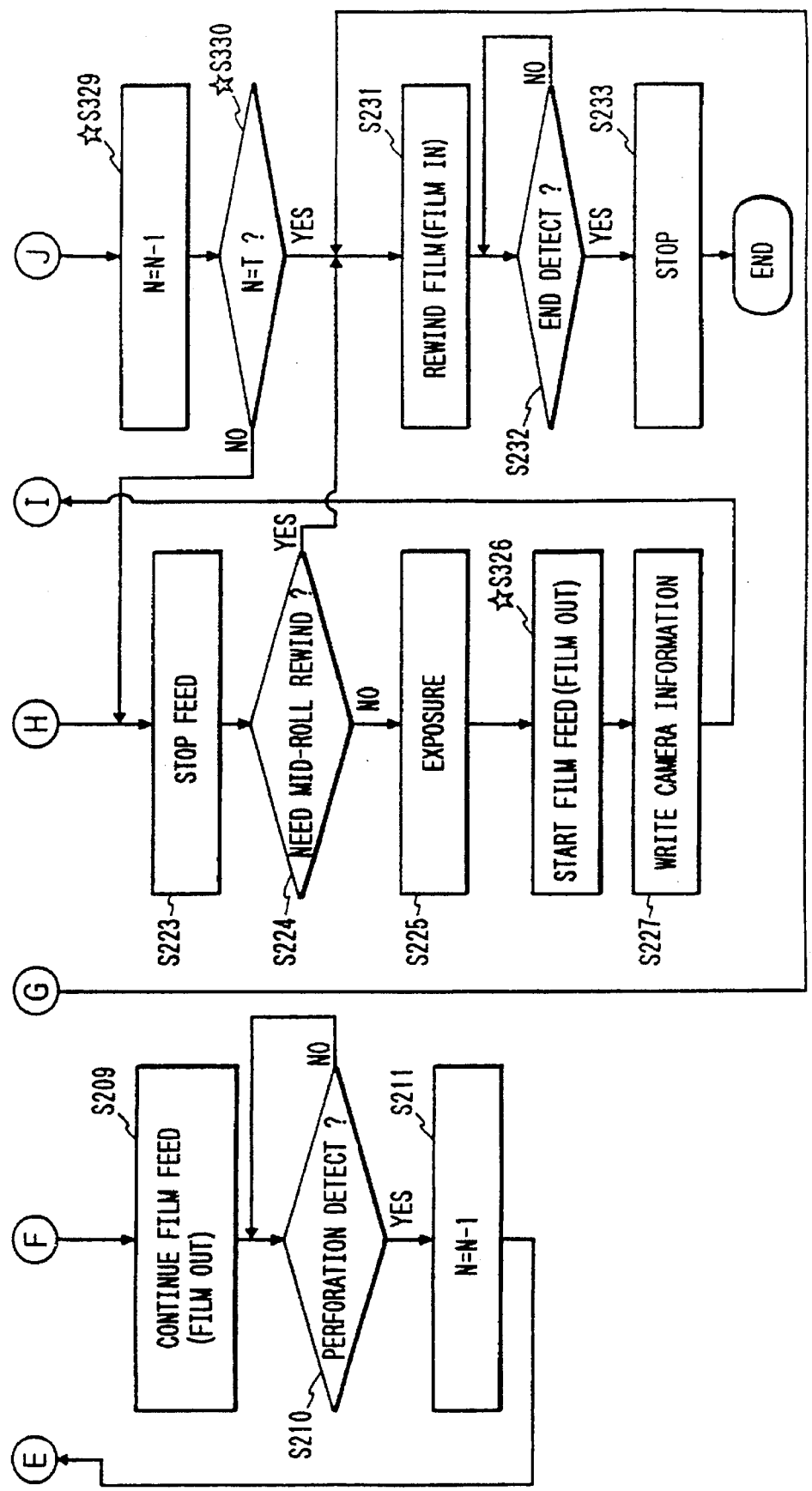
Figure 9B:
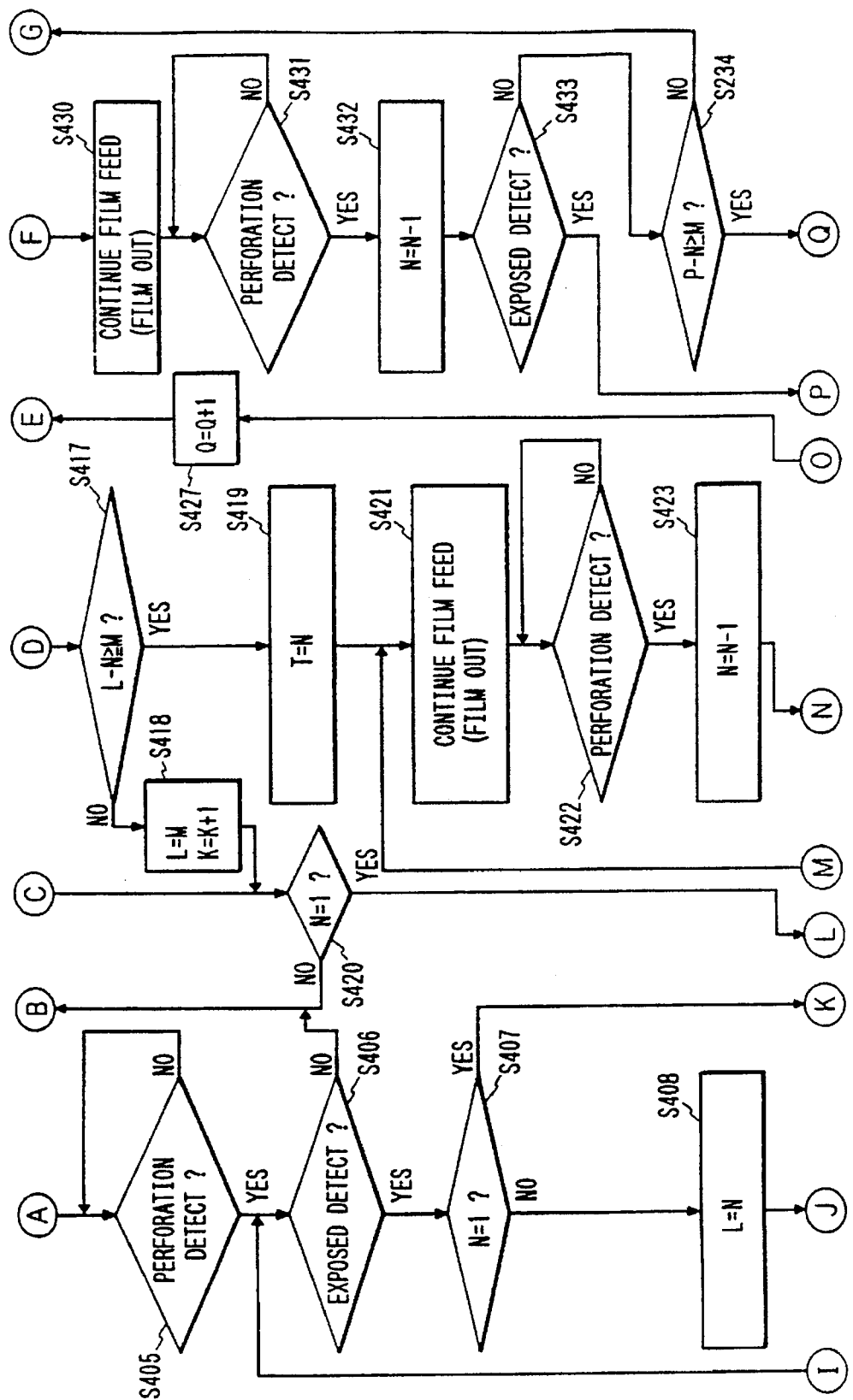
FIG. 9, consisted of FIGS. 9A to 9D, is a flowchart to show an operation of a control circuit in the fifth embodiment of the present invention.
Figure 9D:
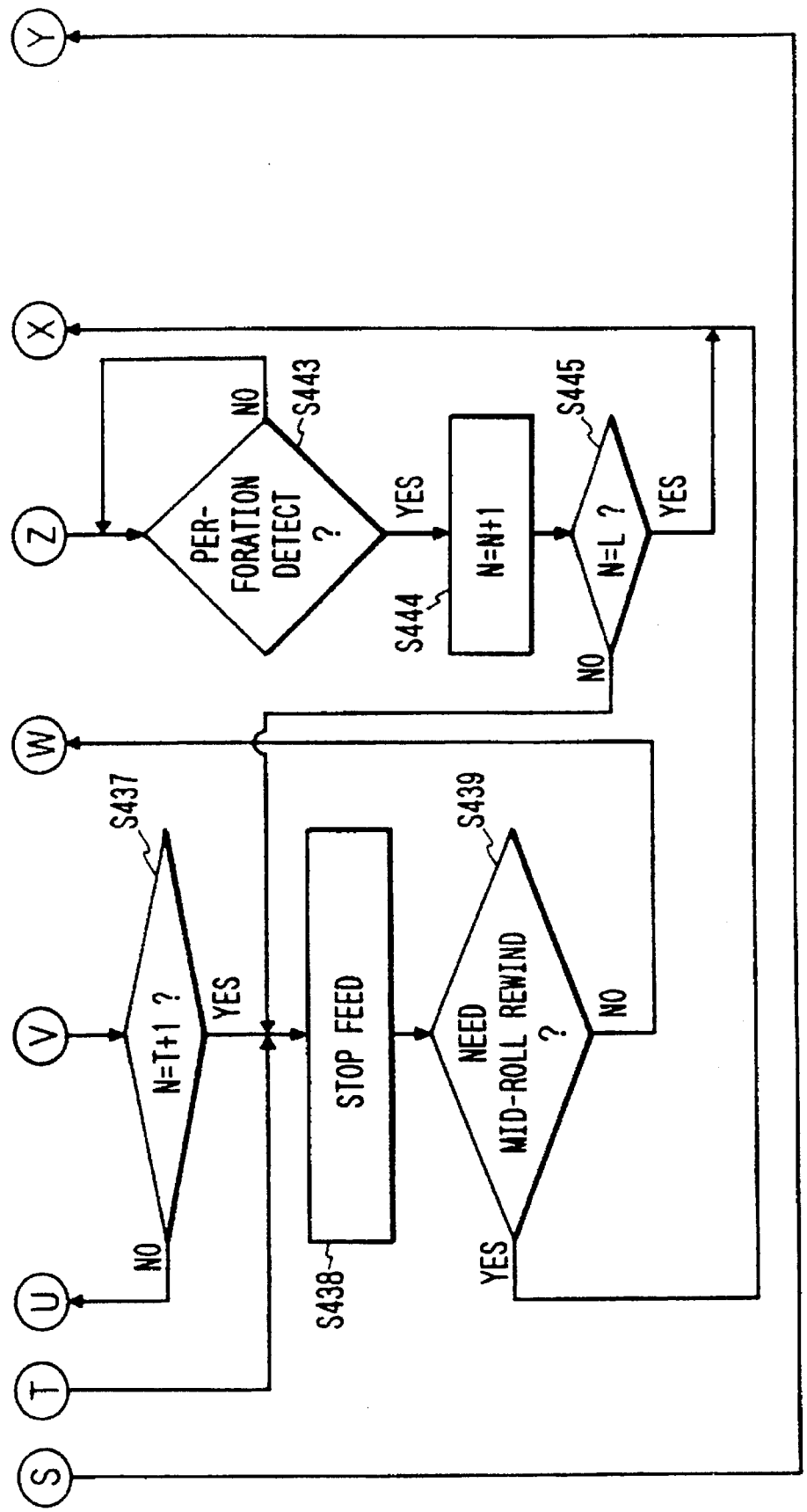
Figure 10B:
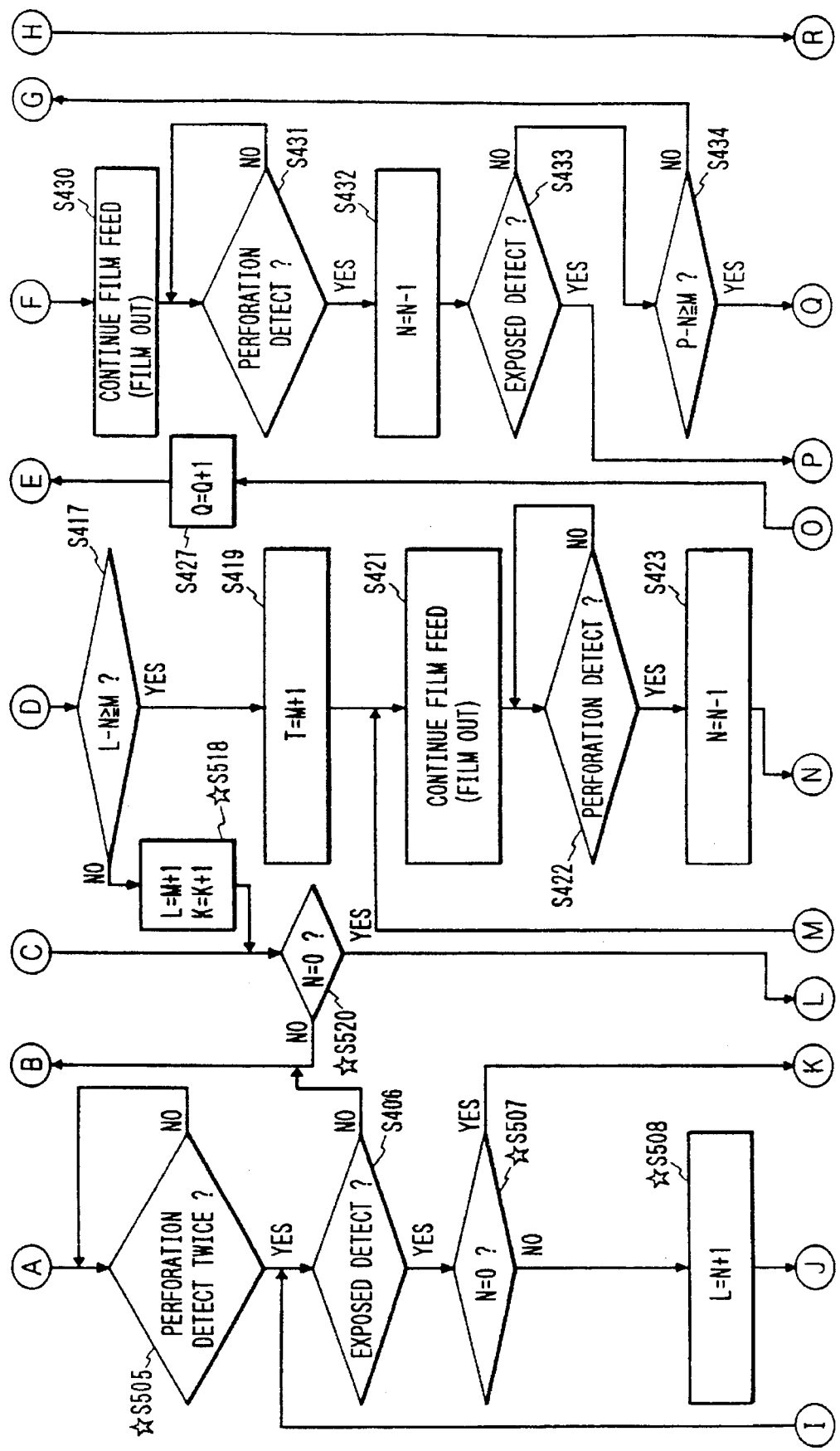
FIG. 10, consisted of FIGS. 10A to 10D, is a flowchart to show an operation of a control circuit in the sixth embodiment of the present invention.
Figure 10C:
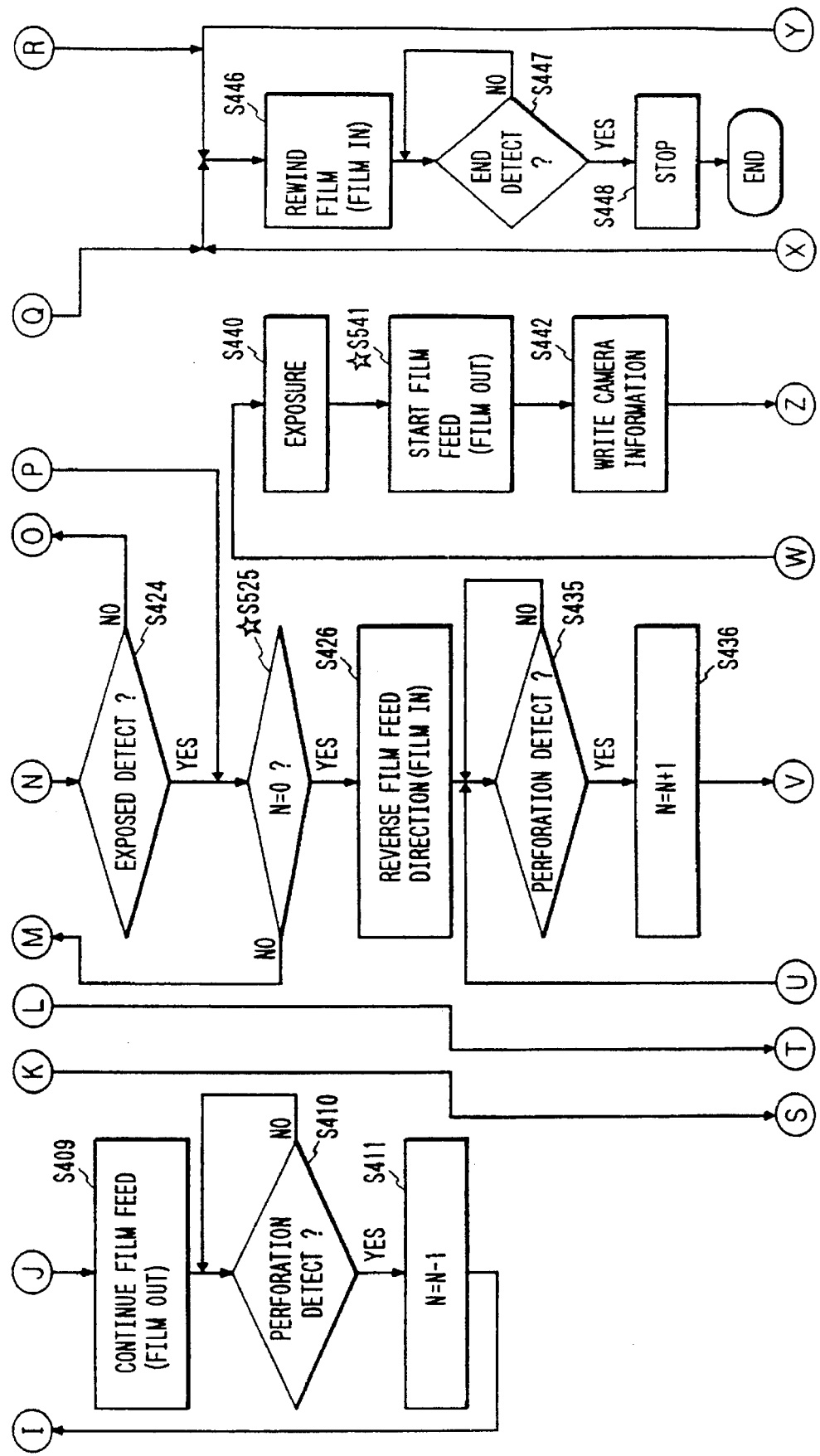
Figure 10D:
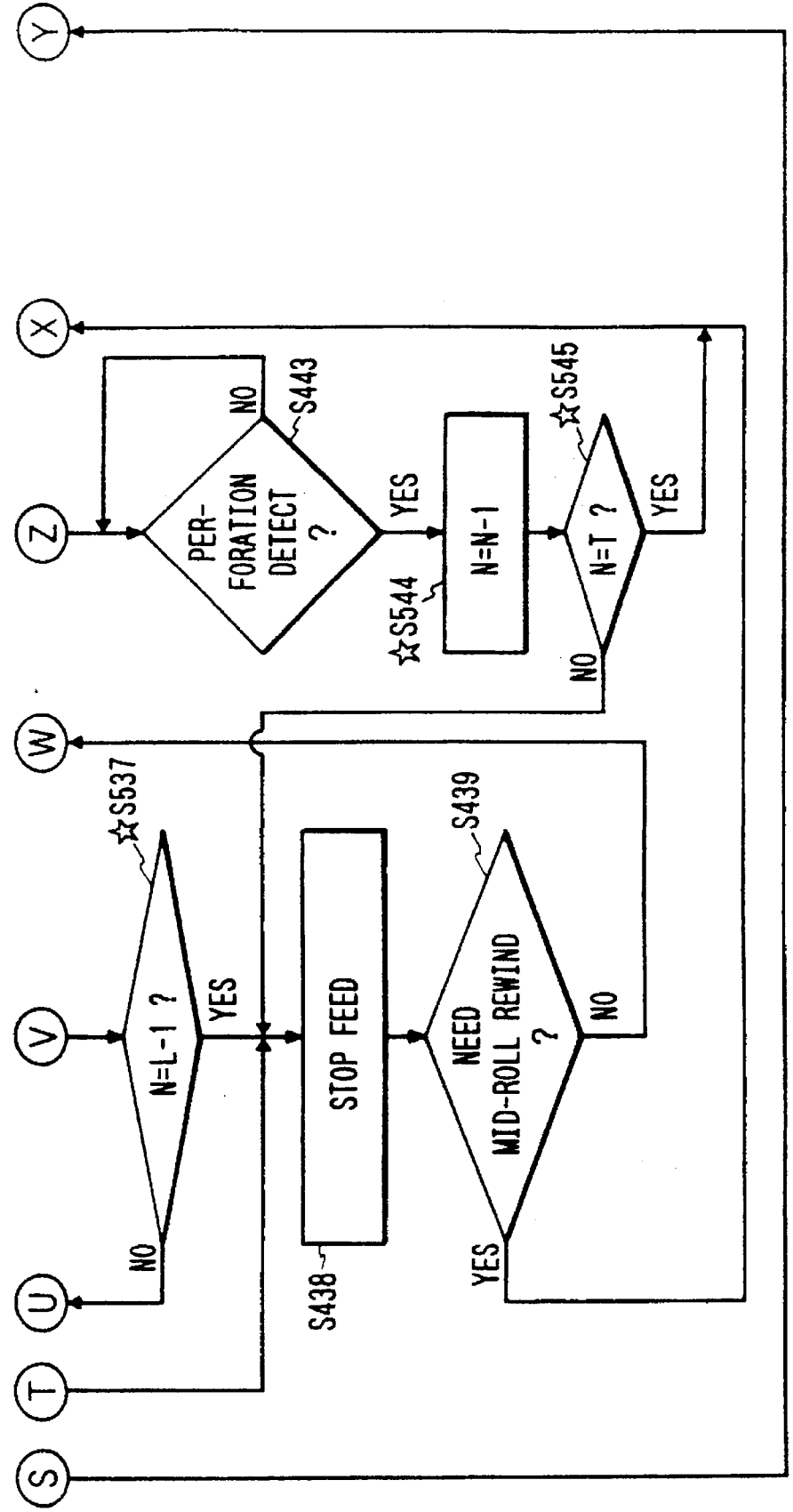
Figure 11C:
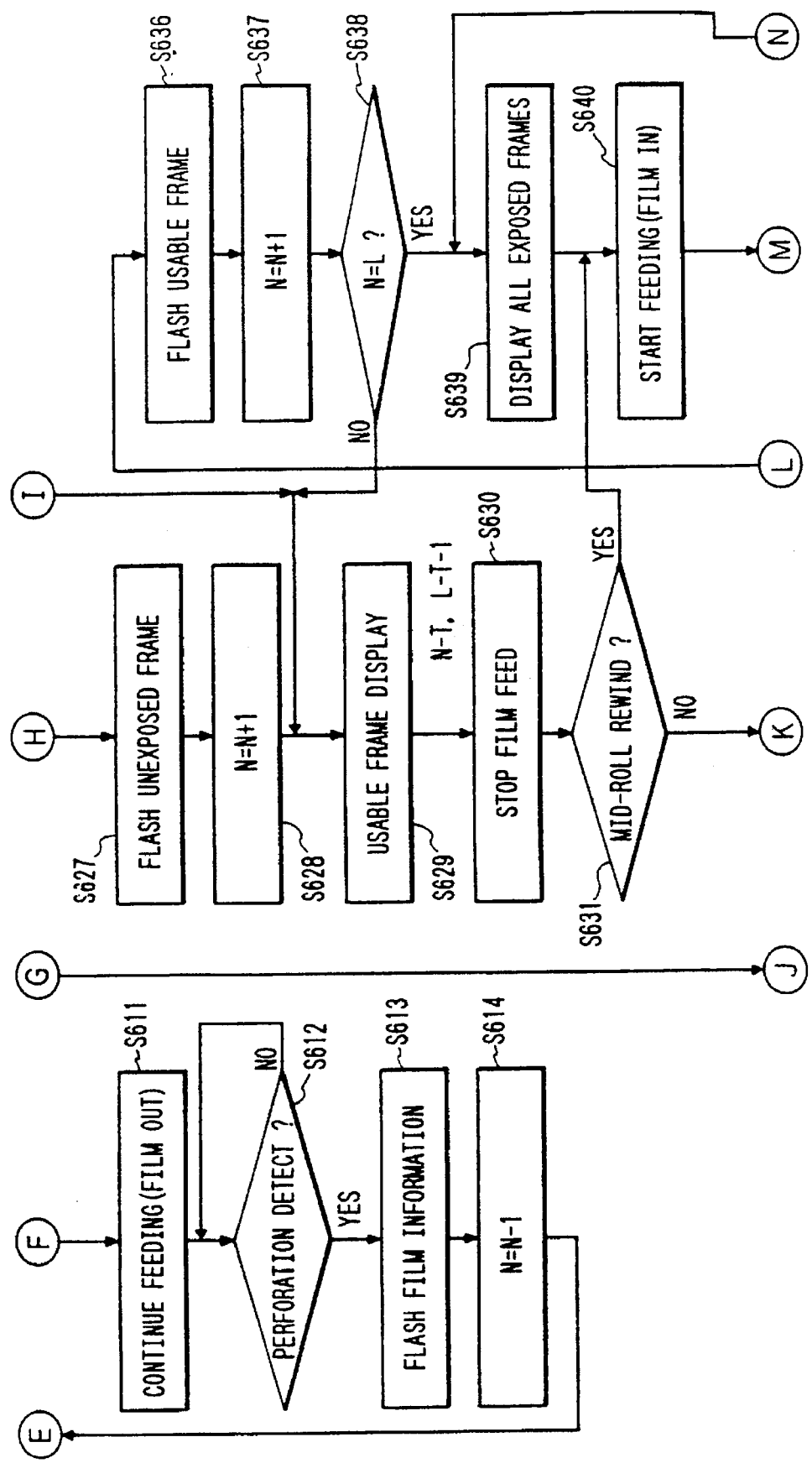
FIG. 11, consisted of FIGS. 11A to 11D, is a flowchart to show an operation of a control circuit in the seventh embodiment of the present invention.
Figure 12B:
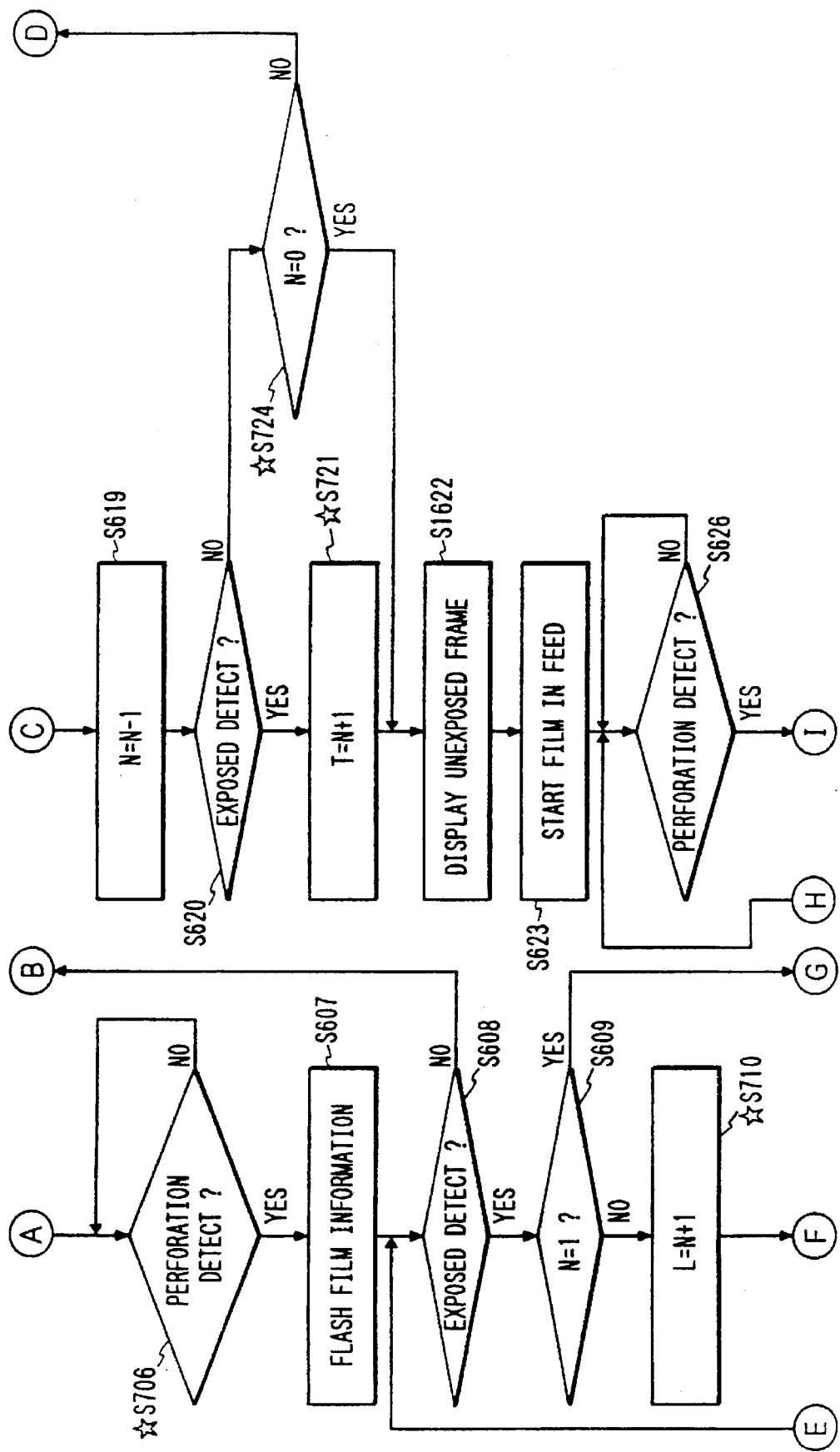
FIG. 12, consisted of FIGS. 12A to 12D, is a flowchart to show an operation of a control circuit in the eighth embodiment of the present invention.
Figure 13D:
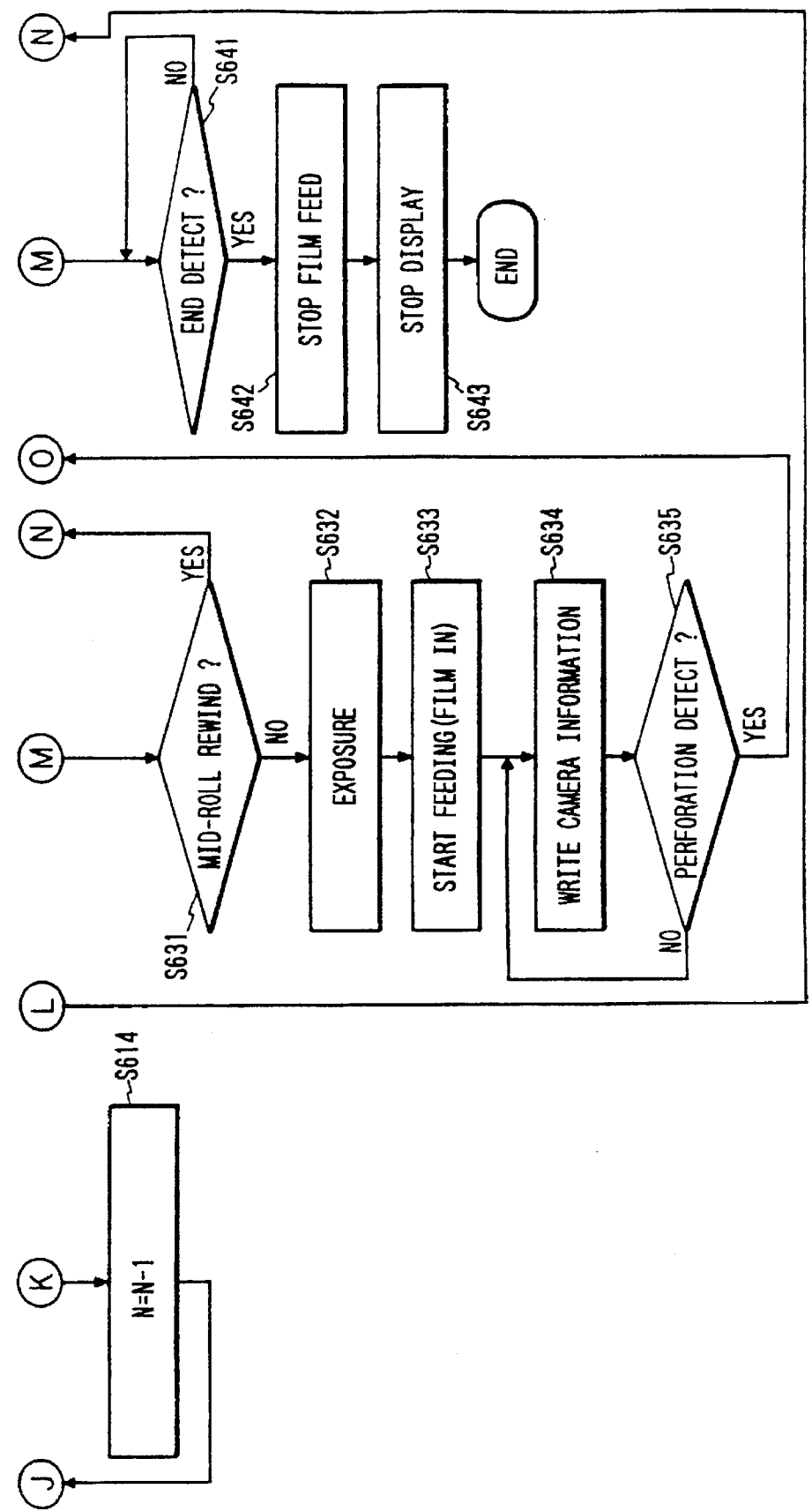
FIG. 13, consisted of FIGS. 13A to 13D, is a flowchart to show an operation of a control circuit in the ninth embodiment of the present invention.

FIGS. 8A to 8C are flowcharts to show an operation of the fourth embodiment of the present invention. The third embodiment of FIGS. 7A to 7C showed the example of prewind camera, whereas the fourth embodiment of FIGS. 8A to 8C shows an example of normal wind camera in which the exposure of film F is started from the leader portion of film F. Accordingly, the present embodiment illustrates the operation of the camera of FIG. 5, which is different from the prewind camera of FIG. 1 in that the magnetic head H, the pad 11, and the pad position control mechanism 12 are disposed on the opposite side to the set positions thereof in the prewind camera, because the film F is fed out of the cartridge C after exposure in the normal wind camera. FIGS. 8A to 8C correspond to the flowcharts of FIGS. 7A to 7C, in which different steps from those in FIGS. 7A to 7C are marked with star ahead and in which the same steps are denoted by the same numerals as those in FIGS. 7A to 7C but different steps by numerals of 300's. The steps with the same step numbers as in FIGS. 7A to 7C are the same operations, and therefore are omitted to explain here. The different steps from those in FIGS. 7A to 7C will be described.

At Step 304 after the reading of film information the control circuit 27 puts L=EXP+1, T=0, and N=EXP−1 in the internal register. The substitution of N=EXP−1 is due to the positional difference of magnetic head H. Since the scan of magnetic information upon film pull out is carried out on a frame which is closer by one frame to the leader than in the prewind camera, that is, on N+1, the film must be fed up to the (EXP−1)-th frame to judge whether the frame with the number of EXP is exposed or unexposed. Therefore, the starting point of frame counter is set as EXP−1. This is different from the previous embodiment. At Step 305 two frames are fed for the same reason as at Step 304. At Step 308 N+1 is substituted into L. This is also because of the difference of position of magnetic head H. Similarly at following Steps 317 and 318 L=N+1 and T=N+1 are respectively set in the same manner as at Step 308. It is detected at Step 320 whether N=0. It cannot be detected whether all frames are exposed including frames on the trailer side of film F, before N is reduced down to 0 due to the position of magnetic head H. Also at Step 334 the rewind film F is continued before N becomes L−1, because the film F must be again fed to the leader side after the detection of exposed frames on the leader side and on the trailer side in the normal wind camera. Unless N=L−1, the flow returns to Step 221. If N=L−1 then the flow goes to Step 223 to stop the rewinding of film. At Step 326 the film F is pulled out of the cartridge C after exposure in the normal wind camera. Then at Step 329 N is decreased by one, since the perforations are detected at Step 228 to confirm the one frame feed of film F. It is detected at Step 330 whether N=T. If N=T, all frames are exposed, and then the flow goes to Step 231 to rewind the film. Unless N=T, there remains an unexposed frame, and then the flow returns to Step 223 to stop the film rewinding.

FIGS. 9A to 9D are drawings to show the fifth embodiment of the present invention. Since the structure of camera is the same as in the third embodiment (of FIGS. 1 and 2), the description thereof is omitted here.

It is assumed in the present embodiment that the camera is of the so-called prewind type in which the film F is entirely wound once and then rewound one by one after exposure of each frame. The present embodiment will be described in detail with the flowchart.

When the film cartridge C is loaded in the camera and the back lid is closed to turn on the back lid switch 19, the flow proceeds from Step 401 to Step 402, where the film feed motor 8 is driven through the motor driver 28 to start the winding of entire film F. At Step 403, during the film winding, the magnetic head H reads out the film information such as the film speed, the number of frames, and the type of film recorded on the magnetic track T of film F as a line of data characters starting with ID sentinels (information start signal).

The read film information is amplified and converted from analog to digital by the head amp 22, then transferred to the buffer 23, thereafter decoded by the decoder 24, and transferred to the control circuit 27.

Also at Step 403, the ID detection circuit 21 continues detecting ID sentinels of N bits (for example "10000000") of film information, and the control circuit 27 receives the detection output while counting.

At Step 404 the control circuit 27 puts values of L=EXP+1, T=0, N=EXP, K=0, P=0, and Q=0 in the internal registers. Here, L represents the leader frame number, EXP the number of frames in film read at Step 403, T the trailer frame number, and N the frame number of a frame at the exposable position. Also, K, P, and Q are pass counters for counting a pass number through the loop used in the following flow. The control circuit 27 then detects a perforation detection signal from the photoreflector (Step 405). When it is detected, the number of ID sentinels of film information is compared with a predetermined number, for example 8, which is a threshold value to determine whether a frame is "exposed" or not. If the frame is judged as "exposed" (if ID sentinel number≤predetermined number), the flow goes to Step 407. If the frame is not "exposed" (if ID sentinel number>predetermined number), the flow goes to Step 412 (Step 406). It is then judged at Step 407 whether N=1. If N=1, all the frames are exposed and then the flow goes to Step 446. Unless N=1, there is a possibility that an unexposed frame exists, and the flow goes to Step 408.

At Step 408 the value of N is put into L, because frames up to the N-th frame are exposed on the leader side on film F. Thus, the frames between L and EXP are exposed. After that, the feed of film F is continued in the direction to pull the film out of the cartridge C (Step 409). The perforations of film F are detected in the same manner as at Step 405 (Step 410). Then, N is decreased by one, since it is detected that the film F is fed by one frame out of the cartridge C at Step 410 (Step 411). By this operation, all exposed frames on the leader side are fed and the smallest frame number is recorded as L among the exposed frames on the leader side.

After the feed of all exposed frames on the leader side is completed by this operation and after an unexposed frame is detected, the feed of film F is continued in the direction to pull the film F out of the cartridge C in the same manner as at Step 409 (Step 412). The perforations of film F are then detected in the same manner as at Step 405 or 410 (Step 413). When they are detected, N is decreased by one in the same manner as at Step 411, because it is detected at Step 413 that the film is fed by one frame (Step 414).

If the value of register K is not less than 2, that is, if the number of pass times through the abnormal process loop indicated by the register K is not less than 2, the flow goes to Step 446 assuming that an abnormal accident which cannot be ignored happens in production of DEP flag or in overwriting of information in either of cameras in which the film F was used. In case that the value of K is 0 or 1, the abnormality is ignored and the flow goes to Step 416 as the normal process. In the above abnormal process, the first appearance of "mid-dropped" unexposed frames is ignored if the frames are less than M. At Step 416 it is detected whether the frame with frame number N is exposed in the same manner as at Step 406. If it is unexposed then the flow returns through Step 420 to Step 412 to detect whether a next frame is exposed or unexposed. If the frame with frame number N is exposed, the flow goes to Step 417.

At Step 417 the frame number N of current exposed frame is subtracted from the leader side final exposed frame L to obtain the number of successive unexposed frames between them, and the obtained number is compared with the predetermined number M. If the number is less than M, it is supposed that there is an accidental error caused in writing between L and N, and then the flow goes to Step 418 for abnormal process. If the number is not less than M, it is supposed that the unexposed frames are correctly detected, and the flow goes to Step 419 for normal process.

If L−N<M, that is, if an abnormal state is detected at Step 417, frames detected as unexposed frames between L and N are ignored, and N is substituted into L. Also, the counter K is increased by one to store the number of abnormal process executed. After that, the flow returns through Step 420 to Step 412.

At Step 419 N is put in the frame number register T of exposed frames on the trailer side on film F. Namely, when Step 419 is carried out, the largest frame number is input into T out of the exposed frames on the trailer side. Accordingly, frames between T+1 and L−1 are unexposed.

In case that the frame with frame number N is not exposed at Step 416, carried out at Step 420 is the process executed when there is no exposed frame on the trailer side of film F. In other words, unless the frame is exposed but N=1 at Step 420 there is no unexposed frame on the trailer side. In this case the flow goes to Step 438. On the other hand, after the largest frame number out of the exposed frames on the trailer side is input into T, the feed of film F is continued in the pull out direction (Step 421), and the one frame feed of film F is then detected by detecting the perforations in the same manner as at Step 405, 410, or 413 (Step 422). After it is detected at Step 422 that the film F is pulled out by one frame, N is decreased by one (Step 423). It is again judged whether the fed frame is exposed or unexposed (Step 424). If it is exposed, the flow goes to Step 425 as the normal process. If an unexposed frame is detected, the flow goes to Step 427 for abnormal process II, since L and T were already determined.

At Step 425 the flow returns to Step 421 unless N=1, in order to continue the above abnormality detection up to the film end. If N=1 then the flow goes to Step 426. The check is thus completed for all frames, and then the feed direction of film is reversed to start rewinding it into the cartridge (Step 426). Further at Step 427 the register Q is started counting up from 1 to store the number of processing times of the abnormality process II branched at Step 424. Then, the unexposed frame number N detected at Step 424 is put into the register P (Step 428).

The number of processing times of abnormal process II is next checked from the content of Q. If it is less than 2, the flow goes to Step 430 to check abnormality remedy. If it is not less than 2, the flow goes to Step 446 assuming that there was unignorable abnormality, similarly in the case that K is not less than 2 at Step 415.

At Step 430 the feed of film F is continued in the pull out direction. It is detected whether a frame is fed (Step 431), and if the one-frame feed is detected, the frame number register N is decreased by one (Step 432).

It is then judged whether the frame is exposed or unexposed (Step 433). After that, since the present step is reached if the abnormality process time is not more than once, the flow goes to Step 425 if the frame is detected as exposed, ignoring detected, unexposed frames in the abnormal process II. If an unexposed frame is detected, the flow goes to Step 234. Then, a number of successive unexposed frames is calculated by subtracting the current frame number from initial P of unexposed frame. This is compared with the predetermined number M (Step 234). If it is not less than M, there are two unexposed portions of not less than successive M frames in film F, so that the flow goes to Step 446, regarding it as unignorable abnormality. If it is less than M, the flow returns to Step 429, because the abnormality might be ignorable.

In the above abnormality process II the unignorable abnormality is a case that the abnormality times are not less than twice, that is, that two or more unexposed frame portions are detected on the trailer side after detection of exposed frame, or a case that M or more successive frames are abnormally unexposed.

If the above abnormality is not detected, the feed of film is started in the rewinding direction into the cartridge (Step 426), and thereafter it is detected whether a frame is fed (Step 435). When it is detected at Step 425 that a frame is fed, the frame number register N is increased by one (Step 436).

The frame number register N is then compared with (T+1) to check if the film is fed up to the initial unexposed frame T+1 on the trailer side (Step 437). Unless N is (T+1) then the flow returns to Step 425. If N is (T+1) then the flow goes to Step 438. The feed motor 8 is stopped through the motor driver 28 to stop the feed of film F (Step 438).

It is next detected whether the rewind switch 20 for mid-roll rewind is on (Step 439). If it is on then the flow goes to Step 447 to rewind the film F into the cartridge. If it is off then the flow goes to Step 440.

At Step 440 it is judged whether the switch SW 1 is on. If it is on, the operations of photometry and distance measurement are carried out. Subsequently, the data of shutter speed, aperture value, and so on obtained in the photometry and distance measurement operations is converted into camera information, and the converted data is transferred to the encoder 25.

The encoder 25 encodes the camera information transferred thereto, and the buffer 26 stores it. Further, it is judged whether the switch SW 2 is on. If it is on, the conventional exposure operation is carried out. In detail, the control circuit 27 receives a lens position signal from the lens encoder 2b through the lens actuator 2a, and gives a stop command to the lens actuator 2a to stop the drive of photographic lens 1, or the focus operation when the photographic lens 1 reaches the position corresponding to the distance information measured. Almost at the same time the open and close operation of shutter 3 is carried out with an output of photometric sensor 4 for a certain time. After completion of the open and close operation of shutter 3, the film feed motor 8 rewinds the film F into the cartridge C (Step 441). During the feed of film, the magnetic head H is driven to write on the magnetic track T of film F the camera information stored in the buffer 26 through the head amp 22 in the form of a line of data characters starting with ID sentinels of N bits (for example "00000000") different from the ID sentinels of film information. After that, when the perforations are detected (Step 443), the data writing is stopped at Step 442. N is increased by one, since the perforations are detected at Step 443 to confirm that the film F is fed by one frame (Step 444).

It is next detected whether N becomes equal to L, which is the exposed frame on the leader side (Step 445). If N=L, all frames are exposed, and then the flow goes to Step 446. Unless N=L, there remains an unexposed frame, and then the flow returns to Step 438 to stop the feed.

The perforation detecting photoreflector 7 detects the state immediately before the film F is fully rewound into the cartridge C (Step 447) and after a certain time elapsed it is determined that the film F is stored in the cartridge C. The film feed motor 8 is then stopped (Step 448).

Though not explained above, the pad 11 is urged against the magnetic head H by the pad position control mechanism 12 only during movement of film F to assure the reading and writing of magnetic information.

FIGS. 10A to 10D are drawings to show the sixth embodiment of the present invention. In the sixth embodiment the camera is so arranged to have the structure as shown in FIG. 5 with the control circuit excluding the display 29 in the block diagram of FIG. 2, and therefore the structure thereof is omitted to explain here. The present embodiment shows a normal wind camera in which exposure of film F is started from the leader side thereof, as in the fourth embodiment.

FIGS. 10A to 10D correspond to the flowcharts of FIGS. 9A to 9D. In FIGS. 10A to 10D steps having the same operations as in FIGS. 9A to 9D are given the same step numbers, and are omitted to explain here. Steps having different operations from those in FIGS. 9A to 9D are marked with star before step numbers. The difference is due to the following two reasons: (1) Since the position of magnetic head is located at the opposite side to that in the prewind camera with respect to the camera aperture, the scan of magnetic information for the frame N at the camera aperture is carried out with N+1 next thereto by one frame on the leader side during pull out of film; (2) The film feed direction upon photography is the film pull out direction. The different steps will be described below.

At Step 504 EXP−1 is put into the film frame register N, and at Step 505 feed of two frames is detected. At Step 507 it is detected whether the film is fed up to the 0th frame, and at Step 508 N+1 is put into L. At Step 518 N+1 is put into L. At Step 520 it is detected whether the film is fed up to the 0th frame. Further, at Step 525 it is detected whether the film is fed up to the 0th frame in the same manner as at 520. At Step 537 it is detected whether the film is fed to (L−1)-th frame. At Step 541 the film is fed in the pull out direction. At Step 545 the counter N is decreased by one. Then at Step 546 it is detected whether the film is fed to T-th frame.

Throughout the embodiments as described above, the judgment number M for determining whether abnormal or normal when unexposed frames are successively detected may be 1 in the strictest case, or 2, 3, 4, or more depending upon the provability of error operation of camera.

FIGS. 11A to 11D show the seventh embodiment of the present invention. Since the structure of camera of FIGS. 11A to 11D is the same as that in FIGS. 1 and 2, the description thereof is omitted.

An operation of control circuit 27 of FIG. 2 is described with the flowcharts of FIGS. 11A to 11D. It is assumed in the present embodiment that the camera is of the so-called prewind type in which the film is entirely wound once and rewound one by one after exposure of each frame.

When the film cartridge C is loaded in the camera and the back lid is closed to turn on the back lid switch 19, the flow proceeds from Step 601 to Step 602 to drive the film feed motor 8 through the motor driver 28 and to start winding of the entire film F. Then at Step 603, during the film winding, the magnetic head H reads the film information such as the film speed, the number of frames, and the type of film recorded on the magnetic track T of film F as a line of data characters starting with ID sentinels (information head signal).

The read film information is amplified and converted from analog to digital by the head amp 22, transferred to the buffer 23, thereafter decoded by the decoder 24, and then transferred to the control circuit 27.

Also at Step 603, the ID detection circuit 21 continues detecting ID sentinels of N bits (for example "10000000") of film information, and the control circuit 27 receives the detection output while counting.

At Step 604 the film information read at Step 603 is indicated on the display 29 as shown in FIG. 4A. In FIG. 4A numeral 30 represents a display device such as a liquid crystal display plate, 31 an indication of film speed, 32 an indication of number of frames in film, and 33 an indication of type of film. At Step 605 the control circuit 27 puts values of L=EXP+1, T=0, and N=EXP in the internal registers. Here, L denotes a leader portion frame number, EXP the number of frames in film read at Step 603, T a trailer portion frame number, and N a frame number at the camera aperture.

The control circuit 27 detects a perforation detection signal from the photoreflector 7 (Step 606). Then, in order to indicate that the film F is under feed, the indication of film information presently indicated is flashed (Step 607). This change of indication permits a user of camera to identify for example that the film F is exposable at the 36-th frame.

Figure 3B:
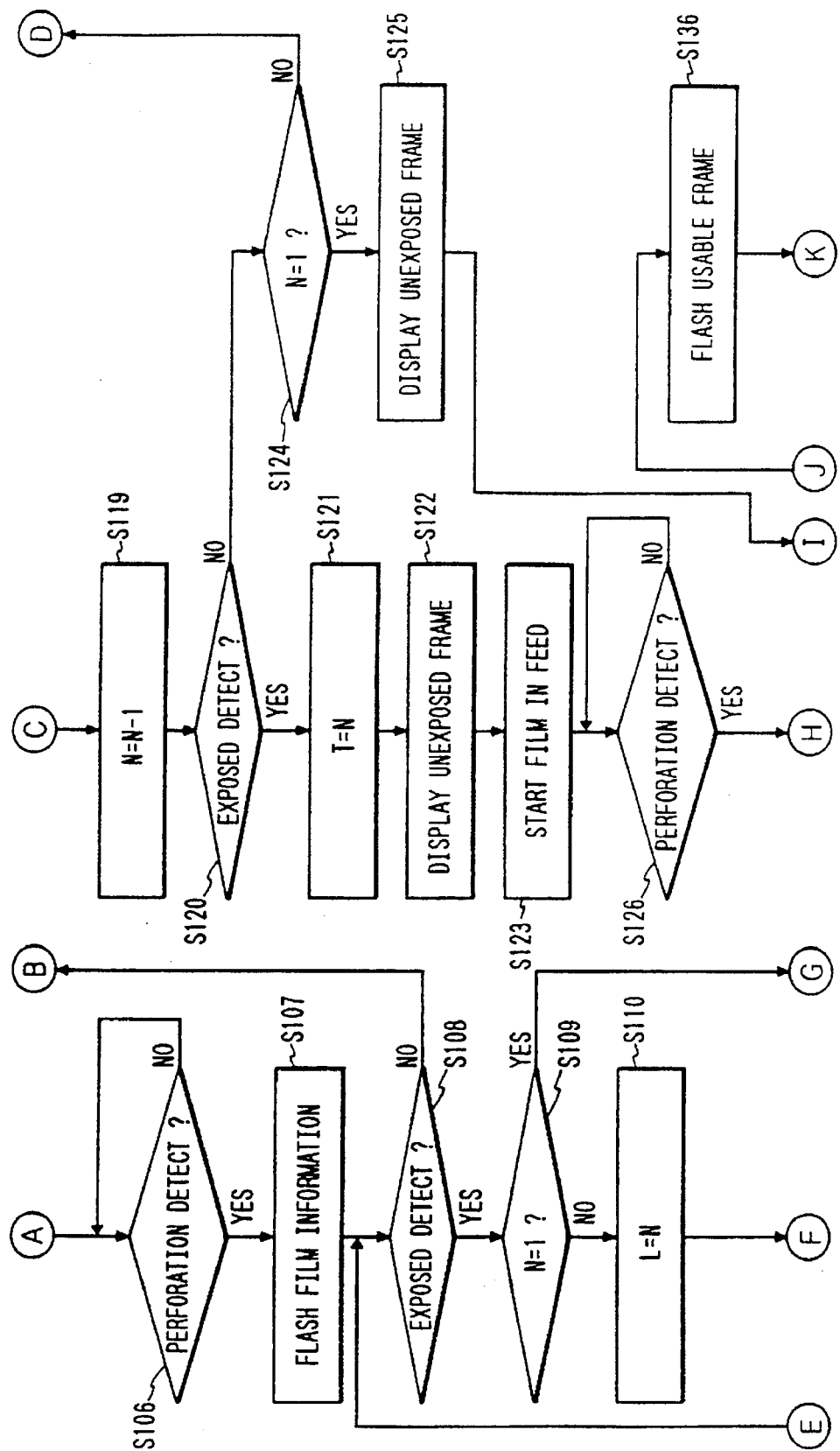
FIG. 3, consisted of FIGS. 3A to 3D, is a flowchart to show an operation of a control circuit as shown in FIG. 2.
Figure 3C:
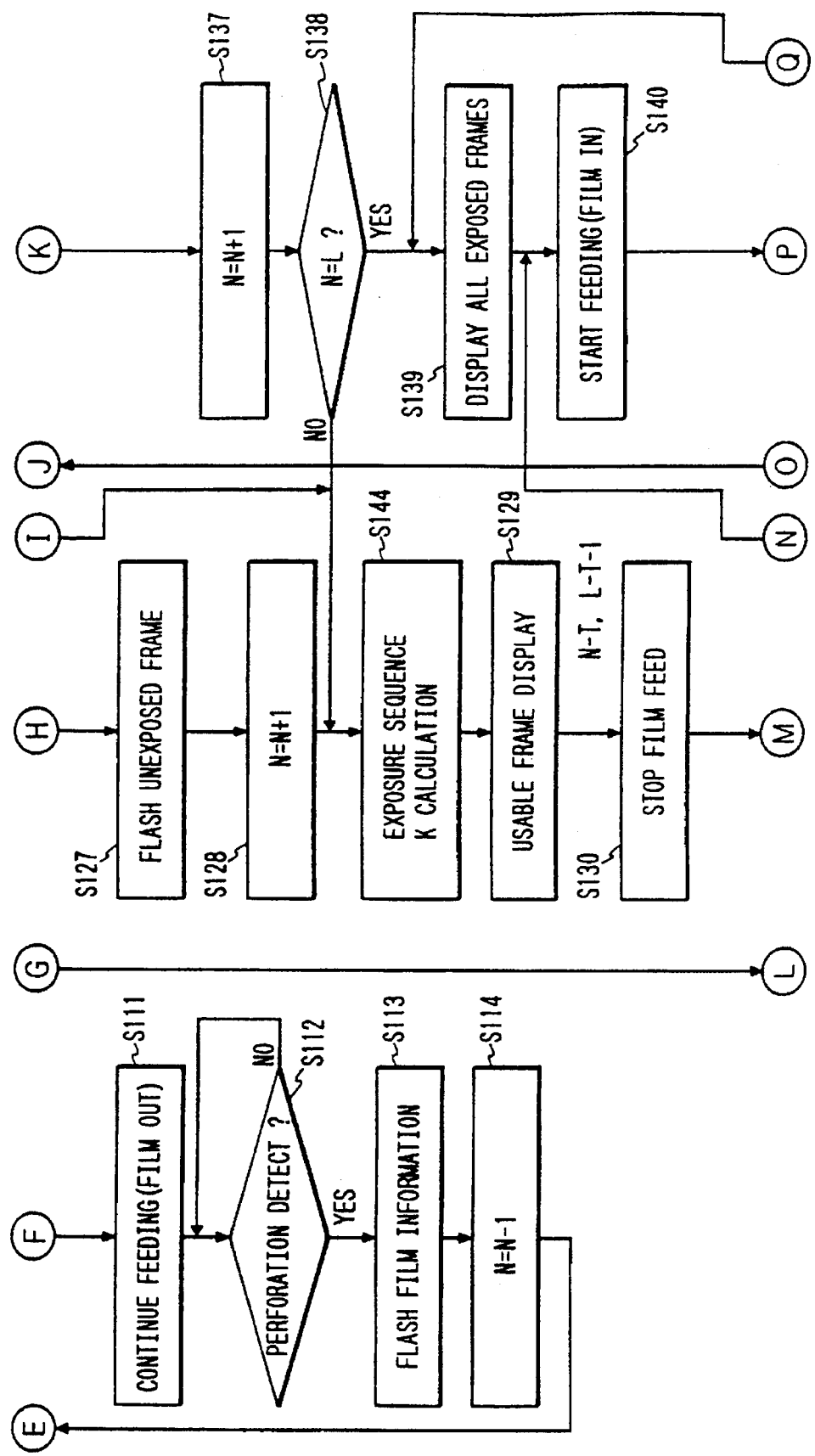

The number of ID sentinels of film information is compared with a predetermined number, for example 8, which is a threshold value to determine whether a frame is "exposed" or not, in the same manner as at Step 108 in FIG. 3B (Step 608). If the frame is judged as "exposed" (if ID sentinel number≦predetermined number), the flow goes to Step 609. If the frame is not "exposed" (if ID sentinel>predetermined number) then the flow goes to Step 615. In case that the frame is "exposed", it is judged whether N of exposable frame number is 1 (Step 609). If N=1, all frames are exposed, and then the flow goes to Step 639. Unless N=1, there is a possibility that an unexposed frame exists, and therefore the flow goes to Step 610. Since frames up to the N-th frame are exposed on the leader side on film F, the value of N is put into L (Step 610).

The feed of film F is continued in the direction to pull the film F out of the cartridge C (Step 611). Subsequently, perforations of film F are detected in the same manner as at Step 606 (Step 612). Once the perforations are detected, the indication of film information presently indicated is flashed in order to indicate that the film is under feed, in the same manner as at Step 607 (Step 613). Since it is detected at Step 612 that the film F is fed by one frame out of the cartridge C, N is decreased by one (Step 614). By above steps 608 to 614, the smallest frame number is detected out of frame numbers of exposed frames on the leader side of film.

At Step 615, indicated are the exposed frames on the leader side on film F, which were detected at the above steps. Exposed frames are from L to EXP. The indication is as shown in FIG. 4C as L=21 and EXP=36. In FIG. 4C numeral 34 represents an indication of shutter speed of camera, 35 an indication of aperture value of camera, and 37 an exposed frame indication to indicate that 21st to 36th frames are exposed. After the indication of exposed frames, the feed of film F is continued in the direction to pull the film F out of the cartridge C, in the same manner as at Step 611 (Step 616). After that, the perforations of film F are detected in the same manner as at Step 606 or 612 (Step 617). Once the perforations are detected, the exposed frame indication presently indicated is flashed in order to indicate that the film F is under feed (Step 618). The indication change permits the user of camera to identify that the film F is under feed in camera.

Since the film F is fed by one frame at Step 617, N is decreased by one in the same manner as at Step 614 (Step 619). It is then detected in the same manner as at Step 608 whether the frame with frame number N is exposed (Step 620). If it is unexposed, the flow returns through Step 624 to Step 616 to detect whether a next frame is exposed or unexposed. If the frame with frame number N is exposed then the flow goes to Step 621 to put N into the exposed frame number T on the trailer side on film F (Step 621). Since L and T are determined, the unexposed frames on film F are indicated (Step 622). (T+1)-th to (L−1)-th frames are unexposed. The indication is as shown in FIG. 4D as T=9 and L=21. In FIG. 4D numeral 38 represents an unexposed frame indication to indicate that 10th–20th frames are unexposed. Subsequently at Step 623, the film F is rewound into the cartridge C. Steps 624 and 625 are for a case that there is no exposed frame on the trailer side of film F. If the frame is not exposed and if N=1 at Step 624, there is no exposed frame on the trailer side. In this case, the flow goes to Step 625 to indicate the unexposed frames in the same manner as at Step 622. Since T=0, the indication is 1 to L=1.

After the feed of film is carried out at above Step 623, it is detected whether the film F is rewound by one frame in the same manner as at Step 606, 612, or 617 (Step 626). The unexposed frame indication presently indicated is then flashed to indicate that the film F is under feed (Step 627). Since it is detected at Step 626 that the film F is fed by one frame, N is increased by one (Step 628). Then, N–T and L–T–1 are calculated to indicate usable frames on film F (Step 629). N–T represents exposed frames after the film F is loaded this time. L–T–1 represents the number of unexposed frames at the time of latest loading of film F. If N=10, T=9, and L=21, the indication is as shown in FIG. 4E. In FIG. 4E numeral 39 represents an indication of usable frames showing "MRI" which is an abbreviation of Mid Roll Interrupt and "1 OF 11" which is the number of usable frames.

After the indication of usable frames, the feed of film F is stopped by stopping the feed motor 8 trough the motor driver 28 (Step 630). It is then detected whether the rewind switch 20 for mid-roll rewind is on (Step 631). If it is on then the flow goes to Step 640 to rewind the film F into cartridge. If it is off then the flow goes to Step 632. At Step 632 it is judged whether the switch SW 1 is on. If it is on, the operations of photometry and distance measurement are carried out. Subsequently, the data of shutter speed, aperture value, and so on obtained in the photometry and distance measurement operations is converted into camera information, and the converted information is transferred to the encoder 25.

The encoder 25 encodes the camera information transferred thereto, and the buffer 26 stores the encoded information. Further, it is judged whether the switch SW 2 is on. If it is on, the conventional exposure operation is carried out. In detail, the control circuit 27 receives a lens position signal from the lens encoder 2b through the lens actuator 2a, and when the photographic lens 1 reaches a position corresponding to the distance information the control circuit gives a stop command to the lens actuator 2a to stop the drive of photographic lens 1, that is, the focus operation. Almost at the same time, the open and close operation of shutter 3 is carried out with an output of photometric sensor 4 for a certain time.

After completion of exposure, the film F is fed by the film feed motor 8 into the cartridge C (Step 633). The magnetic head H is then driven to write on the magnetic track T of film F the camera information stored in the buffer 26 through the head amp 22 in the form of a line of data characters starting with ID sentinels (for example "00000000") of film information during the film feed (Step 634). When the perforations are detected, the data writing started at Step 634 is stopped (Step 635). The usable frame indication is then flashed to inform the user of camera that the perforations are detected at Step 635 (Step 636). Since the film F is rewound by one frame as the perforations are detected at Step 635, N is increased by one (Step 637). It is next detected whether N becomes equal to L, which is the leader side exposed frame (Step 638). If N=L, all the frames are exposed, and then the flow goes to Step 639. Unless N=L, there remains an unexposed frame, and then the flow returns to Step 629 to carry out a further exposure operation.

Since all the frames are exposed when N=L, an all-frames-exposed indication is indicated as shown in FIG. 4B (Step 639). In FIG. 4B numeral 36 represents an indication of "ALL EXPOSED", that is the all-frames-exposed indication. After that, the film F is fed by the motor 8 into the cartridge C (Step 640). The perforation detecting photoreflector 7 detects the state immediately before the film F is fully rewound into the cartridge C, and after a certain time elapsed it is determined that the film F is stored in the cartridge C (Step 641). Then, the film feed motor 8 is stopped (Step 642) and the indication on the indication plate 30 in the display 29 is turned off (Step 643).

Though not explained above, the pad 11 is urged by the pad position control mechanism 12 against the magnetic head H only during movement of film F to ensure the reading and writing of magnetic information.

FIGS. 12A to 12D are flowcharts to show the eighth embodiment of the present invention, in which the camera structure is the same as that shown in FIG. 5.

The embodiment as shown in FIGS. 11A to 11D showed the prewind camera, whereas the present embodiment shows a normal wind camera in which the exposure of film F is started from the leader side of film F. The normal wind camera of FIG. 5 is different from the prewind camera of FIG. 1 in that the magnetic head H, the pad 11, and the pad position control mechanism 12 are located on the opposite side to the locations thereof in the prewind camera, because the film F is fed in the direction to pull it out of the cartridge C after exposure of each frame.

FIGS. 12A to 12D correspond to the flowcharts of FIGS. 11A to 11D, in which different steps from those in FIGS. 11A to 11D are marked with star ahead. The same steps are denoted by the same step numbers as in Figs. 11A to 11D, but different steps by numerals of 700's.

The different steps from those in FIGS. 11A to 11D are described below.

At Step 705 the control circuit 27 puts values of L=EXP+1, T=0, and N=EXP=1 into the internal registers. This is different from the above embodiment because of the difference of position of magnetic head H.

At Step 706 the perforations are detected twice. This is because the position of magnetic head H is different from that in the prewind camera. At Step 710 N+1 is put into L. This is also because of the positional difference of magnetic head H. At Step 721 N+1 is put into T. This is due to the positional difference of magnetic head H as well. At Step 724 whether N=0 is detected. This is because it cannot be detected whether all frames on the trailer side of film F are exposed or not unless N becomes 0 because of the position of magnetic head H. At Step 725, since the film F must be again rewound to the leader side after the detection of exposed frames on the leader side and on the trailer side in the normal wind camera, the rewind of film F is continued until N becomes L–1. Unless N=L–1 then the flow returns to Step 626. If N=L–1 then the flow goes to Step 629.

At Step 733 the film F is pulled out of the cartridge C after exposure in the normal wind camera. At Step 737 N is decreased by one, since the one frame feed of film F is detected by detecting the perforations at Step 635. Further, whether N=T is detected at Step 738. If N=T, all frames are exposed, and then the flow goes to Step 639. Unless N=T, there remains an unexposed frame, and then the flow returns to Step 629.

FIGS. 13A to 14D are drawings to show the ninth embodiment of the present invention. The ninth embodiment is different from the embodiment of FIGS. 11A to 11D in that the exposed frame indication 37 on the indication plate 30 is changed every detection of exposed frame on the leader side of film F and in that the unexposed frame indication 38 on the indication plate is changed every detection of unexposed frame of film F, in the prewind camera. In the present embodiment, the user of camera can identify the film feed condition of camera by the change on the indication plate 30.

FIGS. 13A to 13D correspond to the flowcharts of FIGS. 11A to 11D, in which different steps from those in FIGS. 11A to 11D are marked with star ahead. The same steps are denoted by the same step numbers as in FIGS. 11A to 11D, but different steps by numerals of 800's.

The different steps from those in FIGS. 11A to 11D are described below.

Figure 14A:
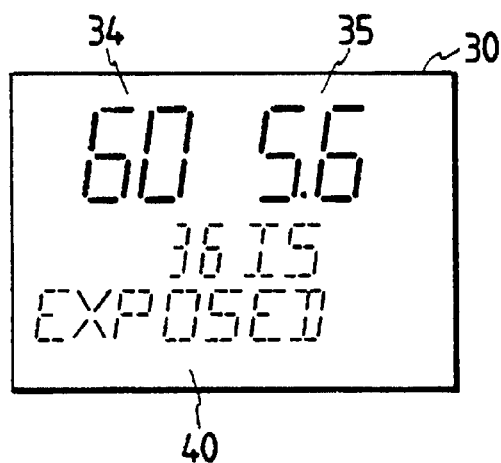
FIGS. 14A to 14D are drawings to illustrate a state of display in the embodiment of FIG. 13.
Figure 14B:
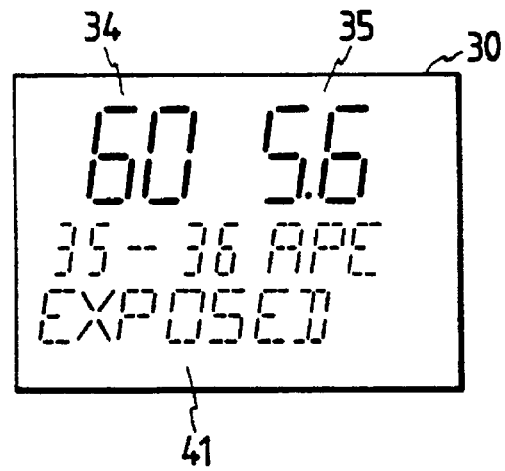

At Step 810 exposed frames on the leader side on film F are indicated in the same manner as at Step 615. The exposed frames are from L to EXP. The indication is shown in FIG. 14A when L=EXP. In FIG. 14A numeral 40 represents an indication of exposed frames. Since EXP=36 in this example, the indication shows that the 36th frame is exposed. After that, in case that the flow proceeds through Steps 611, 612, 813, 614, 608, and 609, the indication plate 30 shows the indication as shown in FIG. 14B since L=EXP−1. In FIG. 14B numeral 41 represents the exposed frame indication. The indication shows that the 35th and 36th frames are exposed. The camera changes the indication of exposed frame every one frame feed of film F in such a manner, thereby the user of camera can identify the operation condition of camera.

At Step 813 the exposed frame indication is flashed to indicate that the film F is under feed in the same manner as at Step 618. This indication change permits the user of camera to identify that the film F is under feed. Step 813 can be omitted, since the user of camera can identify the operation condition of camera by the indication change at Step 810 every one frame feed of film F in camera.

Figure 14C:
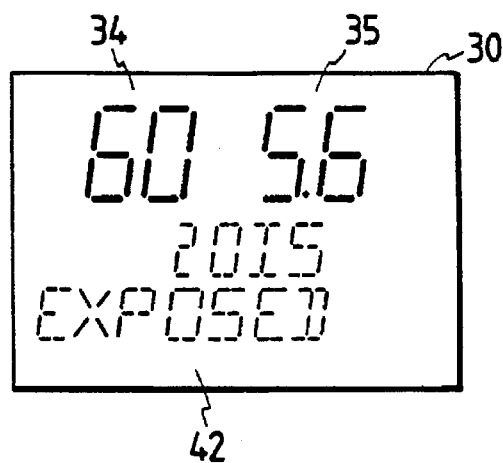
Figure 14D:
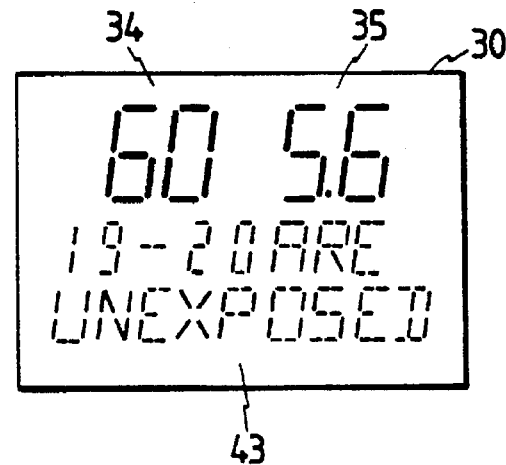
Figure 15C:
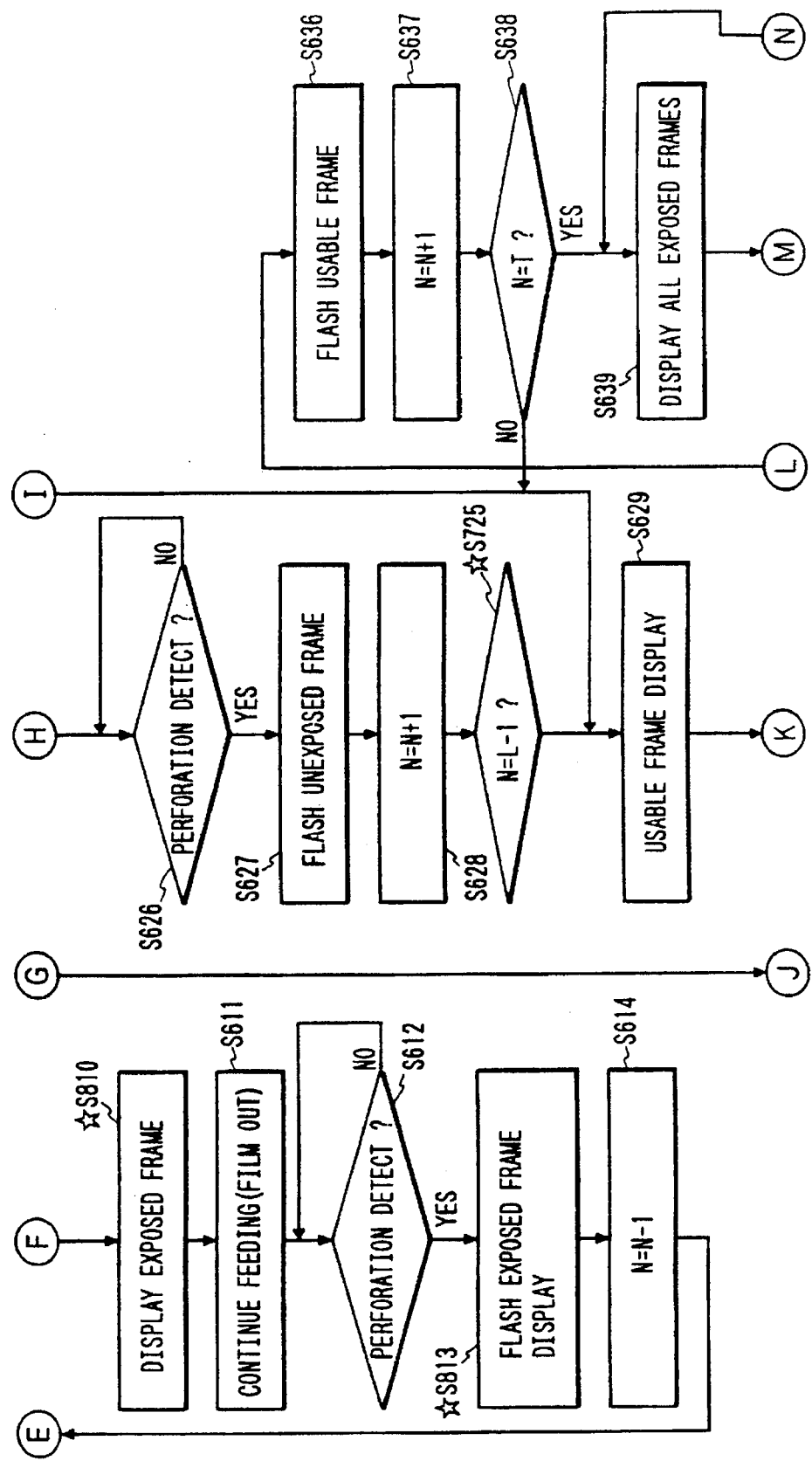
FIG. 15, consisted of FIGS. 15A to 15D, is a flowchart to show an operation of a control circuit in the tenth embodiment of the present invention.

At next Step 815, since T is not determined different from Step 622, the N-th to (L−1)-th frames are indicated as unexposed. FIG. 14C shows an indication state when L=21. In FIG. 14C numeral 42 represents the unexposed frame indication. This example shows that the 20th frame is unexposed. After that, in case that the flow proceeds further through Steps 616, 617, 818, 619, 621, 620, and 624, the indication is changed as shown in FIG. 14D. In FIG. 14D numeral 42 represents the unexposed frame indication. This example shows that the 19th–20th frames are unexposed. Since the camera changes the unexposed frame indication every one frame feed of film F in such a manner, the user of camera can identify the operation condition of camera.

At Step 818 the unexposed frame indication presently indicated is flashed to indicate that the film F is under feed in the same manner as at Step 627. Step 818 can be omitted, since the user of camera can identify the operation condition of camera by the indication change at Step 810 every one frame feed of film F in camera.

Further, at Step 825, if N−1 then T=0 is set since T must be zero at the steps after Step 825.

FIGS. 15A to 15D are drawings to show the tenth embodiment of the present invention. The embodiment of FIGS. 13A to 13D showed the prewind camera in which the indication plate 30 was changed every one frame feed of film F, whereas the present invention shows a normal wind camera in which the indication on the indication plate 30 is changed every one frame feed of film F.

FIGS. 15A to 15D correspond to the flowcharts of FIGS. 12A to 12D. The operations at the respective steps were already explained with FIGS. 12A to 13D, and therefore are omitted to explain here.

What is claimed is:

1. A camera, capable of being loaded with a film having a leader-end and a trailer-end, having information detecting means for detecting frame information in a record portion provided for each frame of a film loaded in said camera, and which performs exposure on an unexposed frame of the film, said camera comprising:

a judgement circuit for judging whether a frame of a film is exposed or not based on information detected by the information detecting means;

unexposed frame detecting means for detecting, based on a judgement result of said judgement circuit, a first leader-end unexposed frame of film from the leader end of the film and a first trailer-end unexposed frame of film from the trailer-end of the film;

an exposure control circuit for controlling successive exposures from the first trailer-end unexposed frame of film detected by said unexposed frame detecting means to the first leader-end unexposed frame of film detected by said unexposed frame detecting means, or from the first leader-end unexposed frame of film detected by said unexposed frame detecting means to the first trailer-end unexposed frame of film detected by said unexposed frame detecting means;

a frame number count circuit for counting frame numbers in the process of film feeding;

a frame number detecting circuit for detecting, based on the frame number counted by said frame number count circuit, a frame number corresponding to a first leader-end unexposed frame and a frame number corresponding to a first trailer-end unexposed frame which are detected by said unexposed frame detecting means;

a calculation circuit for calculating, based on the frame number detected by said frame number detecting circuit, an exposure order number representing an exposure order that sequentially follows a number of previously exposed frames; and record control means for recording the exposure order number calculated by said calculation circuit in the record portion of each frame of film.

2. A camera according to claim 1, wherein said calculation circuit calculates an exposure order number of a frame of film to be exposed after exposure of the previously exposed frames of film, the exposure order number sequentially following the number of all the previously exposed frames of film, based on frame numbers corresponding to the first leader end unexposed frame of film and the first trailer-end unexposed frame of film out of frame numbers corresponding to respective frames of film, and on a total number of frames of film.

3. A camera, capable of being loaded with a film cartridge having a film with a leader-end and a trailer-end, having information detecting means for detecting frame information in a record portion provided for each frame of a film loaded in said camera, and which performs exposure on an unexposed frame of the film, said camera comprising:

first feed control means for successively feeding a loaded film from the leader-end portion of the film in such a direction that frames on the trailer-end of the film are drawn out of the cartridge;

a judgement circuit for judging whether each frame of the film is exposed or not, based on frame information detected by the information detecting means upon feeding of the film by said first feed control means; and control means for controlling exposure of each frame of the film, the exposure control being based on the frame information of the first unexposed frame from the leader-end of the film as judged by said judgement circuit and frame information of the last successively exposed frame from the trailer-end of the film as judged by said judgement circuit from the first unexposed frame from the leader-end of the film to a frame immediately adjacent, on the leader-end side of the film, to the last successively exposed frame from the trailer-end of the film, or from the frame immediately adjacent, on the leader-end side of the film, to the last successively exposed frame from the trailer-end of the film to the first unexposed frame from the leader-end of the film.

4. A camera according to claim 3, further comprising second feed control means for feeding the film into the film cartridge up to the first unexposed frame from the trailer end of the film after completion of the feed operation by said first feed control means, whereby the first unexposed frame from the trailer end of the film is positioned at an exposure position.

5. A camera according to claim 3, further comprising a calculation circuit for calculating a number of unexposed frames, based on the frame information of the first unexposed frame from the leader end of the film and the last successively exposed frame from the trailer end of the film, and a display circuit for displaying the number of unexposed frames calculated by said calculation circuit.

6. A camera, capable of being loaded with a film cartridge having a film with a leader-end and a trailer-end, having information detecting means for detecting frame information in a record portion provided for each frame of a film loaded in said camera, and which performs exposure on an unexposed frame of the film, said camera comprising:

first feed control means for successively feeding a loaded film from the leader-end portion of the film in such a direction that frames on the trailer-end of the film are drawn out of the cartridge;

a judgement circuit for judging whether each frame of the film is exposed or unexposed, based on frame information detected by the information detecting means upon feeding of the film by said first feed control means; and an exposure control circuit for controlling successive exposures from a first unexposed frame from the leader-end of the film to a frame immediately adjacent, on the leader-end side of the film, to a last successively exposed frame from the trailer-end of the film, or from the frame immediately adjacent, on the leader-end side of the film, to the last successively exposed frame from the trailer-end of the film to the first unexposed frame from the leader-end of the film on the basis of a judgement result by said judgement circuit.

7. A camera according to claim 6, further comprising a calculation circuit for calculating a number of unexposed frames, based on frame information of a frame immediately adjacent, on the leader-end side of the film, to the first unexposed frame from the leader end of the film as judged by said judgement circuit and frame information of the last successively exposed frame from the trailer end of the film as judged by said judgment circuit, and a display circuit for displaying the number of unexposed frames calculated by said calculation circuit.

8. A camera according to claim 6, further comprising a display circuit for displaying at least one of frame numbers of unexposed frames and frame numbers of exposed frames, based on frame information of a frame immediately adjacent on the leader-end side of the film to the first unexposed frame from the leader end of the film as judged by said judgment circuit and frame information of the last successively exposed frame from the trailer end of the film as judged by said judgement circuit.

9. A camera according to claim 6, wherein the camera comprises display means for displaying at least one of which frames are the exposed frames on the basis of the judgement result and for displaying which frames are the unexposed frames on the basis of the judgement result.

10. A camera, capable of being loaded with a film having a leader end and a trailer end, having information detecting means for detecting frame information in a record portion provided for each frame of a film loaded in said camera, and which performs exposure on an unexposed frame of the film, said camera comprising:

a judgement circuit for judging whether each frame of film is exposed or unexposed, based on the frame information; and a calculation circuit for calculating a number of unexposed frames based on a judgement result of said judgement circuit; and display means for displaying the number of unexposed frames.

11. A camera, capable of being loaded with a film cartridge having a film with a leader end and a trailer end, having information detecting means for detecting frame information in a record portion provided for each frame of a film loaded in said camera, and which performs exposure on an unexposed frame of the film, said camera comprising:

first feed control means for successively feeding a loaded film from the leader-end portion of the film in such a direction that frames on the trailer-end of the film are drawn out of the cartridge;

a first judgement circuit for judging whether each frame of the film is exposed or not, based on frame information detected by the information detecting means upon feeding of the film by said first feed control means;

a second judgement circuit for judging whether a number of successive unexposed frames, which is judged during feeding of the film by said first feed control means after said first judgement circuit judges a first unexposed frame of film, is smaller than a predetermined value; and a first processing circuit for processing an unexposed frame as an exposed frame if said second judgement circuit judges that the number of successive unexposed frames is smaller than the predetermined value.

12. A camera according to claim 11, further comprising:

a second processing circuit that processing as unexposed frames, all frames except for frames judged as exposed by said first judgement circuit and unexposed frames processed as exposed frames according to a judgment result of said first processing circuit.

13. A camera according to claim 12, further comprising exposure control means for effecting exposure control on each frame processed as an unexposed frame by said second processing circuit.

14. A camera according to claim 13, further comprising inhibiting means for making said exposure control means nonoperative if said first processing circuit is operated more than a predetermined number of times.

15. A camera, capable of being loaded with a film cartridge having a film with a leader end and a trailer end, having information detecting means for detecting frame information in a record portion provided for each frame of a film loaded in said camera, and which performs exposure on an unexposed frame of the film, said camera comprising:

first feed control means for successively feeding a loaded film from the leader-end portion of the film in such a direction that frames on the trailer-end of the film are drawn out of the cartridge;

a judgement circuit for judging whether each frame of the film is exposed or not, based on frame information detected by the information detecting means upon feeding of the loaded film by said first feed control means; and an abnormal judgement circuit for giving a judgement of abnormal operation if, after said judgement circuit has judged at least a first predetermined number of successive frames as unexposed, said judgement circuit judges a second predetermined number of successive frames as unexposed following at least one frame judged as exposed.

16. A camera, capable of being loaded with a film cartridge having a film with a leader end and a trailer end, having information detecting means for detecting frame information in a record portion provided for each frame of a film loaded in said camera, which performs exposure on an unexposed frame of the film, said camera comprising:

first feed control means for successively feeding the loaded film from the leader-end portion of the film in such a direction that frames on the trailer end of the film are drawn out of the cartridge;

a judgement circuit for judging whether each frame of the film is exposed or not, based on the frame information detected by the information detecting means upon feeding of the film by said first feed control means; and an abnormal judgement circuit for providing a judgement of abnormal operation if, in film feeding after said judgment circuit judges a frame as exposed, frames judged as unexposed are discontinuously present.

* * * * *

UNITED STATES PATENT AND TRADEMARK OFFICE
CERTIFICATE OF CORRECTION

PATENT NO. : 5,671,455  
DATED : September 23, 1997  
INVENTOR(S) : TORU NAGATA, ET AL.

It is certified that error appears in the above-identified patent and that said Letters Patent is hereby corrected as shown below:

Column 1

Line 40, "used to" should read --used--.  
    Line 55, "of" should be deleted.

Column 2

Line 51, "the each" should read --each--.  
    Line 60, "to be" should be deleted.

Column 6

Line 13, "of from" should read --from--.  
    Line 20, "of from" should read --from--.

Column 12

Line 59, "L.." should read --L.--.  
    Line 60, "process" should read --processes--.

UNITED STATES PATENT AND TRADEMARK OFFICE
CERTIFICATE OF CORRECTION

PATENT NO. : 5,671,455

DATED : September 23, 1997

INVENTOR(S) : TORU NAGATA, ET AL.

It is certified that error appears in the above-identified patent and that said Letters Patent is hereby corrected as shown below:

<u>Column 16</u>

Line 65, "L=1." should read --L-1.--.

<u>Column 17</u>

Line 15, "trough" should read --through--.

<u>Column 22</u>

Line 42, "processing" (second occurrence) should read --processes-.

Signed and Sealed this

Twenty-eighth Day of April, 1998

Attest:

BRUCE LEHMAN

*Attesting Officer*  *Commissioner of Patents and Trademarks*